(12) United States Patent
Sato et al.

(10) Patent No.: US 6,952,325 B2
(45) Date of Patent: Oct. 4, 2005

(54) THIN FILM MAGNETIC HEAD AND METHOD OF MANUFACTURING THE SAME

(75) Inventors: Yoshikazu Sato, Chuo-ku (JP); Yuko Motegi, Fukaya (JP); Tetsuya Roppongi, Chuo-ku (JP); Yasuyuki Notsuke, Chuo-ku (JP)

(73) Assignee: TDK Corporation, Tokyo (JP)

( * ) Notice: Subject to any disclaimer, the term of this patent is extended or adjusted under 35 U.S.C. 154(b) by 195 days.

(21) Appl. No.: 10/318,153

(22) Filed: Dec. 13, 2002

(65) Prior Publication Data

US 2003/0112555 A1 Jun. 19, 2003

(30) Foreign Application Priority Data

Dec. 14, 2001 (JP) ........................................ 2001-381657
Jul. 12, 2002 (JP) ........................................ 2002-204326

(51) Int. Cl.[7] ............................................. G11B 5/187
(52) U.S. Cl. ........................................................ 360/125
(58) Field of Search ................................... 360/125, 126

(56) References Cited

U.S. PATENT DOCUMENTS 6,504,675 B1 * 1/2003 Shukh et al. ............... 360/125
6,721,131 B2 * 4/2004 Litvinov et al. ............ 360/125

FOREIGN PATENT DOCUMENTS

JP   A 2002-208113   7/2002

OTHER PUBLICATIONS

"From longitudinal recording to perpendicular recording Challenge to unexplored field in HDD" In the 8th MMM–Intermag Joint Conference Nikkei Electronics (No. 789) published on Feb. 12, 2001 w/ English translation.

* cited by examiner

Primary Examiner—Robert S. Tupper
(74) Attorney, Agent, or Firm—Oliff & Berridge, PLC

(57) ABSTRACT

Provided is a thin film magnetic head capable of ensuring the strength of a perpendicular magnetic field and improving recording performance. A bottom pole portion layer and a top pole portion layer constituting a part of a main magnetic pole are formed so that a cross sectional area of a complex including front end portions of the bottom pole portion layer and the top pole portion layer is smaller than a cross sectional area of a complex including rear end portions thereof, and a width of a top edge in an exposed surface is larger than a width of a bottom edge, and is equal to or larger than a width of the exposed surface in a middle position between the top edge and the bottom edge. In recording, magnetic fluxes flowing in a main magnetic pole are focused toward an air bearing surface, and are concentrated on the front end portion of the top pole portion layer which is a main emitting portion of the magnetic fluxes, so sufficient magnetic fluxes can be supplied to the air bearing surface.

7 Claims, 31 Drawing Sheets

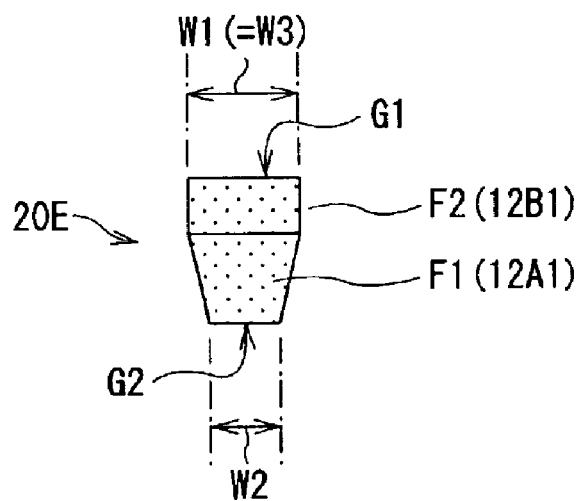
FIG. 7
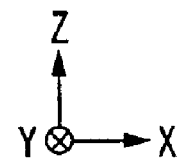
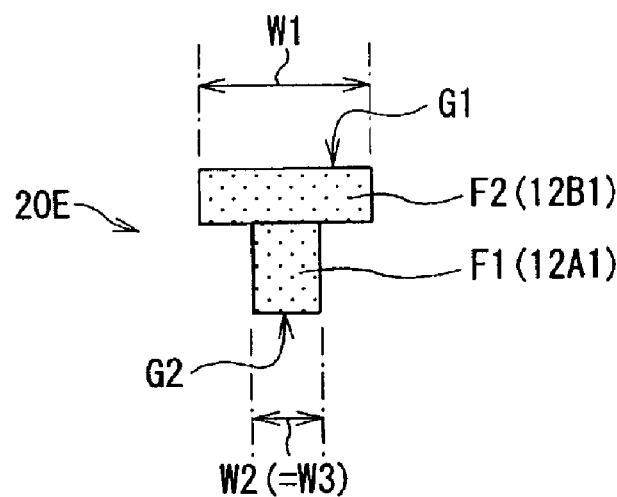
FIG. 8
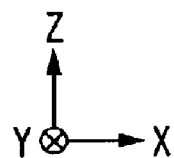

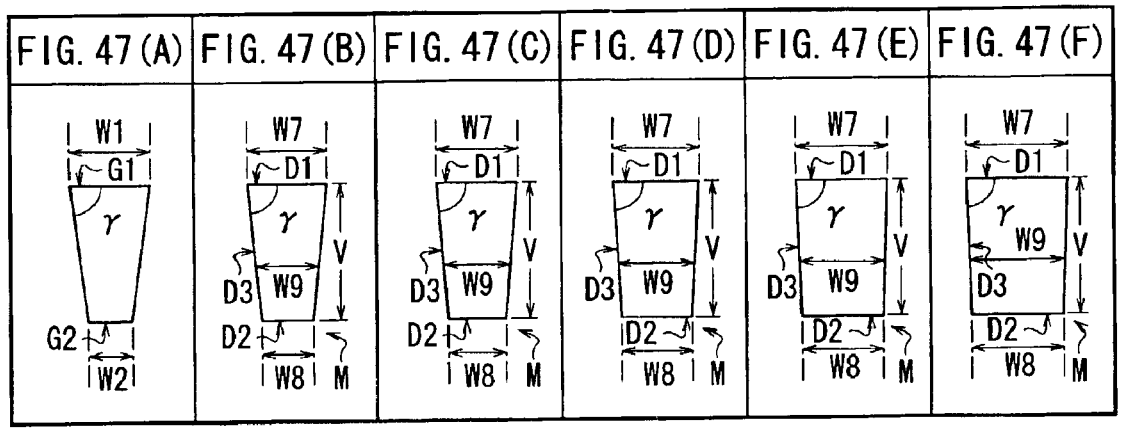
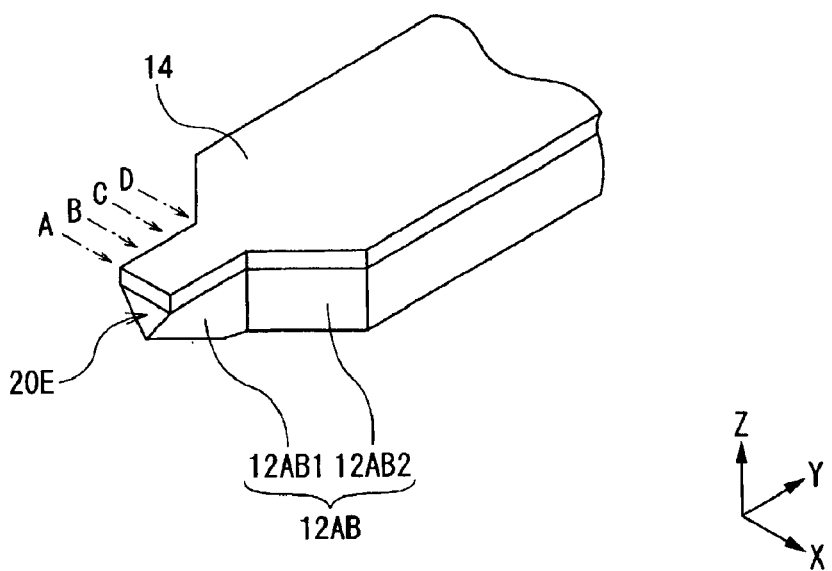
FIG. 48

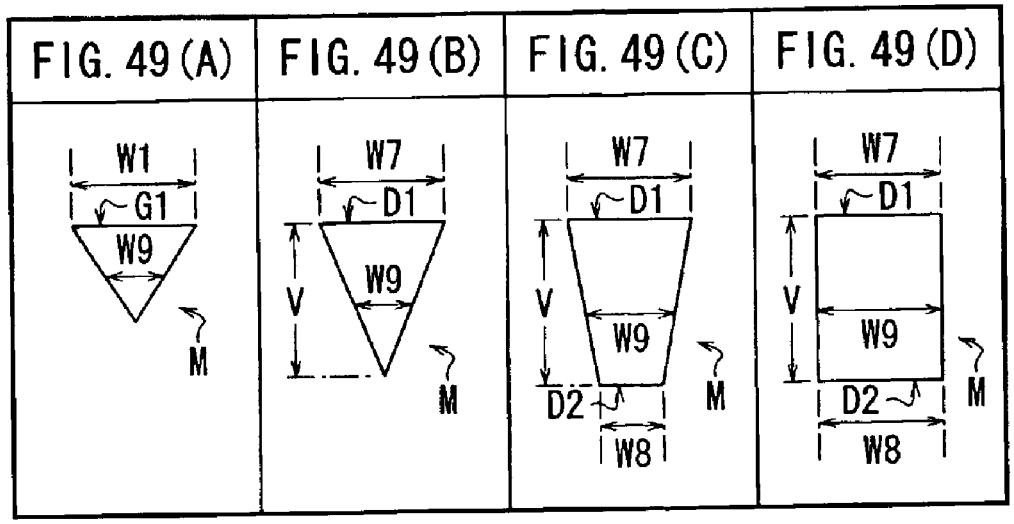
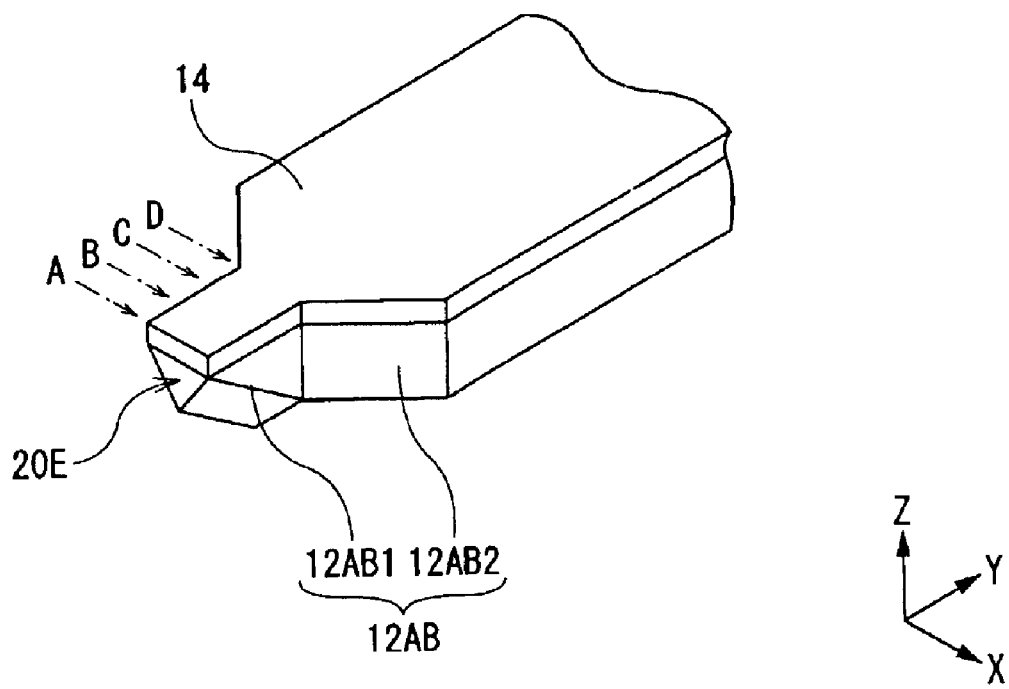
FIG. 50

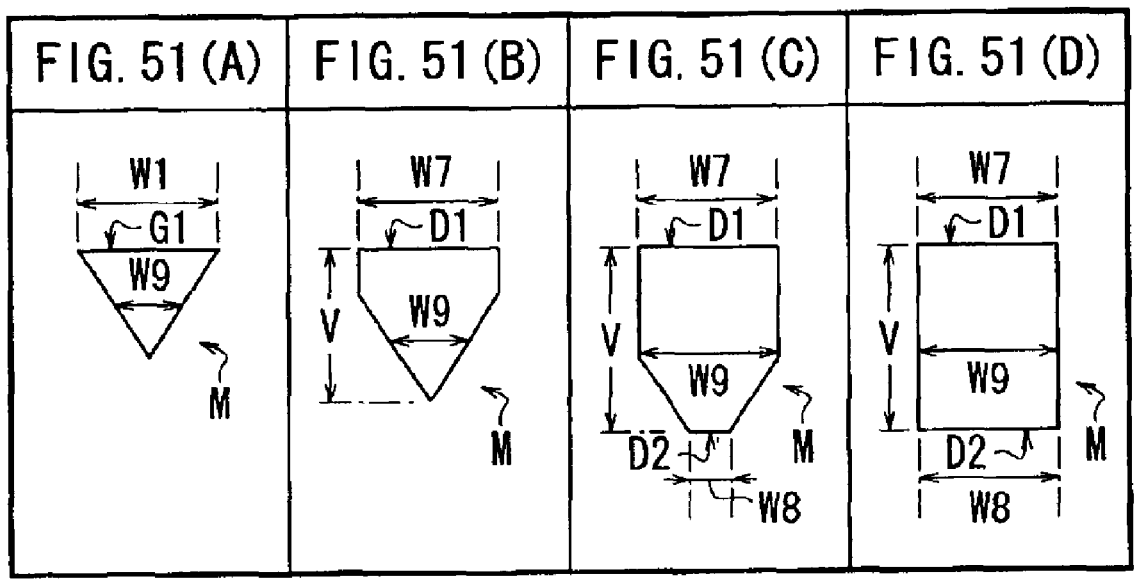

THIN FILM MAGNETIC HEAD AND METHOD OF MANUFACTURING THE SAME

BACKGROUND OF THE INVENTION

1. Field of the Invention

The present invention relates to a thin film magnetic head having at least an inductive magnetic transducer for writing, and a method of manufacturing the same.

2. Description of the Related Art

In recent years, an improvement in performance of thin film magnetic heads has been sought in accordance with an increase in the areal recording density of hard disk drives. As magnetic recording systems applicable for the hard disk drives, for example, a longitudinal recording system that a signal magnetic field is oriented in an in-plane direction of a recording medium (a longitudinal direction) and a perpendicular recording system that the signal magnetic field is oriented in a direction perpendicular to the recording medium are well-known. At present, the longitudinal recording system is widely used, but the perpendicular recording system instead of the longitudinal recording system holds promise for future, because the perpendicular recording system can obtain an advantage that, for example, a recording medium in which data has been already recorded has resistance to thermal decay effects, and higher liner recording density can be achieved.

As recording modes using the perpendicular recording system, for example, a mode of recording in a single-layer recording medium by the use of a ring head comprising two magnetic layers facing each other with a gap in between on a side of an end and magnetically coupled to each other on a side of the other end, a mode of recording in a two-layer recording medium by the use of a single-layer head (single pole type head) and so on have been proposed. Among them, in the mode using a single-layer head and a two-layer recording medium, resistance to thermal decay is extremely superior, so it becomes a focus of attention as a mode which can improve the performance of the thin film magnetic heads.

In order to improve recording performance of a single-layer thin film magnetic head using the perpendicular recording system, it is required to emit necessary and sufficient magnetic fluxes from a head (main magnetic pole) to increase as high strength of the perpendicular magnetic field as possible. Techniques for increasing the strength of the perpendicular magnetic field include, for example, a technique of comprising the main magnetic pole with a cross sectional area parallel to a recording-medium-facing surface (air bearing surface) facing the recording medium which is reduced with increasing proximity to the air bearing surface. A specific example of the technique is described in, for example, a specification (Japanese Patent Application No. 2000-343245) applied by Sato et al. The main magnetic pole described in the specification has a structure that the width of the main magnetic pole is reduced with increasing proximity to the air bearing surface. As for the main magnetic pole, according to reduction in the cross sectional area, magnetic fluxes passing through the main magnetic pole are gradually concentrated, so the magnetic fluxes reach an edge of the main magnetic pole.

Moreover, in Page 67 of Nikkei Electronics No. 789 (Feb. 12, 2001), a structure that a bottom portion of a magnetic pole is partially removed is introduced.

However, in spite of various considerations of the structure of the main magnetic pole in conventional thin film magnetic heads using the perpendicular recording system, the strength of the perpendicular magnetic field is still not sufficient enough in view of future movement in areal recording density which is expected to be further increased. In order to prove the practicability and future potential of the perpendicular recording system to expand the use of high-capacity hard disk drives using the perpendicular recording system, securing as high strength of the perpendicular magnetic field as possible is an urgent matter.

Incidentally, the structure of the magnetic pole introduced in the above Nikkei Electronics is considered to be useful for securing the strength of the perpendicular magnetic field. However, a specific manufacturing method which is important to implement the structure of the magnetic pole is not described, so it is uncertain about whether the structure of the magnetic pole can be actually manufactured and whether it is useful.

SUMMARY OF THE INVENTION

In view of the foregoing, it is a first object of the invention to provide a thin film magnetic head capable of securing the strength of a perpendicular magnetic field and improving recording performance.

Moreover, it is a second object of the invention to provide a method of manufacturing a thin film magnetic head which can easily manufacture the thin film magnetic head of the invention by use of existing manufacturing techniques.

A thin film magnetic head according to a first aspect of the invention is used for a magnetic recording/reproducing apparatus including a recording medium moving to a predetermined direction of movement, and the thin film magnetic head comprises: a first and a second magnetic layers including pole portions facing each other in a recording-medium-facing surface facing the recording medium and its vicinity, and being magnetically coupled to each other in a position far from the recording-medium-facing surface; a gap layer being disposed between the pole portions facing each other; and a thin film coil being disposed between the first and the second magnetic layers in a state of being insulated from the first and the second magnetic layers, wherein the second magnetic layer includes a track width determining portion having an exposed surface exposed to the recording-medium-facing surface and determining a recording track width of the recording medium, and the exposed surface includes a first edge positioned on a medium-outgoing side in the direction of movement and a second edge positioned on a medium-incoming side in the direction of movement, and a width of the first edge is larger than a width of the second edge, and is equal to or larger than a width of the exposed surface in any middle position between the first and the second edges.

Herein, when the movement of the recording medium is considered as a flow, "a medium-outgoing side" means a side where the flow outgoes, and "a medium-incoming side" means a side where the flow incomes.

In the thin film magnetic head according to the first aspect of the invention, the width of the first edge is larger than the width of the second edge, and is equal to or larger than the width of the exposed surface in any middle position between the first and the second edges, so magnetic fluxes flowing into the track width determining portion are concentrated on the medium-outgoing side of the track width determining portion in the vicinity of the gap layer.

A thin film magnetic head according to a second aspect of the invention is used for a magnetic recording/reproducing apparatus including a recording medium moving to a predetermined direction of movement, and the thin film magnetic head comprises: a first and a second magnetic layers including pole portions facing each other in a recording-medium-facing surface facing the recording medium and its vicinity, and being magnetically coupled to each other in a position far from the recording-medium-facing surface; a gap layer being disposed between the pole portions facing each other; and a thin film coil being disposed between the first and the second magnetic layers in a state of being insulated from the first and the second magnetic layers, wherein the second magnetic layer includes a track width determining portion having an exposed surface exposed to the recording-medium-facing surface and determining a recording track width of the recording medium, and the track width determining portion includes a laminate of a first magnetic film extending from a predetermined position far from the recording-medium-facing surface to a direction away from the recording-medium-facing surface and a second magnetic film with an end surface corresponding to a film thickness in order from a medium-incoming side in the direction of movement, and the end surface constitutes the exposed surface.

In the thin film magnetic head according to the second aspect of the invention, all portions of the second magnetic film corresponding to a film thickness are exposed to the recording-medium-facing surface, on the other hand, the first magnetic film is not exposed to the recording-medium-facing surface, so magnetic fluxes flowing into the track width determining portion are concentrated on the second magnetic film in the vicinity of the gap layer.

In a method of manufacturing a thin film magnetic head according to a first aspect of the invention, the thin film magnetic head is used for a magnetic recording/reproducing apparatus including a recording medium moving to a predetermined direction of movement, and comprises a first and a second magnetic layers including pole portions facing each other in a recording-medium-facing surface facing the recording medium and its vicinity, and being magnetically coupled to each other in a position far from the recording-medium-facing surface, a gap layer being disposed between the pole portions facing each other, and a thin film coil being disposed between the first and the second magnetic layers in a state of being insulated from the first and the second magnetic layers, and the method comprises the step of forming the second magnetic layer so as to include a track width determining portion having an exposed surface exposed to the recording-medium-facing surface and determining a recording track width of the recording medium, wherein the exposed surface has a first edge positioned on a medium-outgoing side in the direction of movement and a second edge positioned on a medium-incoming side in the direction of movement, and a width of the first edge is larger than a width of the second edge, and is equal to or larger than a width of the exposed surface in any middle position between the first and the second edges.

In the method of manufacturing a thin film magnetic head according to the first aspect of the invention, the second magnetic layer is formed so as to include the track width determining portion having the exposed surface exposed to the recording-medium-facing surface and determining the recording track width of the recording medium. In this case, the track width determining portion is formed so that the exposed surface has the first edge positioned on the medium-outgoing side in the direction of movement and the second edge positioned on the medium-incoming side in the direction of movement, and the width of the first edge is larger than the width of the second edge, and is equal to or larger than the width of the exposed surface in any middle position between the first and the second edges.

In a method of manufacturing a thin film magnetic head according to a second aspect of the invention, the thin film magnetic head is used for a magnetic recording/reproducing apparatus including a recording medium moving to a predetermined direction of movement, and comprises a first and a second magnetic layers including pole portion facing each other in a recording-medium-facing surface facing the recording medium and its vicinity, and being magnetically coupled to each other in a position far from the recording-medium-facing surface, a gap layer being disposed between the pole portions facing each other, and a thin film coil being disposed between the first and the second magnetic layers in a state of being insulated from the first and the second magnetic layers, and the method comprising the steps of: laminating two precursory magnetic films on the gap layer in order; and processing the two precursory magnetic films to form the recording-medium-facing surface, thereby forming the second magnetic layer so as to have a laminate including a first magnetic film having a first exposed surface exposed to the recording-medium-facing surface and a second magnetic film having a second exposed surface exposed to the recording-medium-facing surface in this order, wherein the second exposed surface has a first edge positioned on a medium-outgoing side in the direction of movement and the first exposed surface has a second edge positioned on a medium-incoming side in the direction of movement, and a width of the first edge is larger than a width of the second edge, and is equal to or larger than a width of the exposed surface in any middle position between the first and the second edges.

In the method of manufacturing a thin film magnetic head according to the second aspect of the invention, after two precursory magnetic films are laminated in order on the gap layer, the two precursory magnetic films are processed to form the recording-medium-facing surface, and thereby the second magnetic layer is formed so as to have a laminate including the first magnetic film having the first exposed surface exposed to the recording-medium-facing surface and the second magnetic film having the second exposed surface exposed to the recording-medium-facing surface in this order. In this case, the second magnetic layer is formed so that the second exposed surface has the first edge positioned on the medium-outgoing side in the direction of the movement and the first exposed surface has the second edge positioned on the medium-incoming side in the direction of movement, and the width of the first edge is larger than the width of the second edge, and is equal to or larger than the width of the exposed surface in any middle position between the first and the second edges.

In a method of manufacturing a thin film magnetic head according to a third aspect of the invention, the thin film magnetic head is used for a magnetic recording/reproducing apparatus including a recording medium moving to a predetermined direction of movement, and comprises a first and a second magnetic layers including pole portions facing each other on a recording-medium-facing surface facing the recording medium and its vicinity, and being magnetically coupled to each other in a position far from the recording-medium-facing surface, a gap layer being disposed between the pole portions facing each other, and a thin film coil being disposed between the first and the second magnetic layers in a state of being insulated from the first and the second magnetic layers, and the second magnetic layer includes a track width determining portion having an exposed surface exposed to the recording-medium-facing surface and determining a recording track width of the recording medium, and the method comprises the steps of: forming a first precursory magnetic layer pattern as a preparatory layer of the second magnetic layer on the gap layer; forming a non-magnetic layer pattern on the first precursory magnetic layer pattern; forming a second precursory magnetic layer pattern through selectively dry etching the first precursory magnetic layer pattern by use of the non-magnetic layer pattern as a mask, while an ion beam is applied from a direction forming an angle of 45° or over with a direction orthogonal to an extending surface of the first precursory magnetic layer pattern; and processing the second precursory magnetic layer pattern to form the recording-medium-facing surface, thereby forming the second magnetic layer so that the track width determining portion constitutes the exposed surface, wherein the exposed surface of the track width determining portion has a first edge positioned on a medium-outgoing side in the direction of movement and a second edge positioned on a medium-incoming side in the direction of movement, and a width of the first edge is larger than a width of the second edge, and is equal to or larger than a width of the exposed surface in any middle position between the first and the second edges.

In the method of manufacturing a thin film magnetic head according to the third aspect of the invention, at first, the first precursory magnetic layer pattern as a preparatory layer of the second magnetic layer is formed on the gap layer. Then, the non-magnetic layer pattern is formed on the first precursory magnetic layer pattern. Next, while an ion beam is applied from a direction forming an angle of 45° or over with a direction orthogonal to an extending surface of the first precursory magnetic layer pattern, the first precursory magnetic layer pattern is selectively dry etched by use of the non-magnetic layer pattern as a mask to form the second precursory magnetic layer pattern. Finally, the second precursory magnetic layer pattern is processed to form the recording-medium-facing surface, thereby the second magnetic layer is formed so that the track width determining portion constitutes the exposed surface. In this case, the track width determining portion is formed so that the exposed surface thereof has the first edge positioned on the medium-outgoing side in the direction of movement and the second edge positioned on the medium-incoming side in the direction of movement, and the width of the first edge is larger than the width of the second edge, and is equal to or larger than the width of the exposed surface in any middle position between the first and the second edges.

In a method of manufacturing a thin film magnetic head according to a fourth aspect of the invention, the thin film magnetic head is used for a magnetic recording/reproducing apparatus including a recording medium moving to a predetermined direction of movement, and comprises a first and a second magnetic layers including pole portions facing each other on a recording-medium-facing surface facing the recording medium and its vicinity, and being magnetically coupled to each other in a position far from the recording-medium-facing surface, a gap layer being disposed between the pole portions facing each other, and a thin film coil being disposed between the first and the second magnetic layers in a state of being insulated from the first and the second magnetic layers, and the second magnetic layer includes a track width determining portion having an exposed surface exposed to the recording-medium-facing surface and determining a recording track width of the recording medium, and the method comprises the steps of: forming a first precursory magnetic layer pattern as a preparatory layer of the second magnetic layer on the gap layer; forming a coating layer made of a predetermined non-magnetic material so as to coat surroundings of a portion of the first precursory magnetic layer pattern on a side far from the gap layer; forming a second precursory magnetic layer pattern through selectively dry etching the first precursory magnetic layer pattern by use of the coating layer as a mask while an ion beam is applied from a direction forming a predetermined angle with a direction orthogonal to an extending surface of the first precursory magnetic layer pattern,; and processing the second precursory magnetic layer pattern to form the recording-medium-facing surface, thereby forming the second magnetic layer so that the track width determining portion constitutes the exposed surface, wherein the exposed surface of the track width determining portion has a first edge positioned on a medium-outgoing side in the direction of movement and a second edge positioned on a medium-incoming side in the direction of movement, and a width of the first edge is larger than a width of the second edge, and is equal to or larger than a width of the exposed surface in any middle position between the first and the second edges.

In the method of manufacturing a thin film magnetic head according to the fourth aspect of the invention, at first, the first precursory magnetic layer pattern as the preparatory layer of the second magnetic layer is formed on the gap layer. Then, the coating layer made of a predetermined non-magnetic material is formed so as to coat surroundings of a portion of the first precursory magnetic layer pattern on a side far from the gap layer. Next, while an ion beam is applied from a direction forming a predetermined angle with a direction orthogonal to an extending surface of the first precursory magnetic layer pattern, the first precursory magnetic layer pattern is selectively dry etched by use of the coating layer as a mask to form the second precursory magnetic layer pattern. Then, the second precursory magnetic layer pattern is processed to form the recording-medium-facing surface, thereby the second magnetic layer is formed so that the track width determining portion constitutes the exposed surface. In this case, the track width determining portion is formed so that the exposed surface thereof has the first edge positioned on the medium-outgoing side in the direction of movement and the second edge positioned on the medium-incoming side in the direction of movement, and the width of the first edge is larger than the width of the second edge, and is equal to or larger than the width of the exposed surface in any middle position between the first and the second edges.

In a method of manufacturing a thin film magnetic head according to a fifth aspect of the invention, the thin film magnetic head is used for a magnetic recording/reproducing apparatus including a recording medium moving to a predetermined direction of movement, and comprises a first and a second magnetic layers including pole portions facing each other on a recording-medium-facing surface facing the recording medium and its vicinity, and being magnetically coupled to each other in a position far from the recording-medium-facing surface, a gap layer being disposed between the pole portions facing each other, and a thin film coil being disposed between the first and the second magnetic layers in a state of being insulated from the first and the second magnetic layers, and the second magnetic layer includes a track width determining portion having an exposed surface exposed to the recording-medium-facing surface and determining a recording track width of the recording medium, and the method comprises the steps of: forming a first precursory magnetic layer pattern as a preparatory layer of the second magnetic layer on the gap layer; forming a coating layer made of a predetermined non-magnetic material so as to coat surroundings of a portion of the first precursory magnetic layer pattern on a side far from the gap layer; selectively etching a portion of the first precursory magnetic layer pattern on a side near the gap layer by use of the coating layer as a mask through wet etching using a predetermined etchant to form a second precursory magnetic layer pattern; and processing the second precursory magnetic layer pattern to form the recording-medium-facing surface, thereby forming the second magnetic layer so that the track width determining portion constitutes the exposed surface, wherein the exposed surface of the track width determining portion has a first edge positioned on a medium-outgoing side in the direction of movement and a second edge positioned on a medium-incoming side in the direction of movement, and a width of the first edge is larger than a width of the second edge, and is equal to or larger than a width of the exposed surface in any middle position between the first and the second edges.

In the method of manufacturing a thin film magnetic head according to the fifth aspect of the invention, at first, the first precursory magnetic layer pattern as the preparatory layer of the second magnetic layer is formed on the gap layer. Then, the coating layer made of a predetermined non-magnetic material is formed so as to coat surroundings of a portion of the first precursory magnetic layer pattern on a side far from the gap layer. Next, a portion of the first precursory magnetic layer pattern on a side near the gap layer is selectively etched by use of the coating layer as a mask through wet etching using a predetermined etchant to form the second precursory magnetic layer pattern. Finally, the second precursory magnetic layer pattern is processed to form the recording-medium-facing surface, thereby the second magnetic layer is formed so that the track width determining portion constitutes the exposed surface. In this case, the track width determining portion is formed so that the exposed surface thereof has the first edge positioned on the medium-outgoing side in the direction of movement and the second edge positioned on the medium-incoming side in the direction of movement, and the width of the first edge is larger than the width of the second edge, and is equal to or larger than the width of the exposed surface in any middle position between the first and the second edges.

A thin film magnetic head according to a third aspect of the invention comprises: a first and a second magnetic layers including pole portions facing each other on a recording-medium-facing surface facing the recording medium and its vicinity, and being magnetically coupled to each other in a position far from the recording-medium-facing surface; a gap layer being disposed between the pole portions facing each other; and a thin film coil being disposed between the first and the second magnetic layers in a state of being insulated from the first and the second magnetic layers, wherein the second magnetic layer includes a coupling structure having a first magnetic layer portion having an exposed surface exposed to the recording-medium-facing surface, being disposed so as to extend from the recording-medium-facing surface to a predetermined coupling position far from the recording-medium-facing surface, and determining a recording track width of the recording medium, and a second magnetic layer portion being magnetically coupled to the first magnetic layer portion in the coupling position, and extending in a direction away from the recording-medium-facing surface, and the exposed surface of the first magnetic layer portion includes a first edge positioned on a side far from the gap layer, and a second edge positioned on a side near the gap layer, and a width of the first edge is larger than a width of the second edge, and is equal to or larger than a width of exposed surface in any middle position between the first and the second edges.

A thin film magnetic head according to a fourth aspect of the invention comprises: a first and a second magnetic layers including pole portions facing each other on a recording-medium-facing surface facing the recording medium and its vicinity, and being magnetically coupled to each other in a position far from the recording-medium-facing surface; a gap layer being disposed between the pole portions facing each other; and a thin film coil being disposed between the first and the second magnetic layers in a state of being insulated from the first and the second magnetic layers, wherein the second magnetic layer includes a coupling structure having a first magnetic layer portion having an exposed surface exposed to the recording-medium-facing surface, being disposed so as to extend from the recording-medium-facing surface to a predetermined coupling position far from the recording-medium-facing surface, and determining a recording track width of the recording medium, and a second magnetic layer portion being magnetically coupled to the first magnetic layer portion in the coupling position, and extending in a direction away from the recording-medium-facing surface, and the exposed surface of the first magnetic layer portion includes a first edge positioned on a side far from the gap layer, and a second edge positioned on a side near the gap layer, and a width of the second edge is larger than a width of the first edge, and is equal to or larger than a width of the exposed surface in any middle position between the first and the second edges.

In the thin film magnetic head according to the third or the fourth aspect of the invention, magnetic fluxes flowing into the first magnetic layer portion are concentrated on a side of an edge with a larger width that is either an edge on a side far from the gap layer or an edge on a side in the vicinity of the gap layer.

In the thin film magnetic head according to the first aspect of the invention, the track width determining portion may have a portion where an area of a cross sectional surface parallel to the recording-medium-facing surface is uniform irrespective of a distance from the recording-medium-facing surface.

In the thin film magnetic head according to the first aspect of the invention, the track width determining portion may have a portion where an area of a cross sectional surface parallel to the recording-medium-facing surface is reduced with increasing proximity to the recording-medium-facing surface. In this case, a cross sectional surface of the track width determining portion parallel to the recording-medium-facing surface has a first cross sectional edge positioned on the medium-outgoing side and a second cross sectional edge positioned on the medium-incoming side, and a width of the first cross sectional edge is larger than a width of the second cross sectional surface, and is equal to or larger than a width of the cross sectional surface in any middle position between the first and the second cross sectional edges. In addition, at least one of the width of the first cross sectional edge or an angle of each end thereof may be reduced with increasing proximity to the recording-medium-facing surface, and a height with the first cross sectional edge as a base may be uniform irrespective of a distance from the recording-medium-facing surface, or the width of the first cross sectional edge may be uniform irrespective of a distance from the recording-medium-facing surface, and the width of the second cross sectional edge may be reduced with increasing proximity to the recording-medium-facing surface. In the latter case, the cross sectional surface of the track width determining portion parallel to the recording-medium-facing surface may have a shape changed from a rectangular shape to a triangular shape through a trapezoidal shape with increasing proximity to the recording-medium-facing surface, and the exposed surface may have a triangular shape, and a height with the first cross sectional edge as a base in a section where the cross sectional surface of the track width determining portion parallel to the recording-medium-facing surface has a triangular shape may be reduced toward the medium-outgoing side with increasing proximity to the recording-medium-facing surface. Alternatively, the cross sectional surface of the track width determining portion parallel to the recording-medium-facing surface may have a shape changed from a rectangular shape to a pentagonal shape composed of a combination of a rectangle and a triangle through a hexagonal shape composed of a combination of a rectangle and a trapezoid with increasing proximity to the recording-medium-facing surface, and the exposed surface may have a triangular shape, and a height with the first cross sectional edge as a base may be reduced toward the medium-outgoing side with increasing proximity to the recording-medium-facing surface in a section where the cross sectional surface of the track width determining portion parallel to the recording-medium-facing surface has a pentagonal shape composed of a combination of a rectangle and a triangle.

In the thin film magnetic head according to the first aspect of the invention, the exposed surface may include a first region on the medium-incoming side and a second region on the medium-outgoing side, and a width of the first region may be reduced with increasing proximity to the second edge, and a width of the second region may be uniform irrespective of a distance from the second edge.

In the thin film magnetic head according to the first aspect of the invention, the exposed surface may include a first region on the medium-incoming side and a second region on the medium-outgoing side, and a width of the first region and a width of the second region may be uniform irrespective of a distance from the second edge.

In the thin film magnetic head according to the first aspect of the invention, the exposed surface may include a first region on the medium-incoming side and a second region on the medium-outgoing side, a width of the first region and a width of the second region may be reduced with increasing proximity to the second edge, and there may be a step in a boundary portion between the first region and the second portion. In this case, an angle between a side edge of the second region and the first edge in the exposed surface is preferably within a range of 70 degrees or over and less than 90 degrees.

In the thin film magnetic head according to the first aspect of the invention, a width of the exposed surface may be reduced with increasing proximity to the second edge.

In the thin film magnetic head according to the first aspect of the invention, the exposed surface may include a first region on the medium-incoming side and a second region on the medium-outgoing side, and a width of the first region may be uniform irrespective of a distance from the second edge, and a width of the second region may be reduced with increasing proximity to the second edge.

In the thin film magnetic head according to the first aspect of the invention, the track width determining portion may include a first magnetic film and a second magnetic film laminated in order from the medium-incoming side, and the first and the second magnetic films may constitute the exposed surface, or only the second magnetic film out of the first and the second magnetic films may constitute the exposed surface.

In the thin film magnetic head according to the first aspect of the invention, the second magnetic film preferably has higher saturated magnetic flux density than the first magnetic film.

In the thin film magnetic head according to the first aspect of the invention, the gap layer preferably has a larger thickness than the second magnetic layer in the recording-medium-facing surface.

In the thin film magnetic head according to the second aspect of the invention, a width of the exposed surface of the second magnetic film is preferably uniform irrespective of a distance from the first magnetic film.

In the method of manufacturing a thin film magnetic head according to the first aspect of the invention, the second magnetic layer may be formed so that the exposed surface of the track width determining portion includes a first region on the medium-incoming side and a second region on the medium-outgoing side, and a width of the first region and a width of the second region are reduced with increasing proximity to the second edge, and there is a step in a boundary portion between the first region and the second portion. In this case, the second magnetic layer is preferably formed so that an angle between a side edge of the second region and the first edge in the exposed surface of the track width determining portion is within a range of 70 degrees or over and less than 90 degrees.

In the method of manufacturing a thin film magnetic head according to the first aspect of the invention, the second magnetic layer may be formed so that a width of the exposed surface of the track width determining portion is reduced with increasing proximity to the second edge.

In the method of manufacturing a thin film magnetic head according to the first aspect of the invention, the second magnetic layer may be formed so that the exposed surface of the track width determining portion includes a first region on the medium-incoming side and a second region on the medium-outgoing side, and a width of the first region is uniform irrespective of a distance from the second edge, and a width of the second region is reduced with increasing proximity to the second edge.

In the method of manufacturing a thin film magnetic head according to the second aspect of the invention, a step of forming the first magnetic film may include the steps of patterning a photoresist film through photolithography to form a frame pattern having an aperture on the gap layer, and selectively growing a plating film on the aperture by use of the frame pattern as a mask to form the first magnetic film. In this case, an internal surface of the frame pattern in the aperture may be inclined to an extending surface of the gap layer, thereby the frame pattern may be formed so that the aperture is spread from a side near the gap layer to a side far from the gap layer.

In the method of manufacturing a thin film magnetic head according to the third aspect of the invention, while at least the first precursory magnetic layer is rotated about an axis orthogonal to an extending surface of the first precursory magnetic layer as a center, the first precursory magnetic layer is preferably etched.

In the method of manufacturing a thin film magnetic head according to the fourth aspect of the invention, in the step of forming the second precursory magnetic layer pattern, an ion beam is preferably applied from a direction forming an angle ranging from $37.5°±7.5°$.

In the method of manufacturing a thin film magnetic head according to the fourth aspect of the invention, the coating layer is preferably formed through sputtering.

In the method of manufacturing a thin film magnetic head according to the fourth aspect of the invention, the second magnetic layer may be formed so that a width of the exposed surface of the track width determining portion is reduced with increasing proximity to the second edge, and side edges of the exposed surface are curved.

In the method of manufacturing a thin film magnetic head according to the fifth aspect of the invention, the coating layer is preferably formed through sputtering.

In the method of manufacturing a thin film magnetic head according to the fifth aspect of the invention, as the non-magnetic material, a material with lower etching speed than the precursory magnetic layer pattern is preferably used. As the non-magnetic material, aluminum oxide is preferably used.

In the method of manufacturing a thin film magnetic head according to the fifth aspect of the invention, as the etchant, an iron (II) chloride solution is preferably used.

In the method of manufacturing a thin film magnetic head according to the fifth aspect of the invention, the second magnetic layer may be formed so that the exposed surface of the track width determining portion includes a first region on the medium-incoming side and a second region on the medium-outgoing side, and a width of the first region is uniform irrespective of a distance from the second edge, and a width of the second region is reduced with increasing proximity to the second edge.

In the thin film magnetic head according to the third or the fourth aspect of the invention, an area of a first cross sectional surface of the first magnetic layer portion parallel to the recording-medium-facing surface is preferably smaller than an area of a second cross sectional surface of the second magnetic layer portion parallel to the recording-medium-facing surface.

Other and further objects, features and advantages of the invention will appear more fully from the following description.

BRIEF DESCRIPTION OF THE DRAWINGS

FIG. 7 is a plan view of a modification to the structure of the exposed surface;

FIG. 8 is a plan view of another modification to the structure of the exposed surface;

FIGS. 47A through 47F are views of an exposed surface and a cross sectional surface of a main part in the pole portion layer shown in FIG. 46;

FIG. 48 is a perspective view of a further modification to the pole portion layer;

FIGS. 49A through 49D are views of the exposed surface and the cross sectional surface of a main part in the pole portion layer shown in FIG. 48;

FIG. 50 is a perspective view of a still further modification to the pole portion layer;

FIGS. 51A through 51D are views of the exposed surface and the cross sectional surface of a main part in the pole portion layer shown in FIG. 50.

DETAILED DESCRIPTION OF THE PREFERRED EMBODIMENTS

Preferred embodiments of the present invention will be described in more detail below referring to the accompanying drawings.

[First Embodiment]

Figure 1:
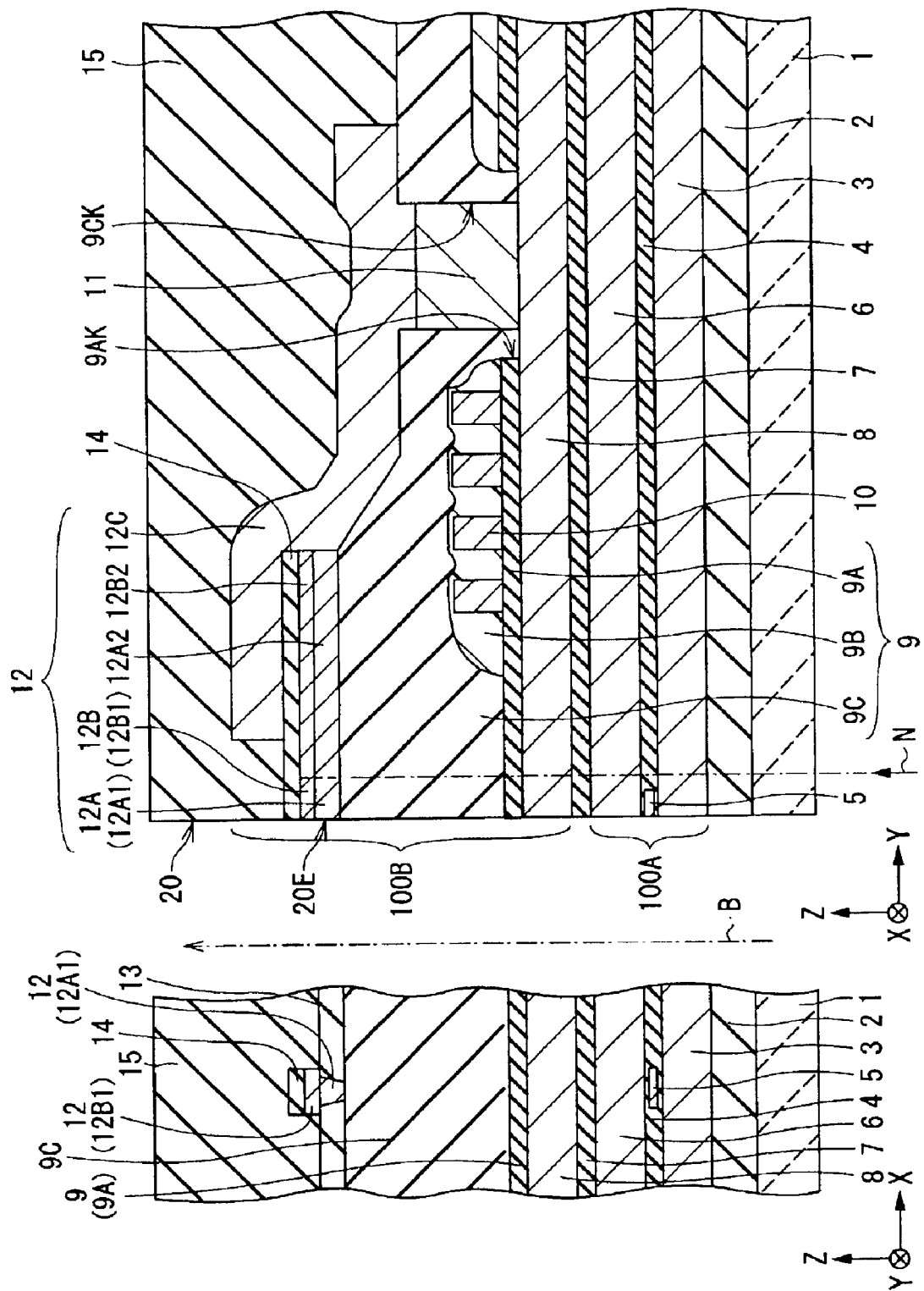
FIGS. 1A and 1B are sectional views of a thin film magnetic head according to a first embodiment of the invention.
Figure 2:
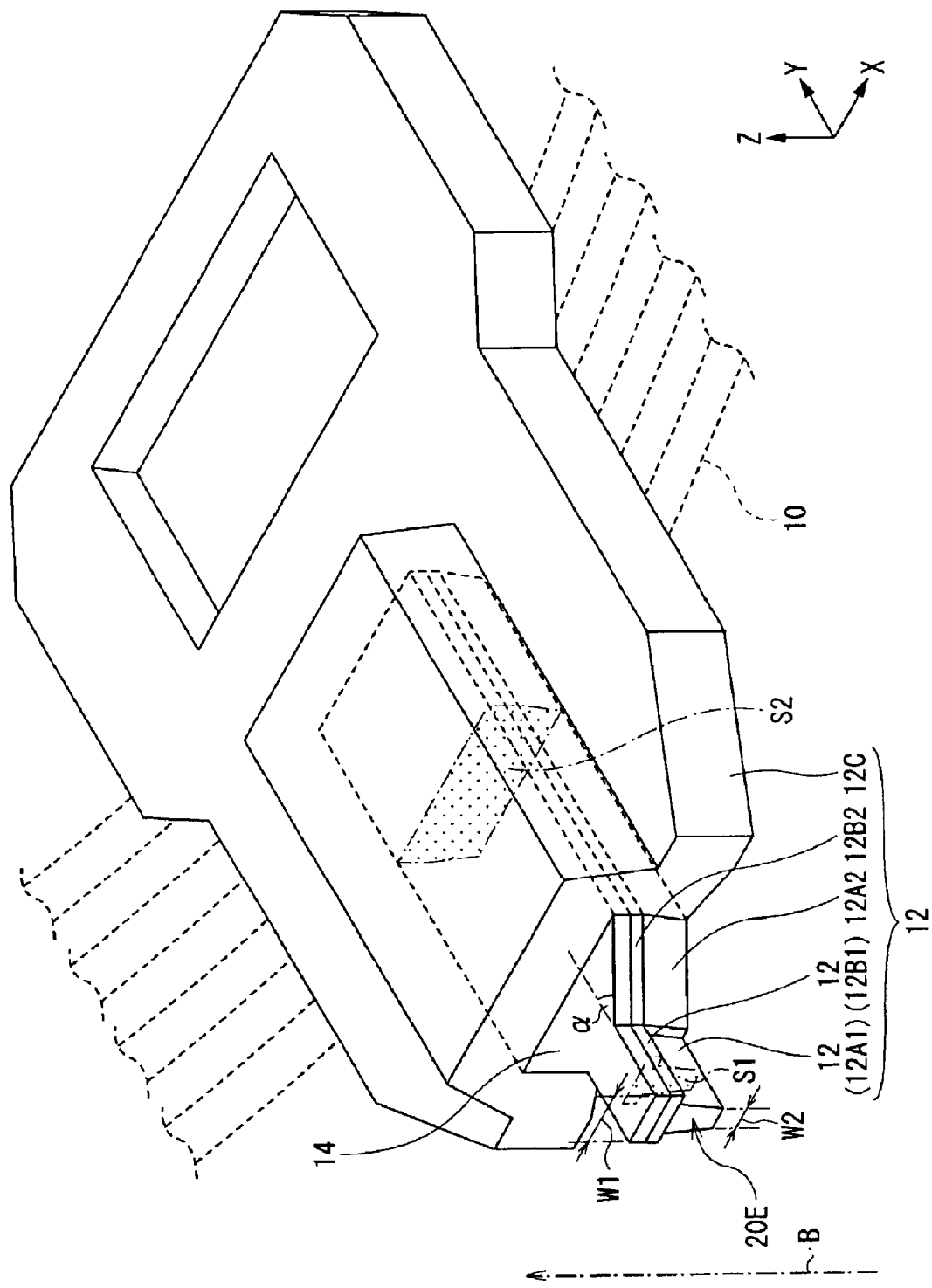
FIG. 2 is an enlarged perspective view of a main part of the thin film magnetic head shown in FIGS. 1A and 1B.
Figure 3:
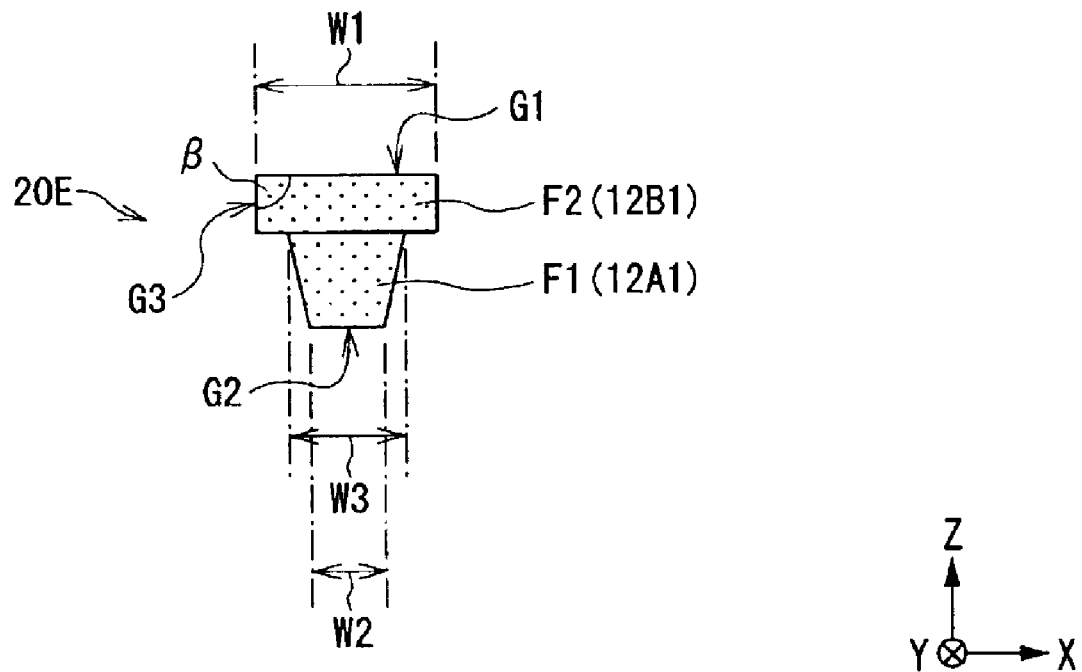
FIG. 3 is an enlarged plan view of an exposed surface of the main part of the thin film magnetic head shown in FIGS. 1A and 1B.

First of all, referring to FIGS. 1A through 3, the structure of a thin film magnetic head according to a first embodiment of the invention will be described below. FIGS. 1A and 1B show sectional views of the thin film magnetic head according to the embodiment. FIG. 2 shows an enlarged perspective view of a main part (a main magnetic pole) of the thin film magnetic head shown in FIGS. 1A and 1B. FIG. 3 shows an enlarged plan view of an exposed surface in the main magnetic pole shown in FIG. 2. FIG. 1A shows a sectional view parallel to an air bearing surface and FIG. 1B shows a sectional view perpendicular to the air bearing surface. An up arrow B in FIGS. 1A and 1B indicates a direction in which a recording medium moves relative to the thin film magnetic head, that is, a direction of movement of the recording medium.

In the following description, an X-axis direction, a Y-axis direction and a Z-axis direction in FIGS. 1A through 3 are expressed as "a width direction", "a length direction" and "a thickness (height) direction", respectively. Further the X-axis direction is expressed as "sideward", a side close to an air bearing surface in the Y-axis direction (or the side to form the air bearing surface in a later step) is expressed as "front or frontward", and the opposite side is expressed as "rear or rearward". In FIGS. 4 through 52B, these directions are expressed as the same.

The thin film magnetic head is mounted to a magnetic recording/reproducing apparatus such as, for example, a hard disk drive, and is a composite head capable of implementing two functions of recording and reproducing. As shown in FIGS. 1A and 1B, the thin film magnetic head comprises a laminate including an insulating layer 2 made of, for example, aluminum oxide ($Al_2O_3$; hereinafter simply referred to as "alumina"), a reproducing head 100A using a magnetoresistive (MR) effect, a non-magnetic layer 7 made of, for example, alumina, a recording head 100B of a perpendicular recording system and an overcoat layer 15 made of, for example, alumina or the like as a protective layer in this order on a substrate 1 made of a ceramic material such as AlTiC ($Al_2O_3$—TiC).

The reproducing head 100A mainly comprises, for example, a bottom shield layer 3, a shield gap film 4 and a top shield layer 6 laminated in this order. An MR device 5 as a reproducing device is buried in the shield gap film 4 so that a surface of the MR device 5 is exposed to a recording-medium-facing surface (air bearing surface) 20 facing a recording medium.

The bottom shield layer 3 and the top shield layer 6 are made of a magnetic material such as a nickel iron alloy (NiFe; hereinafter simply referred to as "Permalloy (trade name)") with a thickness of approximately 1.0 $\mu$m to 2.0 $\mu$m. The shield gap film 4 is provided to electrically separate the MR device 5 from its surroundings, and is made of, for example, a non-conductive and non-magnetic material such as alumina. The MR device 5 is made of, for example, a magnetic sensitive film exhibiting a magnetoresistive effect such as an anisotropic magnetoresistive (AMR) element, a giant magnetoresistive (GMR) element or a tunneling magnetoresistive (TMR) element.

The recording head 100B mainly comprises, for example, an auxiliary magnetic pole 8, a thin film coil 10 for generating magnetic fluxes buried in a gap layer 9 and a main magnetic pole 12 magnetically coupled to the auxiliary magnetic pole 8 through a coupling portion 11 disposed in an aperture 9CK in the gap layer 9 laminated in this order. Herein, the auxiliary magnetic pole 8 corresponds to a specific example of "a first magnetic layer" in the invention, and the coupling portion 11 and the main magnetic pole 12 correspond to a specific example of "a second magnetic layer" in the invention.

The auxiliary magnetic pole 8 is made of a material with a high saturated magnetic flux density such as Permalloy with a thickness of approximately 1.0 $\mu$m to 2.0 $\mu$m. The auxiliary magnetic pole 8 is disposed in a direction far opposite to the direction B of movement of the recording medium compared with the gap layer 9, that is, below the main magnetic pole 12.

The gap layer 9 comprises a gap layer portion 9A disposed on the auxiliary magnetic pole 8 and having an aperture 9AK, a gap layer portion 9B disposed on the gap layer portion 9A so as to coat gaps between windings of the thin film coil 10 and their surroundings, and a gap layer portion 9C disposed so as to coat the thin film coil 10 and the gap layer portions 9A and 9B and having an aperture 9CK in a position corresponding to the aperture 9AK. The gap layer 9 in the air bearing surface 20 has a thickness of approximately 2.0 $\mu$m to 5.0 $\mu$m, and, for example, the thickness of the gap layer 9 is equal to or larger than that of the coupling portion 11, and is larger than that of the main magnetic pole 12 in the air bearing surface 20.

The gap layer portion 9A is made of, for example, a non-conductive and non-magnetic material such as alumina, and has a thickness of approximately 0.1 μm to 1.0 μm. The gap layer portion 9B is made of, for example, a photoresist (photosensitive resin) exhibiting liquidity by heating, a spin-on glass (SOG) or the like. The gap layer portion 9C is made of a non-conductive and non-magnetic material having higher corrosion resistance, higher rigidity and higher insulation than the gap layer portion 9B such as alumina, silicon oxide ($SiO_2$) or the like.

The coupling portion 11 is made of, for example, a material with a high saturated magnetic flux density such as Permalloy or the like. The coupling portion 11 has a thickness of approximately 2.0 μm to 4.0 μm, a length of approximately 2.0 μm to 10.0 μm and a width of approximately 5.0 μm to 20.0 μm.

The thin film coil 10 is made of, for example, an electrically conductive material such as copper, and has a winding structure in a spiral shape while regarding the coupling portion 11 as a center. As the dimensions of the thin film coil 10, each winding has a thickness of approximately 0.3 μm to 2.0 μm (more specifically, approximately 1.3 μm), a width of approximately 0.8 μm and a pitch of approximately 1.3 μm. The dimensions of the thin film coil 10 are not necessarily limited to the above. For example, the width, the pitch and the number of windings can be freely set. The position of a top end of the thin film coil 10 is lower than the position of a top end of the coupling portion 11. In FIGS. 1A, 1B and 2, only a part of a plurality of windings constituting the thin film coil 10 is shown. In FIG. 2, for the purpose of clearly showing a positional relationship between the thin film coil 10 and the main magnetic pole 12, the thin film coil 10 is indicated by broken lines.

The main magnetic pole 12 is disposed, for example, in the same direction as a direction B of movement of the recording medium on the side much closer to the direction B than the gap layer 9, that is, above the auxiliary magnetic pole 8. The main magnetic pole 12 comprises a bottom pole portion layer 12A disposed on a front portion of the gap layer portion 9C, a top pole portion layer 12B disposed on the bottom pole portion layer 12A, a yoke portion layer 12C disposed so as to coat rear portions of the bottom pole portion layer 12A and the top pole portion layer 12B together with a buffer layer 14 disposed on the top pole portion layer 12B from their surroundings. An embedding layer 13 made of, for example, a non-conductive and non-magnetic material such as alumina is embedded in an adjacent region of the bottom pole portion layer 12A, and the position of an top end of the bottom pole portion layer 12A and the position of a top end of the embedding layer 13 coincide with each other.

The bottom pole portion layer 12A and the top pole portion layer 12B are made of, for example, a material with a high saturated magnetic flux density of approximately 1.4 T or over. As the materials of the bottom pole portion layer 12A and the top pole portion layer 12B, a material with a higher saturated magnetic flux density than the material of the yoke portion layer 12C is preferable. More specifically, for example, it is more preferable that the material of the top pole portion layer 12B has a higher saturated magnetic flux density than that of the bottom pole portion layer 12A. The materials with a high saturated magnetic flux density include, for example, a material including iron and nitrogen, a material including iron, zirconia and oxygen, a material including iron and nickel, and so on, and more specifically, at least one can be selected from Permalloy (45 wt % of Ni, 55 wt % of Fe), iron nidride (FeN), an iron-cobalt alloy (FeCo), an alloy including iron (FeM) and an alloy including iron and cobalt (FeCoM). The letter "M" in the above structural formulas (FeM, FeCoM) indicates, for example, at least one selected from the group consisting of nickel, nitrogen, carbon (C), boron (B), silicon, aluminum, titanium (Ti), zirconia, hafnium (Hf), molybdenum (Mo), tantalum (Ta), niobium (Nb) and copper. Herein, the bottom pole portion layer 12A corresponds to a specific example of "a first magnetic film" in the invention, and the top pole portion layer 12B corresponds to a specific example of "a second magnetic film" in the invention.

The bottom pole portion layer 12A includes, for example, a front end portion 12A1 extending from the air bearing surface 20 to a predetermined coupling position N in the rearward and a rear end portion 12A2 magnetically coupled to the front end portion 12A1 at the coupling position N. The bottom pole portion layer 12A has, for example, a thickness of approximately 0.2 μm and a length of approximately 2.0 μm or over (more specifically approximately 10.0 μm). As for the front end portion 12A1, for example, a thickness thereof is gradually reduced from a top end to a bottom end as a whole, and a side surface thereof forms a plane. The front end portion 12A1 has, for example, a top end width of approximately 0.2 μm, a bottom end width of approximately 0.1 μm and a length of approximately 0.1 μm to 0.5 μm. The rear end portion 12A2 has a structure including a rear portion with a uniform width (for example, 2.0 μm) larger than the front end portion 12A1, and a front portion with a width gradually reduced with increasing proximity to the front end portion 12A1. An angle α which a side end of the front portion in the rear end portion 12A2 forms with a extending direction of the bottom pole portion layer 12A (Y-axis direction) is, for example, approximately 45° or over, and preferably approximately 60°.

The top pole portion layer 12B includes a front end portion 12B1 corresponding to the front end portion 12A1 of the bottom pole portion layer 12A, and a rear end portion 12B2 corresponding to the rear end portion 12A2 in this order from the air bearing surface 20. The top pole portion layer 12B has, for example, a thickness of approximately 0.1 μm and a length of approximately 2.0 μm or over (more specifically approximately 10.0 μm). The front end portion 12B1 is a main part determining the recording track width of the recording medium, and has a uniform width larger than the front end portion 12A1. The front end portion 12B1 preferably has a width of, for example, approximately 0.5 μm or less, and preferably approximately 0.3 μm or less. The rear end portion 12B2 has, for example, substantially the same structure as the rear end portion 12A2 of the bottom pole portion layer 12A.

For example, the bottom pole portion layer 12A and the top pole portion layer 12B are exposed to the air bearing surface 20, and have an exposed surface 20E including exposed portions of the front end portions 12A1 and 12B1. Specifically, one end surface of the top pole portion layer 12B corresponding to the thickness of the top pole portion layer 12B is exposed to the air bearing surface 20. In the exposed surface 20E, a width W1 of a top edge (first edge) G1 disposed on a medium-outgoing side is larger than a width W2 of a bottom edge (second edge) G2 on a medium-incoming side (W1>W2). When the movement of the recording medium toward the direction B is considered as one flow, the "medium-outgoing side" means a side where the flow outgoes, and herein, the medium-outgoing side means, for example, a side away from the gap layer 9.

Further, the "medium-incoming side" means a side where the flow incomes, and herein, it means, for example, a side near the gap layer 9. The recording track width of the recording medium is mainly determined by the width W1 of the top edge G1 in the exposed surface 20E. Further, for example, a width of a region (first region) F1 of the exposed surface 20E corresponding to the front end portion 12A1 is gradually reduced from a width W3 to the width W2 with increasing proximity to the gap layer 9, and the region F1 is formed in an inverted trapezoidal shape (a trapezoid having a length of the top side longer than that of a bottom side). A region (second region) F2 corresponding to the front end portion 12B1 has the uniform width W1, and is formed in a rectangular shape. In other words, an angle β between a side edge G3 and the top edge G1 in the region F2 is, for example, 90°. Specifically, the width W1 of the top edge G1 is equal to or larger than a width of any middle portion between the top edge G1 and the bottom edge G2, for example, the width W3 of a boundary portion between the regions F1 and F2 (W1∞W3). In FIG. 3, for example, the width W1 of the top edge G1 is larger than the width W3 (W1>W3).

The yoke portion layer 12C mainly constitutes a flow path of magnetic fluxes by magnetically coupling the coupling portion 11, the bottom pole portion layer 12A and the top pole portion layer 12B, and has a thickness of approximately 1.0 $\mu$m to 6.0 $\mu$m. The yoke portion layer 12C is made of, for example, a material with a high saturated magnetic flux density of approximately 1.5 to 2.3 T, high corrosion resistance and higher resistance than the materials of the bottom pole portion layer 12A and the top pole portion layer 12B. When a material of the same composition system as those of the bottom pole portion layer 12A and the top pole portion layer 12B is used as the material of the yoke portion layer 12C the material preferably contains a low content of iron in order that the material of the yoke portion layer 12C has a lower saturated magnetic flux density than those of the bottom pole portion layer 12A and the top pole portion layer 12B.

The yoke portion layer 12C is magnetically coupled to both side surfaces and rear end surfaces of the rear end portion 12A2 of the bottom pole portion layer 12A and the rear end portion 12B2 of the top pole portion layer 12B. The yoke portion layer 12C is not exposed to the air bearing surface 20, and is disposed, for example, approximately 1.5 $\mu$m or over away from the air bearing surface 20.

For example, an area (hereinafter simply referred to as "cross sectional area") S1 of a cross sectional surface of a complex including the front end portions 12A1 and 12B1 parallel to the air bearing surface 20 is uniform irrespective of a distance from the air bearing surface 20. The cross sectional area S1 is smaller than an area (cross sectional area) S2 of a cross sectional surface of a complex including the rear end portions 12A2 and 12B2 parallel to the air bearing surface 20 (S1<S2). In other words, from the viewpoint of a structure of the main magnetic pole 12, the main magnetic pole 12 has a combined structure including the complex of the front end portions 12A1 and 12B1 and the complex of the rear end portion 12A2 and 12B2. Herein, the complex of the front end portions 12A1 and 12B1 corresponds to a specific example of "a track width determining portion" and "a first magnetic layer portion" in the invention, and the complex of the rear end portions 12A2 and 12B2 corresponds to a specific example of "a second magnetic layer portion" in the invention.

The buffer layer 14 is mainly used to form the front end portion 12B1 with high accuracy when the top pole portion layer 12B is formed. Functions of the buffer layer 14 in relation to forming the front end portion 12B1 with high accuracy will be described in detail later. The buffer layer 14 is made of, for example, a material with lower etching speed than the material of the top pole portion layer 12B. As the material of the buffer layer 14, for example, a material including titanium or tantalum, an inorganic non-conductive and non-magnetic material such as alumina or silicon oxide ($SiO_2$) or the like are cited. The buffer layer 14 is formed in, for example, a plane shape like the top pole portion layer 12B, and has a thickness of approximately 0.5 $\mu$m or less (more specifically approximately 0.3 $\mu$m).

Next, referring to FIGS. 1A, 2B and 2, actions of the thin film magnetic head will be described below. In the thin film magnetic head, information is recorded by the recording head 100B. In other words, when a current flows from an external circuit (not shown) to the thin film coil 10 in recording the information, thereby magnetic fluxes are generated. After the generated magnetic fluxes are stored in the auxiliary magnetic pole 8 and the main magnetic pole 12, the magnetic fluxes flow from the yoke portion layer 12C to the bottom pole portion layer 12A and the top pole portion layer 12B in the main magnetic pole 12. The magnetic fluxes flowing into the bottom pole portion layer 12A further flow to the front end portion 12A1, and the magnetic fluxes flowing into the top pole portion layer 12B further flow to the front end portion 12B1. In recording, when the recording medium moves toward the direction B of movement to the thin film magnetic head, a perpendicular magnetic field for recording is generated by the magnetic fluxes emitted from the exposed surface 20E to outside, and then the recording medium is partially magnetized by the perpendicular magnetic field in order to record the information.

On the other hand, in reproducing, a sense current flows into the MR film 5 of the reproducing head 100A. The resistance of the MR film 5 changes depending upon a signal magnetic field for reproducing from the recording medium, so a change in the resistance is detected by a change in the sense current to read the information recorded on the magnetic recording medium.

As described above, in the thin film magnetic head according to the embodiment, based on characteristic structures of the bottom pole portion layer 12A and the top pole portion layer 12B constituting a part of the main magnetic pole 12, the strength of the perpendicular magnetic field can be secured, and the recording performance can be improved mainly because of the following reasons.

The width W1 of the top edge G1 in the exposed surface 20E is larger than the width W2 of the bottom edge G2, so the magnetic fluxes passing through the interiors of the bottom pole portion layer 12A and the top pole portion layer 12B to reach the air bearing surface 20 are concentrated on the region F2 of the exposed surface 20E, the region F2 being a main emitting path of magnetic fluxes in recording. Further, the width W1 of the top edge G1 is larger than the width W3 of a middle portion between the top edge G1 and the bottom edge G2, so a sufficient area of the region F2 is secured to prevent a failure in emitting the magnetic fluxes, which may occur due to an insufficient area of the region F2. Thereby, the magnetic fluxes are adequately concentrated on the region F2 in the vicinity of the air bearing surface 20, so the strength of the perpendicular magnetic field can be secured. In addition, as described above, in consideration of the point that the magnetic fluxes are concentrated on the region F2, the thickness of the top pole portion layer 12B (the front end portion 12B1) is preferably approximately one-third to one-half of the sum of the thicknesses of the bottom pole portion layer 12A and the top pole portion layer 12B.

Figure 4:
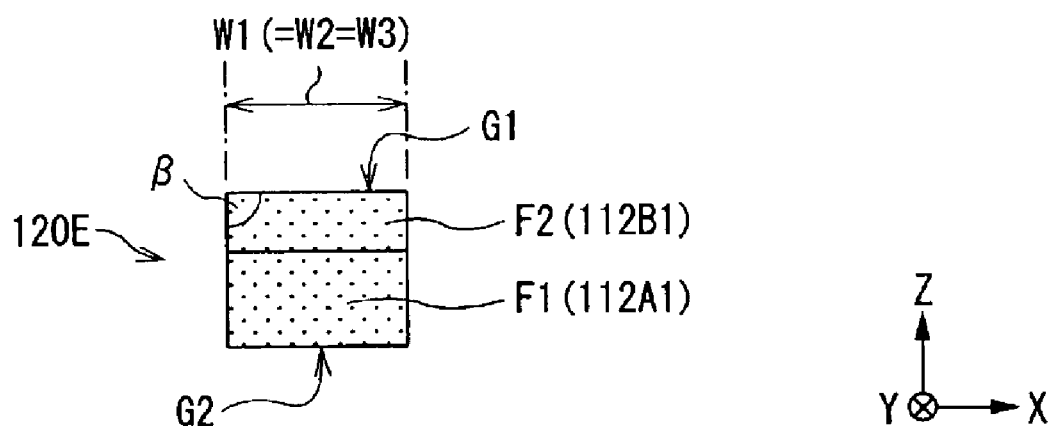
FIG. 4 is a plan view of an exposed surface as a comparative example with respect to the exposed surface shown in FIG. 3.

It became evident from results of experiments on the strength of the perpendicular magnetic field that the recording performance of the thin film magnetic head according to the embodiment was improved. FIG. 4 shows a plan view of an exposed surface 120E as a comparative example to the exposed surface 20E shown in FIG. 3, and corresponds to FIG. 3. The exposed surface 120E includes an exposed portion (region F1) of a front end portion 112A1 corresponding to the front end portion 12A1 and an exposed portion (region F2) of a front end portion 112B1 corresponding to the front end portion 12B1. In the exposed surface 120E, the width W2 of the bottom edge G2 is equal to the width W1 of the top edge G1 (W2=W1), and the region F1 has the uniform width W1. The structure of the region F2 is equivalent to that shown in FIG. 3. The width W3 of a boundary portion between the region F1 and the region F2 is equal to the width W1 of the top edge G1 (W3=W1). In other words, the exposed surface 120E has a rectangular shape. When compared between the strengths of the perpendicular magnetic fields in the thin film magnetic head having the exposed surface 20E according to the embodiment and the thin film magnetic head having the exposed surface 120E as a comparative example, it turned out that the strength of the perpendicular magnetic field in the thin film magnetic head according to the embodiment was 10% larger than that in the comparative example.

Figure 5:
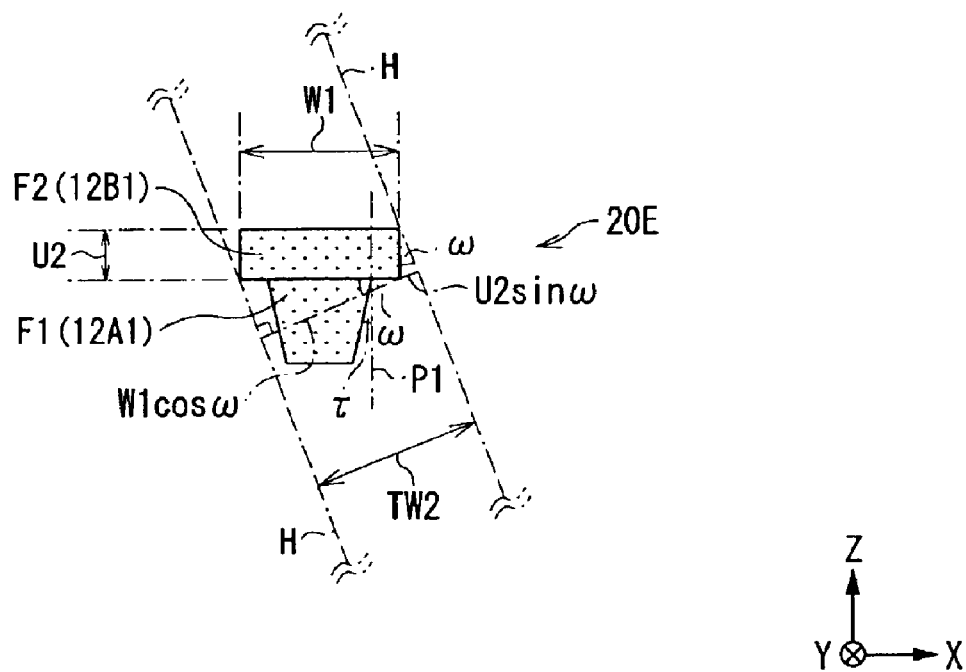
FIG. 5 is a plan view for describing an advantage of the thin film magnetic head according to the first embodiment of the invention.
Figure 6:
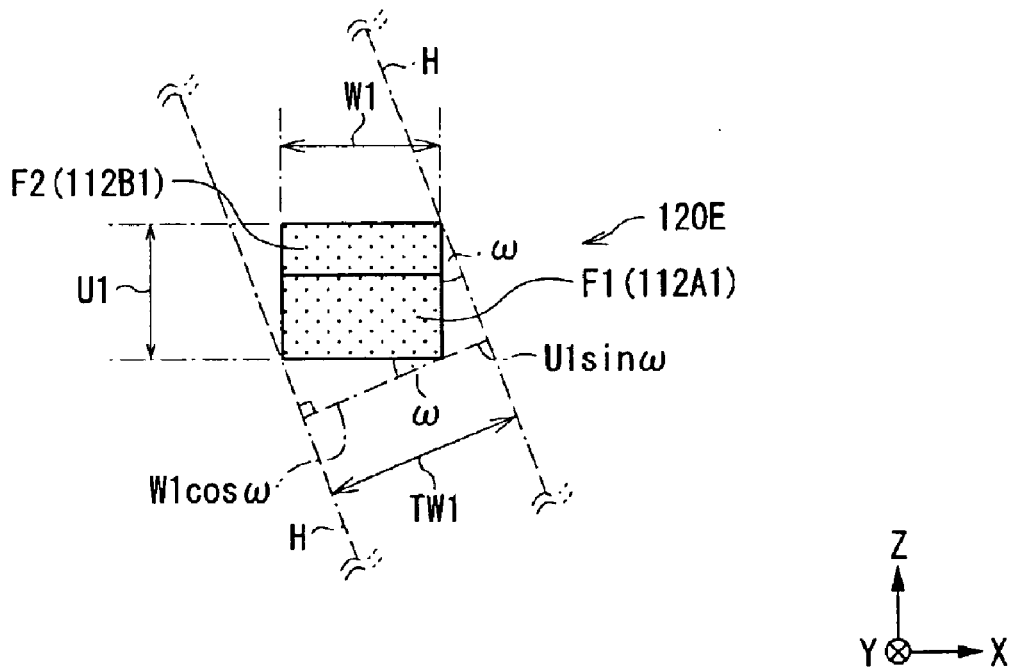
FIG. 6 is a plan view for describing a disadvantage of a thin film magnetic head as a comparative example with respect to the thin film magnetic head according to the first embodiment of the invention.

Moreover, in the embodiment, based on the characteristic structures of the bottom pole portion layer 12A and the top pole portion layer 12B, the recording track width can be reduced as much as possible because of the following reasons. FIG. 5 is a view for describing an advantage of the thin film magnetic head having the exposed surface 20E according to the embodiment, and corresponds to FIG. 3. FIG. 6 is a view for describing a disadvantage of the thin film magnetic head having the exposed surface 120E as a comparative example, and corresponds to FIG. 4.

As described above, the recording track width of the recording medium is determined by the width W1 of the top edge G1 in the exposed surface 20E (or the exposed surface 120E). When the recording head 100B is skewed in a direction tangential to the circumference of the recording medium, a substantial recording track width may be larger than the width W1. The phenomenon that the recording head 100B is skewed is generally called as "skew". In order to reduce the recording track width as much as possible, it is required to reduce an influence of the skew, which leads an increase in the recording track width, as much as possible.

In the comparative example (refer to FIG. 6), assuming that the thickness of the exposed surface 120E (regions F1 and F2) is U1, when a direction of side surfaces of the front end portions 112A1 and 112B1 (the Z-axis direction in the drawing) is skewed at an angle (skew angle) ω to a direction H tangential to the circumference of the recording medium, a substantial recording track width TW1 is TW1=U1 sin ω+W1 cos ω.

On the other hand, in the embodiment (refer to FIG. 5), assuming that the thickness of the region F2 in the exposed surface 20E is U2, when skew at the same skew angle ω as in the case of the comparative example occurs, a substantial recording track width TW2 is TW2=U2 sin ω+W1 cos ω. In other words, as compared between the recording track widths TW1 and TW2, the thicknesses U1 and U2 have a relationship of U2<U1, so in the embodiment, the recording track width is smaller than that in the comparative example. Therefore, an increase in the recording track width at the occurrence of skew can be prevented.

It becomes evident from the above result of a comparison between the recording track widths TW1 and TW2 that the substantial recording track width TW1 at the occurrence of skew mainly depends upon the structure of the region F1, when the skew angle ω and the structure of the region F2 are fixed. Therefore, for example, an angle τ between a perpendicular line P1 to an extending surface of the bottom pole portion layer 12A and a side edge of the region F1 is preferably equal to or larger than the skew angle ω.

Moreover, in the embodiment, the cross sectional area S1 of the complex including the front end portions 12A1 and 12B1 is smaller than the cross sectional area S2 of the complex including the rear end portions 12A2 and 12B2 (S1<S2), so a flow path of the magnetic fluxes which includes the bottom pole portion layer 12A and the top pole portion layer 12B is narrowed according to a reduction in the cross sectional area with increasing proximity to the air bearing surface 20. Thereby, while the magnetic fluxes passing through the interiors of the bottom pole portion layer 12A and the top pole portion layer 12B are focused in the length direction (the Y-axis direction in the drawing), the magnetic fluxes reach the air bearing surface 20, so the occurrence of magnetic flux saturation can be prevented, hereby permitting to supply sufficient and necessary magnetic fluxes to the air bearing surface 20. Thereby, also in view of supply of sufficient and necessary magnetic fluxes accompanied with focusing of the magnetic fluxes, the strength of the perpendicular magnetic field can be secured.

Further, in the embodiment, the saturated magnetic flux density of the material of the top pole portion layer 12B is larger than that of the bottom pole portion layer 12A, so the magnetic fluxes flowing into the front end portions 12A1 and 12B1 are concentrated on the front end portion 12B1 which is a main emitting portion of the magnetic fluxes rather than the front end portion 12A1. Therefore, also in view of concentration of the magnetic fluxes on the front end portion 12B1, the strength of the perpendicular magnetic field can be secured.

In addition, in the embodiment, the thickness of the gap layer 9 is larger than that of the main magnetic pole 12, so components of magnetic field in a perpendicular direction are increased. Therefore, in this view, the embodiment can contribute to securing the strength of the perpendicular magnetic field.

<<Modification 1-1>>

According to the embodiment, in the exposed surface 20E, the width W1 of the top edge G1 is larger than the width W3 of the boundary portion between the regions F1 and F2, but it is not necessarily limited to this. For example, as shown in FIG. 7, the width W1 of the top edge G1 may be equal to the width W3 (W1=W3), and the region F2 may have the uniform width W1 equal to the width W3. The structure of the exposed surface 20E shown in FIG. 7 is equivalent to that shown in FIG. 3, for example, except for the above characteristic part. Also in this case, the same effects as the first embodiment can be obtained.

<<Modification 1-2>>

In the structure of the exposed surface 20E, for example, as shown in FIG. 8, the width W3 of the boundary portion between the regions F1 and F2 may be equal to the width W2 of the bottom edge G2 (W3=W2), and the region F1 may have the uniform width W2 equal to the width W3. The structure of the exposed surface 20E shown in FIG. 8 is equivalent to that shown in FIG. 3, for example, except for the above characteristic part. Also in this case, the same effects as the first embodiment can be obtained.

<<Modification 1-3>>

Figure 9:
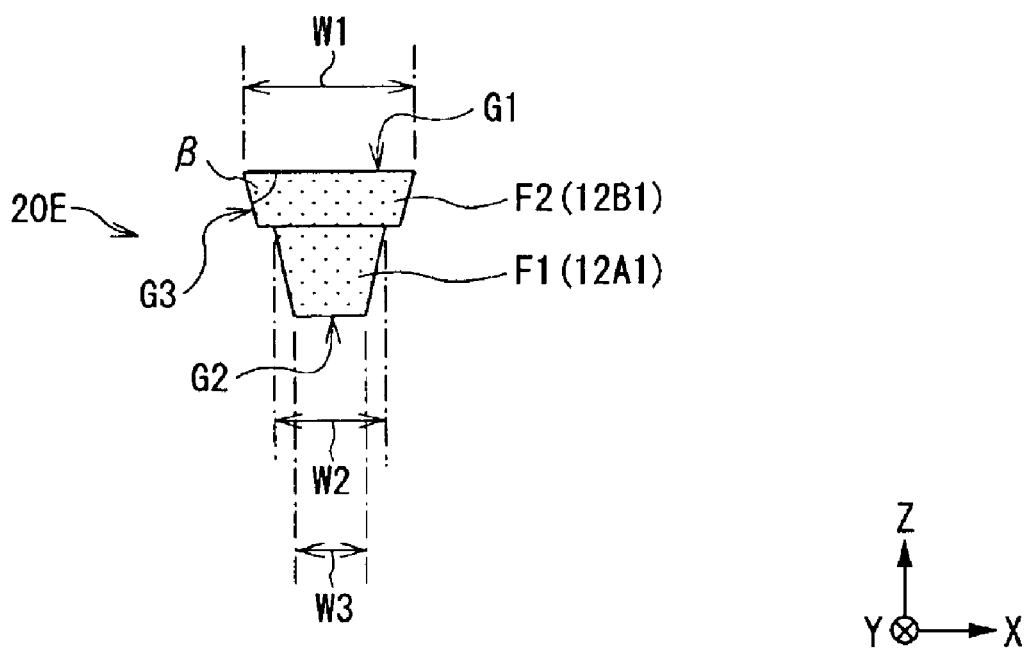
FIG. 9 is a plan view of still another modification to the structure of the exposed surface.

The exposed surface 20E may have a structure shown in FIG. 9. In the embodiment, the description is given to the case where the angle β between the side edge G3 and the top edge G1 in the region F2 of the exposed surface 20E is 90°, but it is not necessarily limited to this. As shown in FIG. 9, the angle β may be within a range of approximately 70° or over and less than 90°. In this case, the width of the region F2 is reduced with increasing proximity to the region F1, and there is a step in the boundary portion between the regions F1 and F2. The structure of the exposed surface 20E shown in FIG. 9 is equivalent to that shown in FIG. 3, for example, except for the above characteristic part. Also in this case, in the exposed surface 20E, the area of the region F2 constituting the main emitting path of magnetic fluxes can be sufficiently secured, so the modification can contribute to securing the strength of the perpendicular magnetic field.

<<Modification 1-4>>

Figure 10:
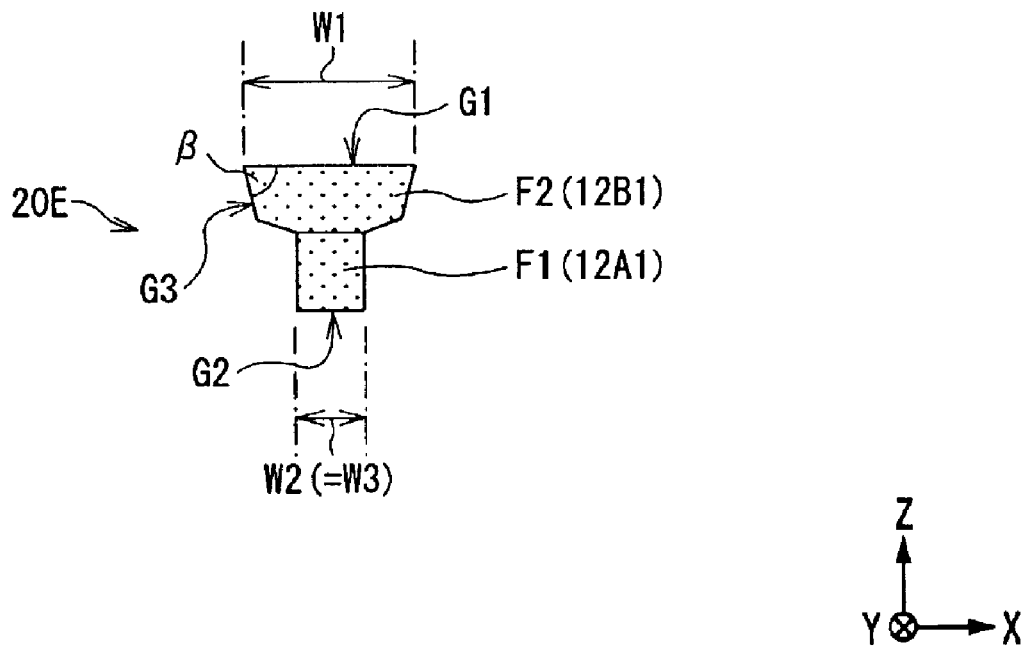
FIG. 10 is a plan view of a further modification to the structure of the exposed surface.

In the structure of the exposed surface 20E as a modification shown in FIG. 9, for example, as shown in FIG. 10, the width of the region F2 may be reduced in two steps with increasing proximity to the region Fl, and the region F1 may have the uniform width W2. The structure of the exposed surface 20E shown in FIG. 10 is equivalent to that shown in FIG. 9, for example, except for the above characteristic part. Also in this case, the same effects as the case described in <<Mortification 1-3>> can be obtained.

<<Modification 1-5>>

Figure 11:
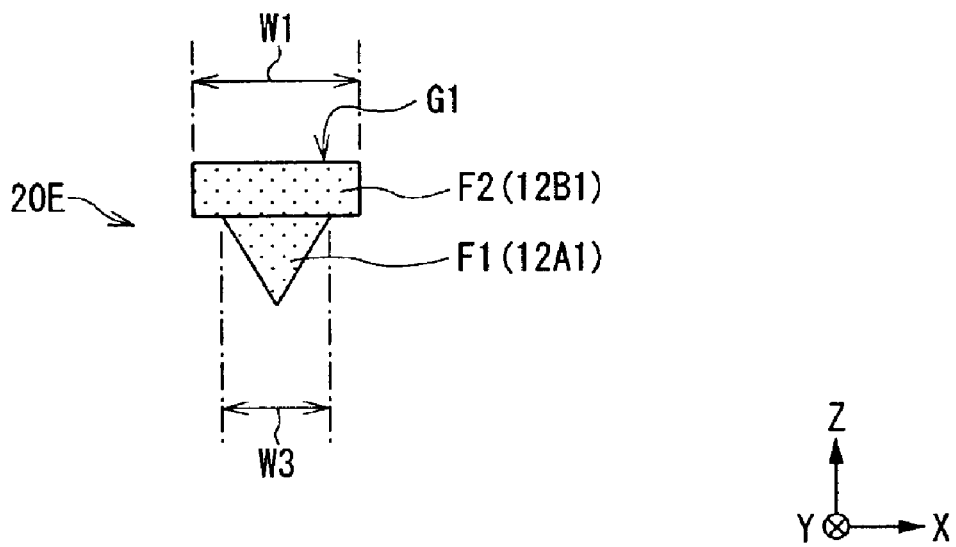
FIG. 11 is a plan view of a still further modification to the structure of the exposed surface.

In the structure of the exposed surface 20E, for example, as shown in FIG. 11, the region F1 may have an inverted triangular shape. The structure of the exposed surface 20E shown in FIG. 11 is equivalent to that shown in FIG. 3, for example, except for the above characteristic part. Also in this case, the same effects as the first embodiment can be obtained.

<<Modification 1-6>>

Figure 12:
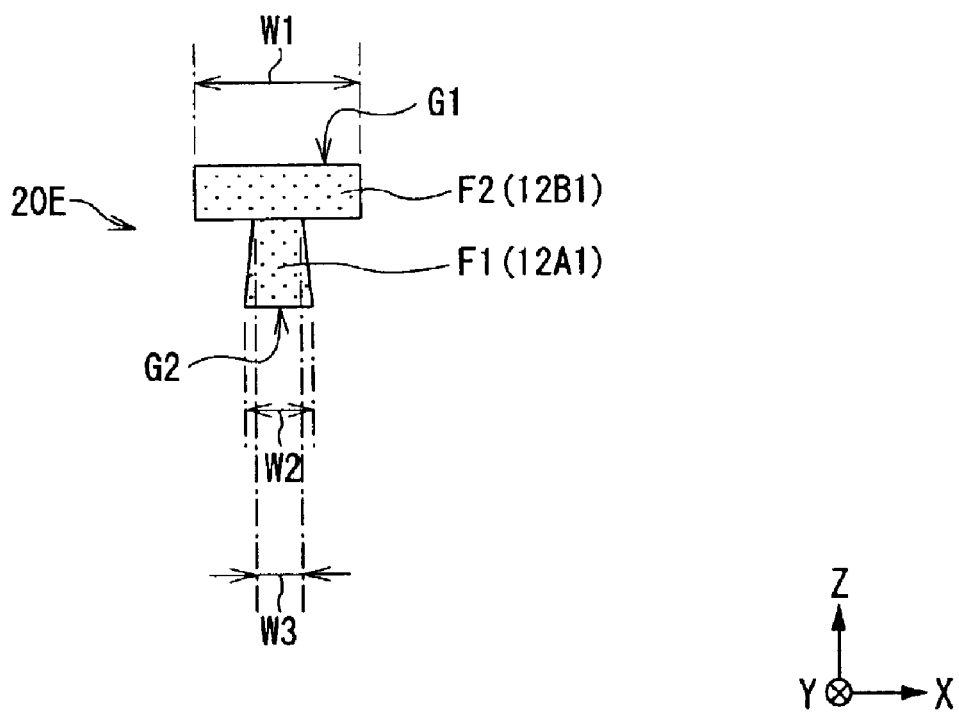
FIG. 12 is a plan view of a still modification to the structure of the exposed surface.

In the structure of the exposed surface 20E, for example, as shown in FIG. 12, the width W3 of the boundary portion of the exposed surface 20E between the regions F1 and F2 may be smaller than the width W2 of the bottom edge G2 (W3<W2). The structure of the exposed surface 20E shown in FIG. 12 is equivalent to that shown in FIG. 3, for example, except for the above characteristic part. Also in this case, the same effects as the first embodiment can be obtained. However, when the width W3 of the boundary portion between the regions F1 and F2 is smaller than the width W2 of the bottom edge G2 and the area of the exposed surface 20E becomes smaller, an emitted amount of the magnetic fluxes from the exposed surface 20E may be reduced, so in consideration of securing the emitted amount of the magnetic fluxes, the width W3 is preferably equal to or larger than the width W2 (W3∞W2).

<<Modification 1-7>>

Figure 13:
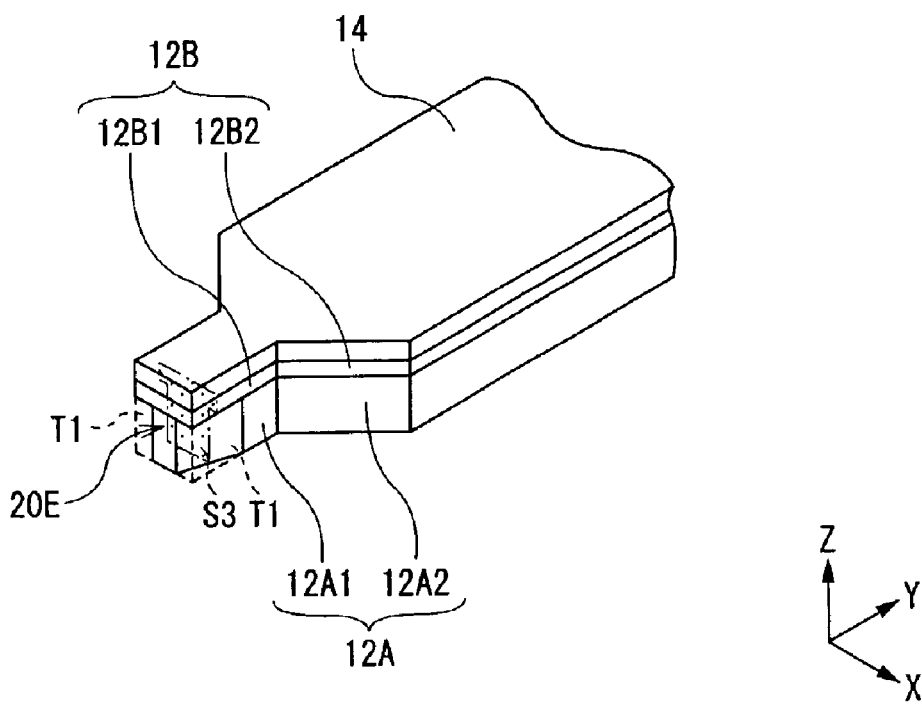
FIG. 13 is a perspective view of a modification to a structure of a bottom pole portion layer.

In the embodiment, the cross sectional area S1 of the complex including the front end portions 12A1 and 12B1 is uniform irrespective of a distance from the air bearing surface 20, but it is not necessarily limited to this. FIG. 13 shows a modification of the structure of the bottom pole portion layer 12A, and corresponds to FIG. 2. In FIG. 13, for example, the exposed surface 20E has a structure (refer to FIG. 8) described in <<Modification 1-2>>. In the bottom pole portion layer 12A, for example, the width of a front portion of the front end portion 12A1 is narrowed with increasing proximity to the air bearing surface 20. In other words, the structure of the front end portion 12A1 corresponds to, for example, a remaining structure in the case where two triangular prisms T1 with a surface in the Z-axis direction in the drawing as a bottom surface are removed from a rectangular prism. A cross sectional area S3 of the front portion of the front end portion 12A1 is reduced with increasing proximity to the air bearing surface 20. In the bottom pole portion layer 12A with such structure, the magnetic fluxes flowing through the interior of the front end portion 12A1 are focused on the front portion of the front end portion 12A1 according to a reduction in the cross sectional area S3, so the strength of the perpendicular magnetic field can be further increased, compared with that in the embodiment. The structure of the bottom pole portion layer 12A shown in FIG. 13 is equivalent to that shown in FIG. 2, for example, except for the above characteristic part.

<<Modification 1-8>>

Figure 14:
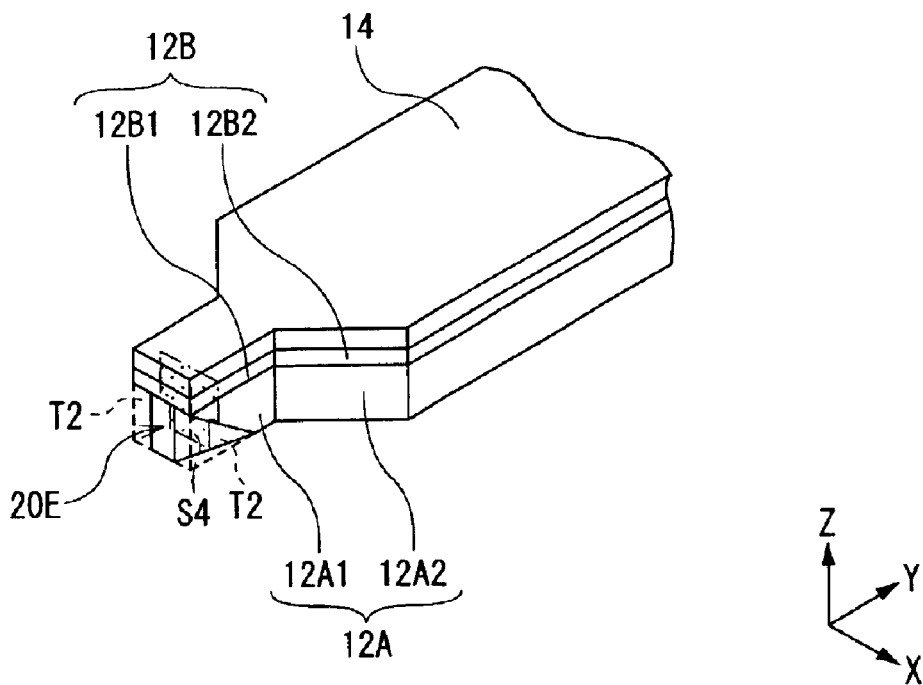
FIG. 14 is a perspective view of another modification to the structure of the bottom pole portion layer.

The structure of the bottom pole portion layer 12A is not limited to that shown in FIG. 13, and the bottom pole portion layer 12A may have a structure shown in FIG. 14. FIG. 14 shows another modification of the structure of the bottom pole portion layer 12A. The structure of the front end portion 12A1 of the bottom pole portion layer 12A corresponds to, for example, a remaining structure in the case where two pyramids T2 with a surface in the Y-axis direction in the drawing as a bottom surface are removed from a rectangular prism, and a cross sectional area S4 of a front portion of the front end portion 12A1 is reduced with increasing proximity to the air bearing surface 20. Also in this case, by the same effects as those in the case described in <<Modification 1-7>>, the strength of the perpendicular magnetic field can be further increased, compared with that in the embodiment. The structure of the bottom pole portion layer 12A shown in FIG. 14 is equivalent to that shown in FIG. 2, for example, except for the above characteristic part.

<<Modification 1-9>>

Figure 15:
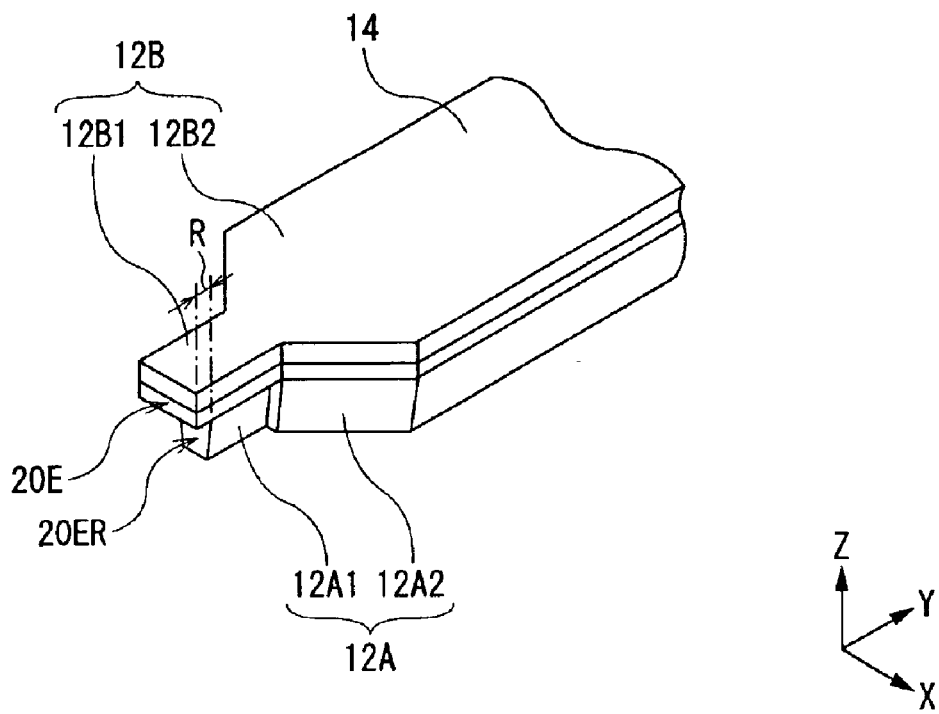
FIG. 15 is a perspective view of still another modification to the structure of the bottom pole portion layer.

In the embodiment, both of the bottom pole portion layer 12A and the top pole portion layer 12B are exposed to the air bearing surface 20, but the embodiment is not necessarily limited to this. For example, as shown in FIG. 15, only the top pole portion layer 12B may be exposed to the air bearing surface 20 to constitute the exposed surface 20E, and the bottom pole portion layer 12A may be recessed a distance R from the air bearing surface 20. The exposed surface 20E may have a uniform width as shown in FIG. 15, or may have a width gradually reduced with increasing proximity to the gap layer 9. However, in consideration to determining the recording track width without variations, the exposed surface 20E preferably has a uniform width. The reason why the recording track width can be determined without variations will be described later (refer to FIGS. 31 and 32). In this case, based on a recessed structure of the bottom pole portion layer 12A, the magnetic fluxes flowing in the front end portion 12A1 toward the air bearing surface 20 smoothly flow into the front end portion 12B1. Thereby, the magnetic fluxes are concentrated on the front end portion 12B1, so the strength of the perpendicular magnetic field can be further increased. In order to properly and securely concentrate the magnetic fluxes on the front end portion 12B1, the distance R is preferably within a range approximately from 0.1 $\mu$m to 2.0 $\mu$m. The structure of the bottom pole portion layer 12A shown in FIG. 15 is equivalent to that shown in FIG. 2, for example, except for the above characteristic part. Herein, the bottom pole portion layer 12A in <<Modification 1-9>> corresponds to a specific example of "a first magnetic film" in the invention, and the top pole portion layer 12B corresponds to a specific example of "a second magnetic film" in the invention.

<<Modification 1-10>>

Figure 16:
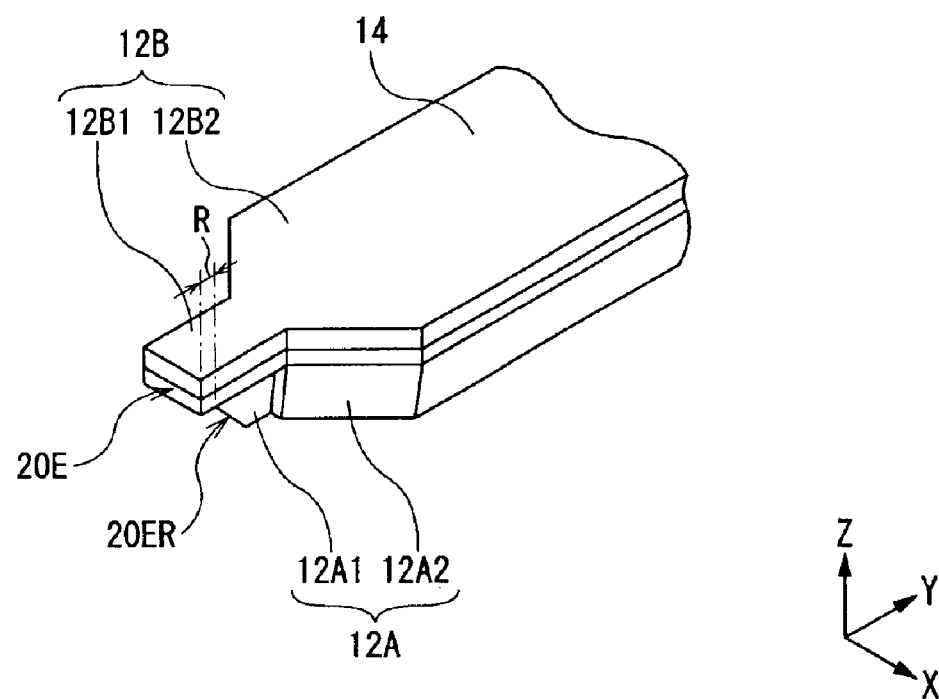
FIG. 16 is a perspective view of a further modification to the structure of the bottom pole portion layer.

In the bottom pole portion layer 12A shown in FIG. 15, for example, as shown in FIG. 16, an end surface (recessed surface) 20ER near the air bearing surface 20 may be inclined to an extending surface (a surface including the X-axis and the Y-axis in the drawing) of the bottom pole portion layer 12A. In this case, the magnetic fluxes can flow from the front end portion 12A1 to the front end portion 12B1 in the vicinity of the recessed surface 20ER more smoothly than in the case of <<Modification 1-9>> where the recessed surface 20ER is orthogonal to the extending surface of the bottom pole portion layer 12A.

<<Modification 1-11>>

Figure 17:
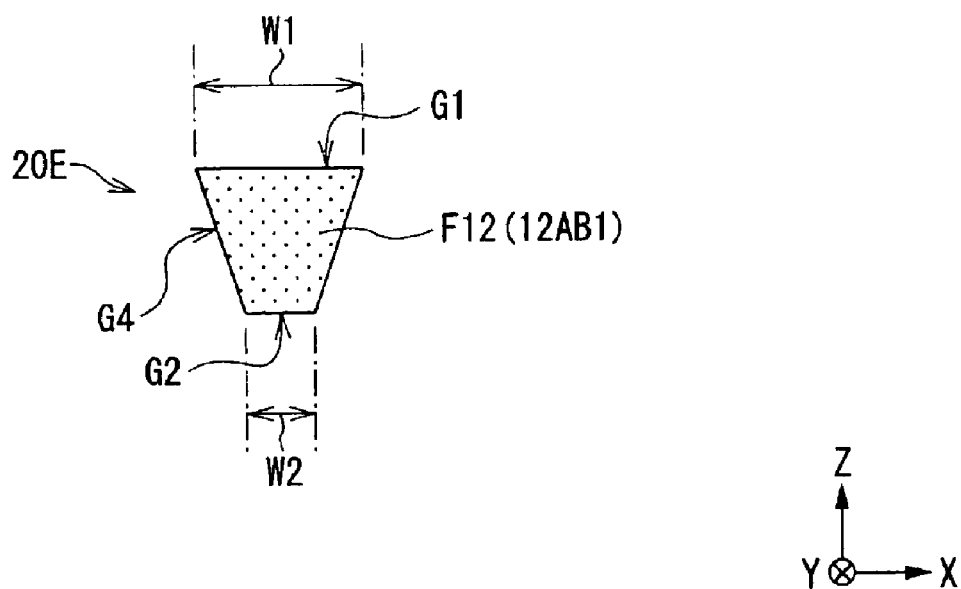
FIG. 17 is a plan view of a still modification to the structure of the exposed surface.
Figure 18:
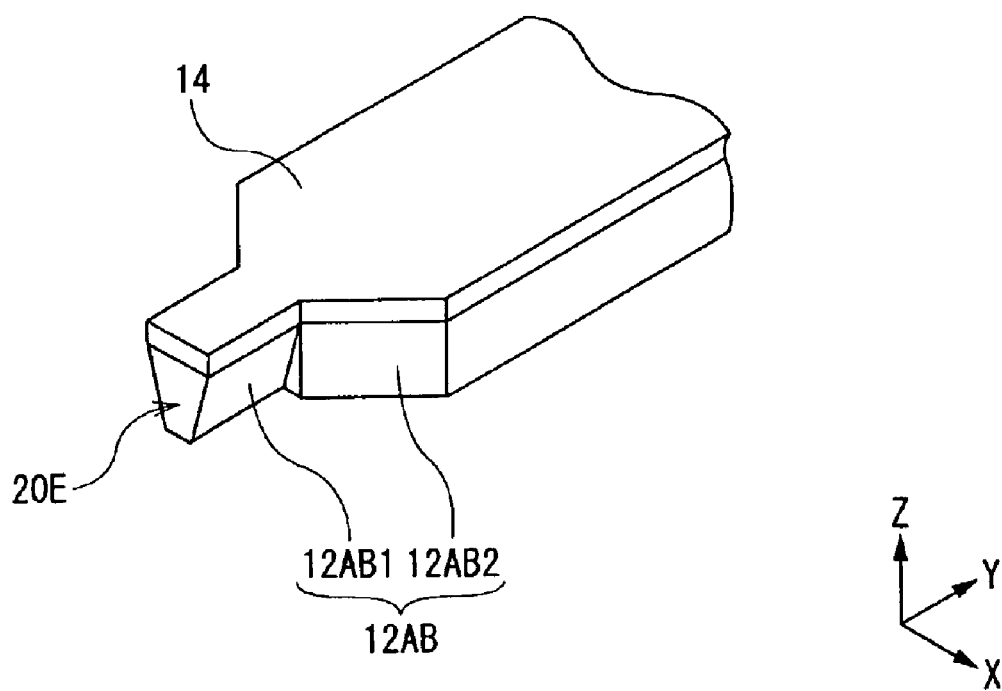
FIG. 18 is a perspective view of a still further modification to the structure of the bottom pole portion layer.

Moreover, in the embodiment, the main magnetic pole 12 comprises a laminate of the bottom pole portion layer 12A and the top pole portion layer 12B, but it is not limited to this. For example, as shown in FIGS. 17 and 18, the main magnetic pole 12 may comprise a pole portion layer 12AB which has a single-layer structure corresponding to a complex of the bottom pole portion layer 12A and the top pole portion layer 12B. FIGS. 17 and 18 show a modification of the structure of the main magnetic pole 12. FIG. 17 shows a plan view of the exposed surface 20E in the pole portion layer 12AB, and corresponds to FIG. 3. FIG. 18 shows an enlarged perspective view of the pole portion layer 12AB, and corresponds to FIG. 2. The pole portion layer 12AB comprises a front end portion 12AB1 corresponding to a complex of the front end portions 12A1 and 12B1 described in the above embodiment and a rear end portion 12AB2 corresponding to a complex of the rear end portions 12A2 and 12B2. In the exposed surface 20E, the top edge G1 has the width W1, and the bottom edge G2 has the width W2. The width of the exposed surface 20E is narrowed with increasing proximity to the gap layer 9, that is, the exposed surface 20E has an inverted trapezoidal shape. The main magnetic pole 12 including the pole portion layer 12AB allows simplification of the structure and the formation of the main magnetic pole 12.

In the modification, the exposed surface 20E of the pole portion layer 12AB has an inverted trapezoidal shape, but it is not necessarily limited to this. For example, it may have an inverted triangular shape.

In the embodiment, in addition to the above modifications described in <<Modification 1-1>> through <<Modification 1-11>>, these modifications can be variously combined with one another.

Referring to FIGS. 1A through 3, 19 through 30, a method of manufacturing the thin film magnetic head according to the embodiment will be described below. FIGS. 19 through 24 show cross sectional views of each step in the method of manufacturing the thin film magnetic head according to the embodiment. Further, FIGS. 25 through 30 show plan views of each step in the method of manufacturing the thin film magnetic head. FIGS. 25, 26, 27, 28 and 29 correspond to FIGS. 19, 20, 22, 23 and 24, respectively. FIGS. 19 through 24 show cross sectional views taken along a line A—A in FIGS. 25 through 29, respectively.

At first, the method of manufacturing the thin film magnetic head will be briefly described below, and then a method of forming a main part (the bottom pole portion layer 12A and the top pole portion layer 12B) of the main magnetic pole 12 to which the method of manufacturing the thin film magnetic head according to the invention is applied will be described in detail below. In the descriptions of the method of manufacturing the thin film magnetic head and the method of forming the main part of the main magnetic pole 12, the materials, forming positions and structural characteristics of components will not be further described, because they have been already described in the above paragraphs relative to structure of thin film magnetic head.

The thin film magnetic head is manufactured mainly by laminating each component in order, for example, through thin film processing, polishing and so on. In other words, at first, after the insulating layer 2 is formed on the substrate 1, the bottom shield layer 3, the shield gap film 4 burying the MR device 5, and the top shield layer 6 are formed in this order on the insulating layer 2 to form the reproducing head 100A.

Then, after the non-magnetic layer 7 is formed on the reproducing head 100A, the auxiliary magnetic pole 8, the gap layer potion 9A having the aperture 9AK, the thin film coil 10, the gap layer potion 9B coating the thin film coil 10, the gap layer 9C coating the gap layer portions 9A and 9B and having the aperture 9CK, the coupling portion 11 filled in the aperture 9CK, and the main magnetic pole 12 partially coating the buffer layer 14 are formed in this order on the non-magnetic layer 7 to form the recording head 100B.

Finally, the overcoat layer 15 is formed on the recording head 100B to complete the thin film magnetic head. All components constituting the above thin film magnetic head are finally formed by forming the air bearing surface 20, for example, through machining or polishing.

Figure 19:
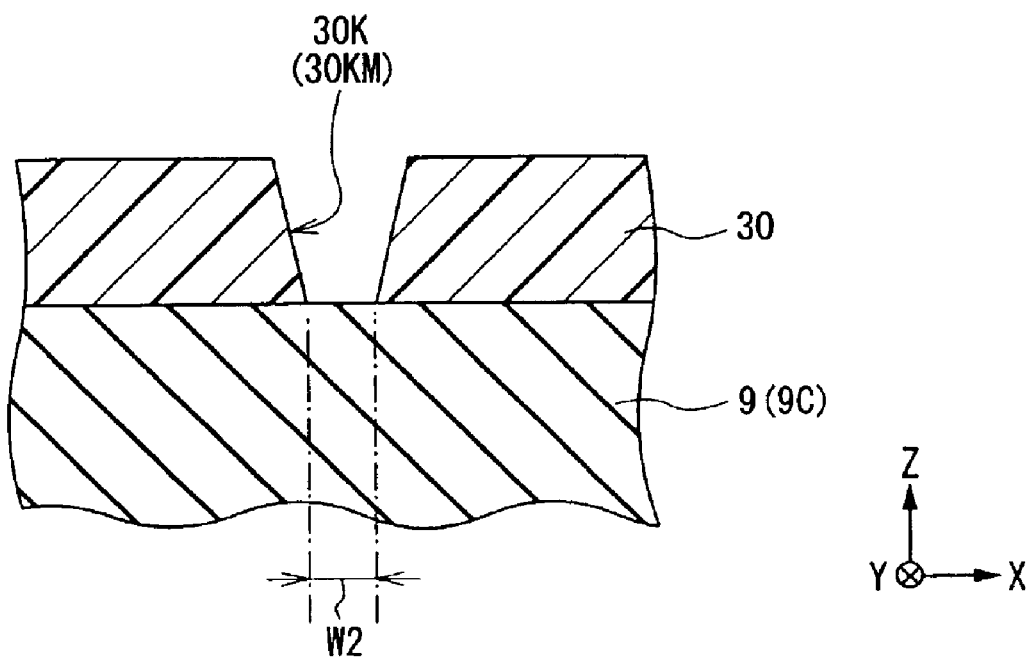
FIG. 19 is a sectional view for describing one step in a method of manufacturing the thin film magnetic head according to the first embodiment of the invention.
Figure 25:
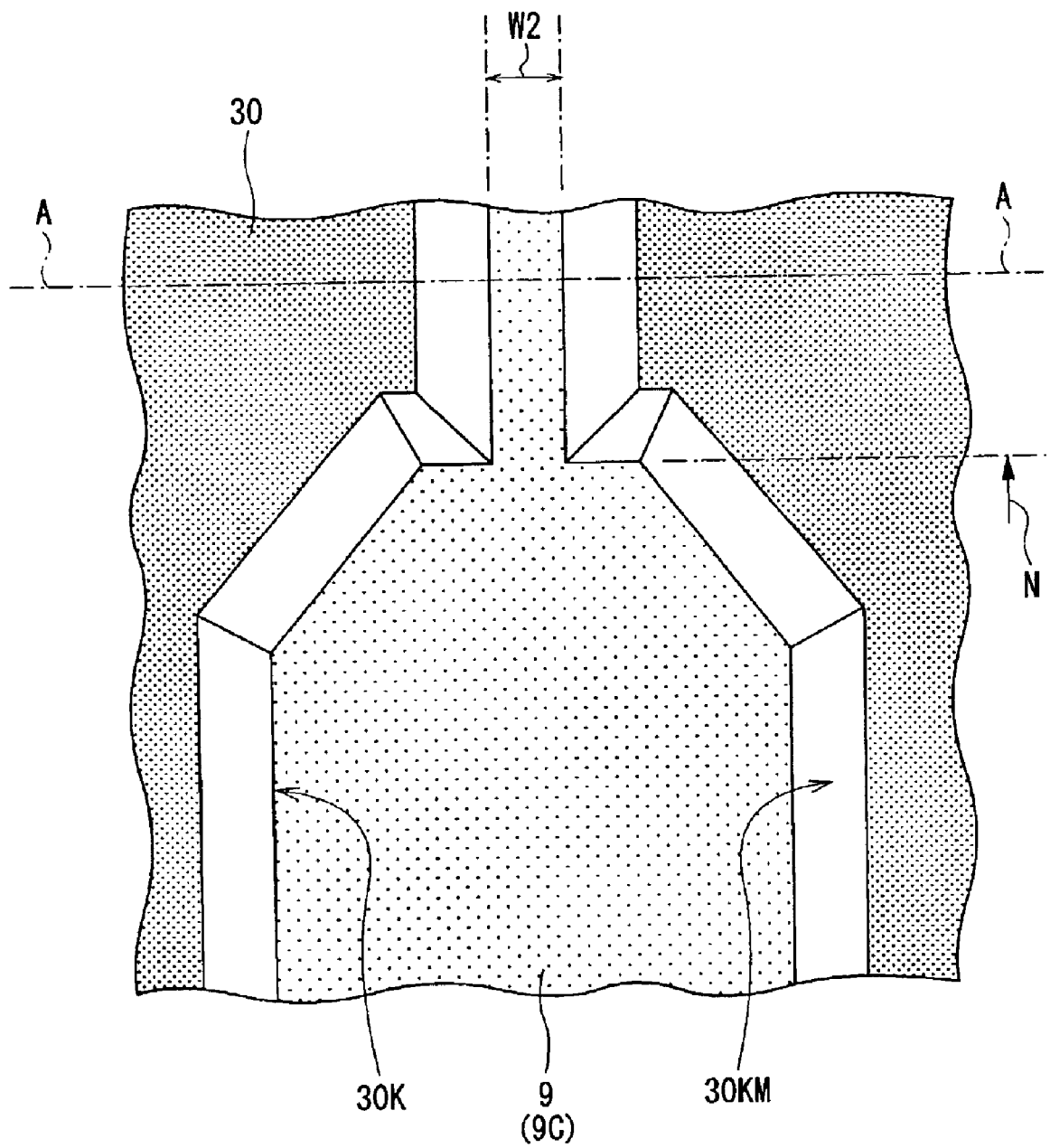
FIG. 25 is a plan view corresponding to the sectional view shown in FIG. 19.

When the main part of the main magnetic pole 12 are formed, at first, as shown in FIGS. 19 and 25, after the gap layer portion 9C constituting a part of the gap layer 9 is formed, an electrode film (not shown) which will be a seed layer in electroplating is formed on the gap layer portion 9C, for example, through sputtering. As the material of the electrode film, for example, the same material with a high saturated magnetic flux density as the material of the bottom pole portion layer 12A or the top pole portion layer 12B which are formed in a later step is used.

Then, after, for example, a photoresist film (not shown) is formed on the electrode film through coating a photoresist, the photoresist film is patterned through high-accuracy photolithography to form a frame pattern (outer frame) 30 (a dark hatching region in FIG. 25) which is used in plating, as shown in FIGS. 19 and 25. When forming the frame pattern 30, for example, an aperture 30K corresponding to a plane shape of the bottom pole portion layer 12A is disposed, and a bottom end width of a portion of the aperture 30K corresponding to the front end portion 12A1 is formed so as to correspond to the width W2 (refer to FIG. 3) of the bottom edge G2 in the exposed surface 20E which is formed in a later step. Further, when forming the frame pattern 30, for example, in photolithography, an exposure angle, an exposure and so on are adjusted, and an internal surface 30KM of the frame pattern 30 in the aperture 30K is inclined to a surface of the gap layer portion 9C (a lighter hatching region in FIG. 25) which is a base, thereby the aperture 30K is spread upward. Regarding the position where the frame pattern 30 is formed, for example, a portion of the aperture 30K corresponding to a coupling portion between the front end portions 12A1 and the rear end portion 12A2 in the bottom pole portion layer 12A is aligned to a coupling position N.

Figure 20:
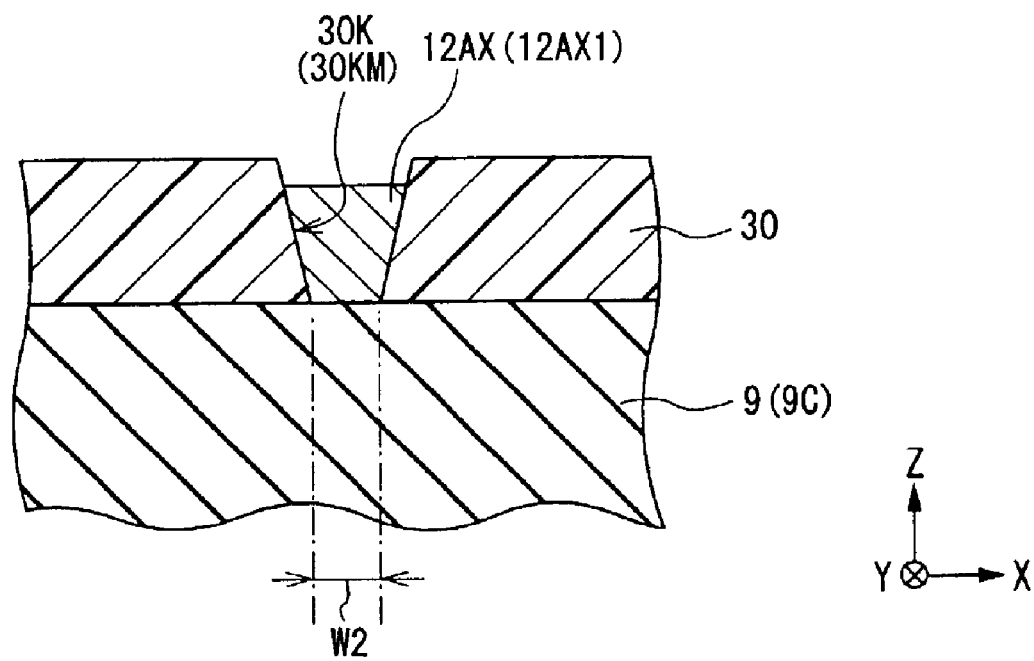
FIG. 20 is a sectional view for describing a step following the step of FIG. 19.
Figure 26:
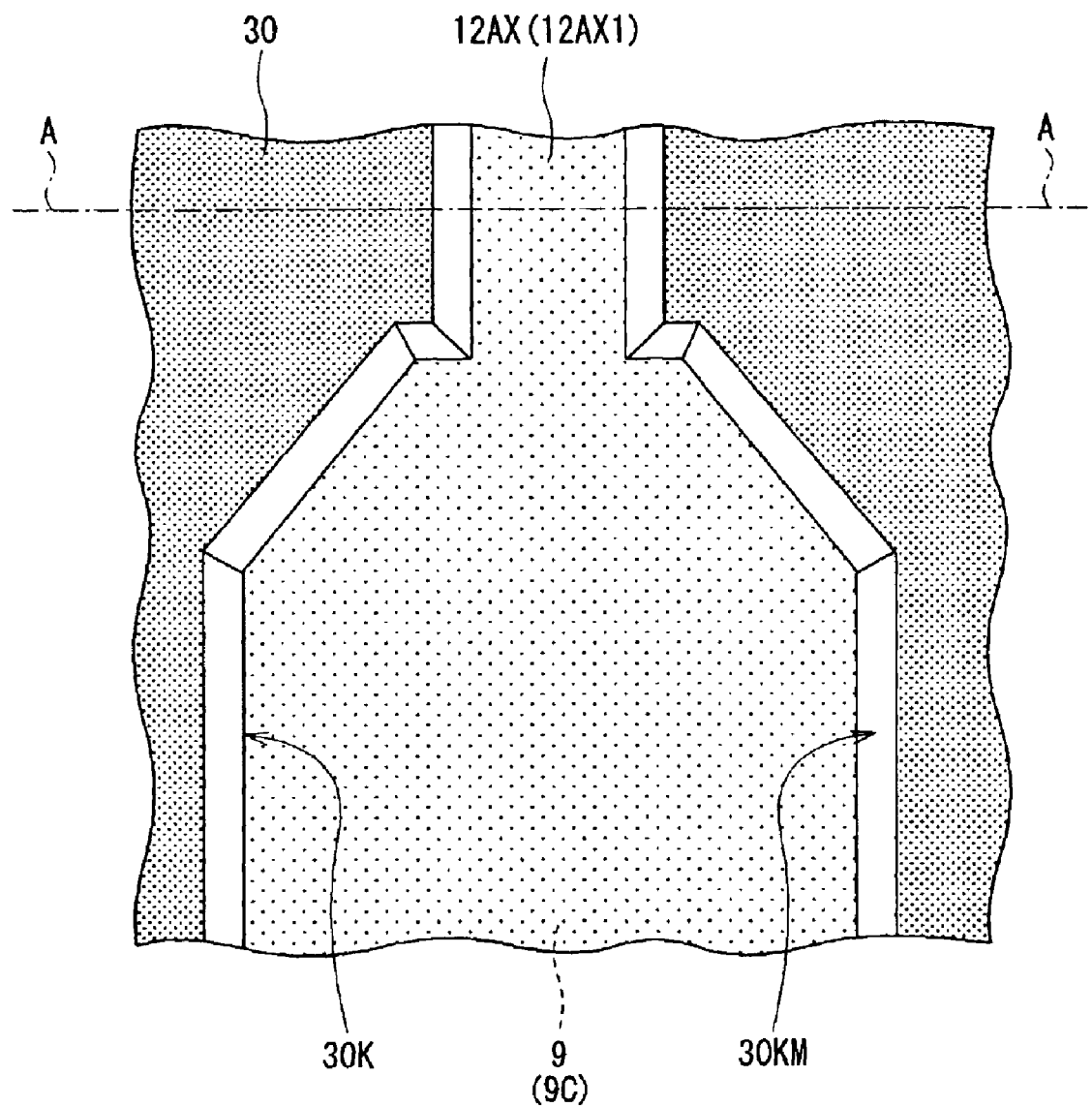
FIG. 26 is a plan view corresponding to the sectional view shown in FIG. 20.

Next, by the use of the electrode film which is formed before as a seed layer and the frame pattern 30 as a mask, a plating film made of, for example, a material with a high saturation density such as Permalloy is selectively grown on the aperture 30K to form a precursory magnetic layer pattern 12AX (a lighter hatching region in FIG. 26) as shown in FIGS. 20 and 26. The precursory magnetic layer pattern 12AX is a preparatory layer which becomes a precursory magnetic layer pattern 12AY (refer to FIGS. 22 and 27) through polishing in a later step. A bottom end of a corresponding portion 12AX1 of the precursory magnetic layer pattern 12AX corresponding to the front end portion 12A1 has the width W2. The precursory magnetic layer pattern 12AX is formed so that, for example, the forming thickness thereof is larger than the forming thickness of the bottom pole portion layer 12A. In order that the forming thickness of the precursory magnetic layer pattern 12AX can be larger than that of the bottom pole portion layer 12A, when the frame pattern 30 is formed, the frame pattern 30 is adjusted in advance to have a larger thickness than the forming thickness of the precursory magnetic layer pattern 12AX.

Then, after the frame pattern 30 is removed, by the use of the precursory magnetic layer pattern 12AX as a mask, for example, through ion beam etching, a portion of the electrode film except for a region where the precursory magnetic layer pattern 12AX is formed is selectively etched away.

Figure 21:
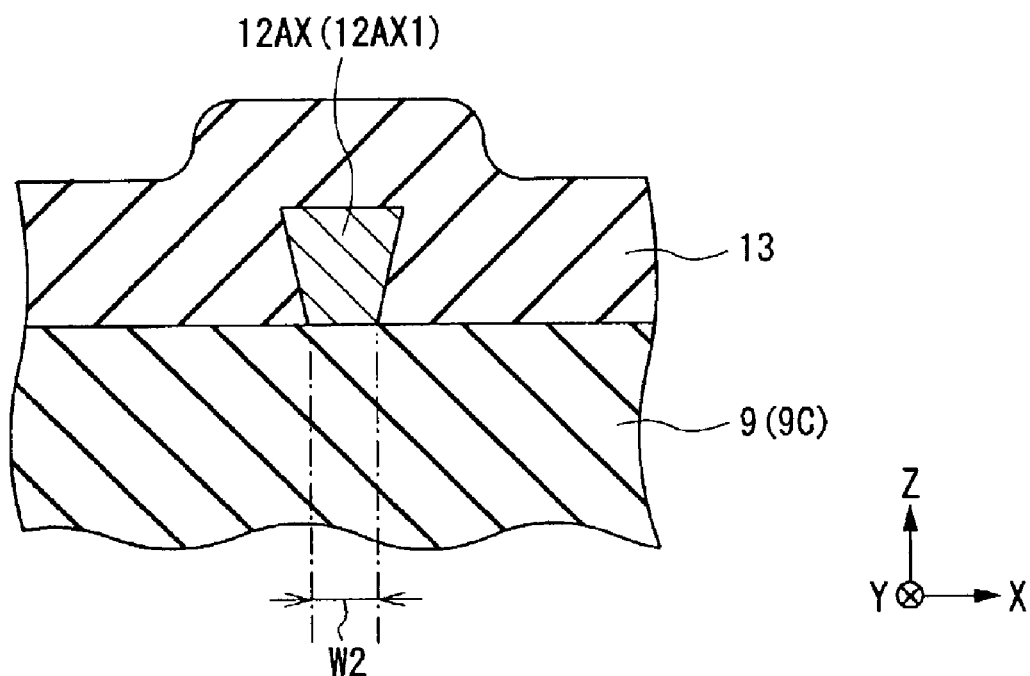
FIG. 21 is a sectional view for describing a step following the step of FIG. 20.

Next, as shown in FIG. 21, the embedding layer 13 made of, for example, a non-conductive and non-magnetic material such as alumina or the like is formed so as to coat the gap layer portion 9C and the precursory magnetic layer pattern 12AX. The embedding layer 13 is formed, for example, with a larger thickness than the precursory magnetic layer pattern 12AX.

Figure 22:
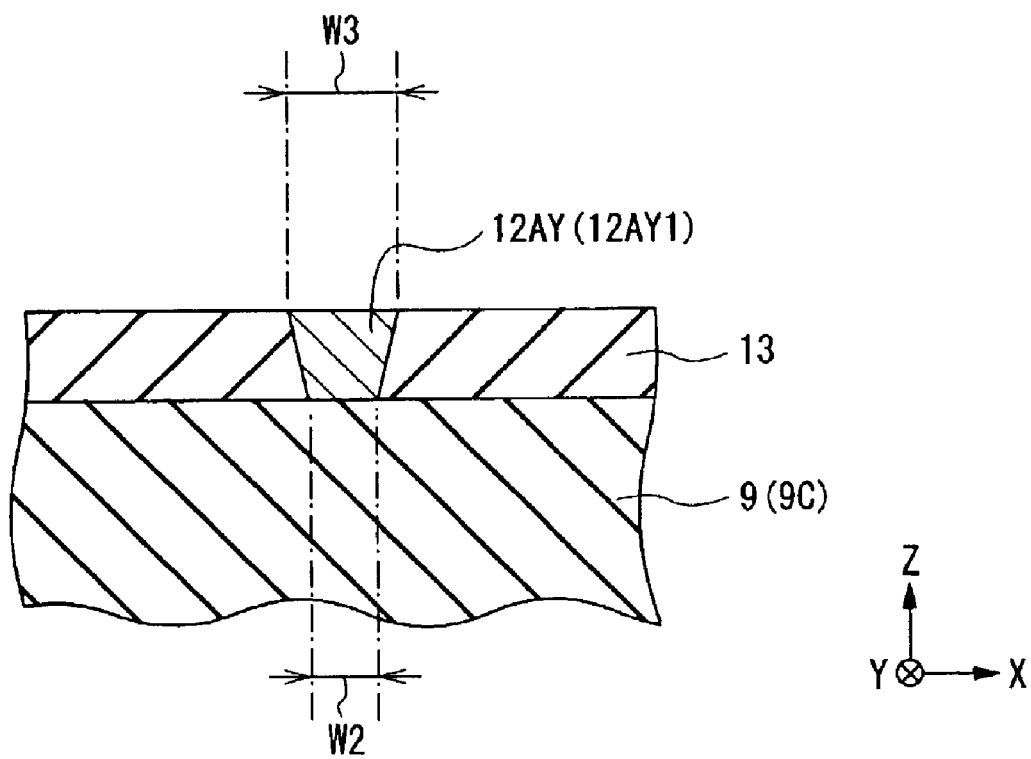
FIG. 22 is a sectional view for describing a step following the step of FIG. 21.
Figure 27:
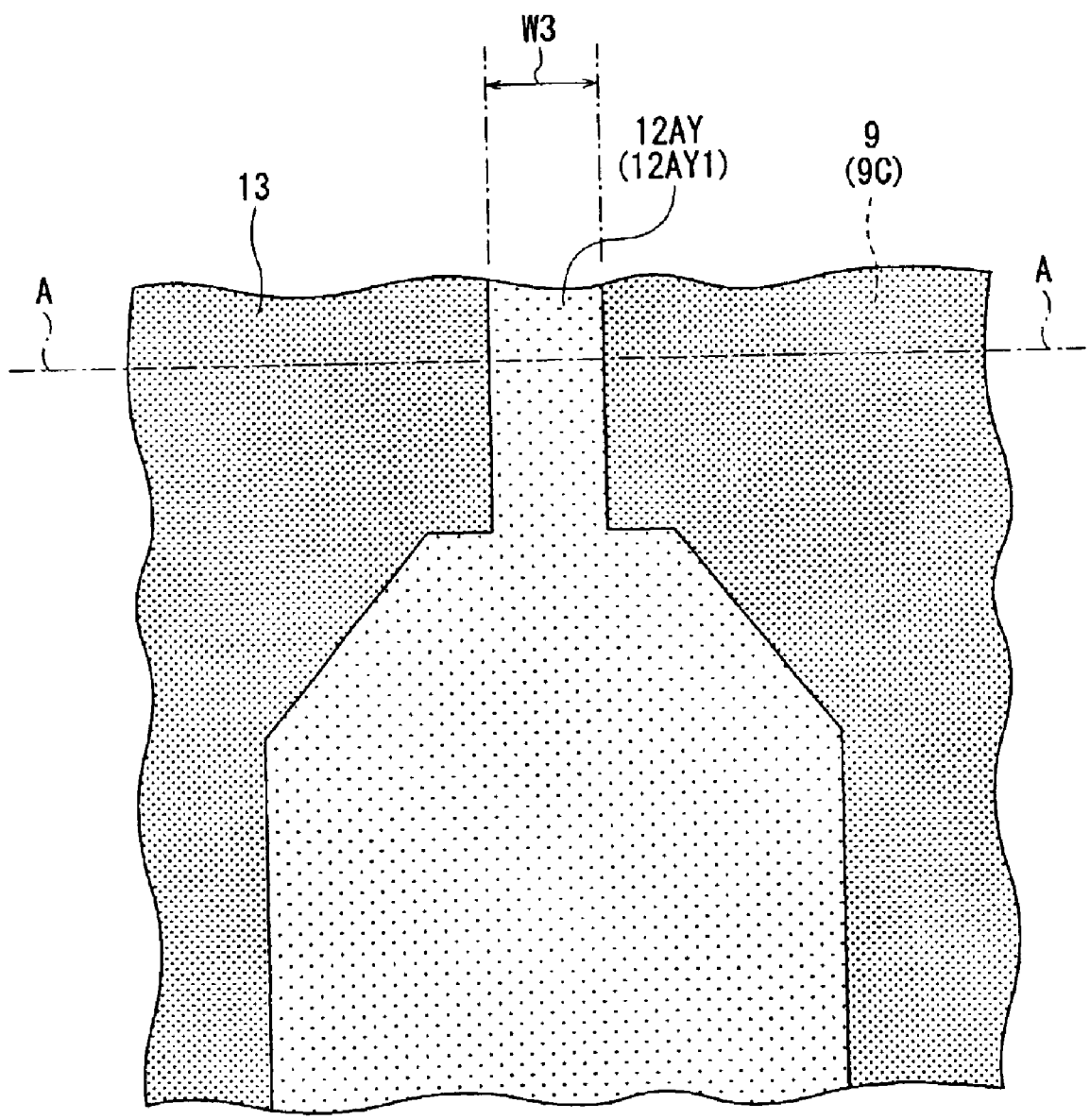
FIG. 27 is a plan view corresponding to the sectional view shown in FIG. 22.

Then, for example, through chemical mechanical polishing (CMP), the embedding layer 13 and the precursory magnetic layer pattern 12AX are polished until at least the precursory magnetic layer pattern 12AX is exposed. Through the polishing, as shown in FIGS. 22 and 27, the precursory magnetic layer pattern 12AY (a lighter hatching region in FIG. 27) which is a remained portion of the precursory magnetic layer pattern 12AX after polishing is formed. When forming the precursory magnetic layer pattern 12AY, a polishing amount is adjusted so that a top end of a corresponding portion 12AY1 corresponding to the front end portion 12A1 has the width W3. A surface of the precursory magnetic layer pattern 12AY and a surface of the embedding layer 13 (a dark hatching region in FIG. 27) after polishing are entirely flat.

Figure 23:
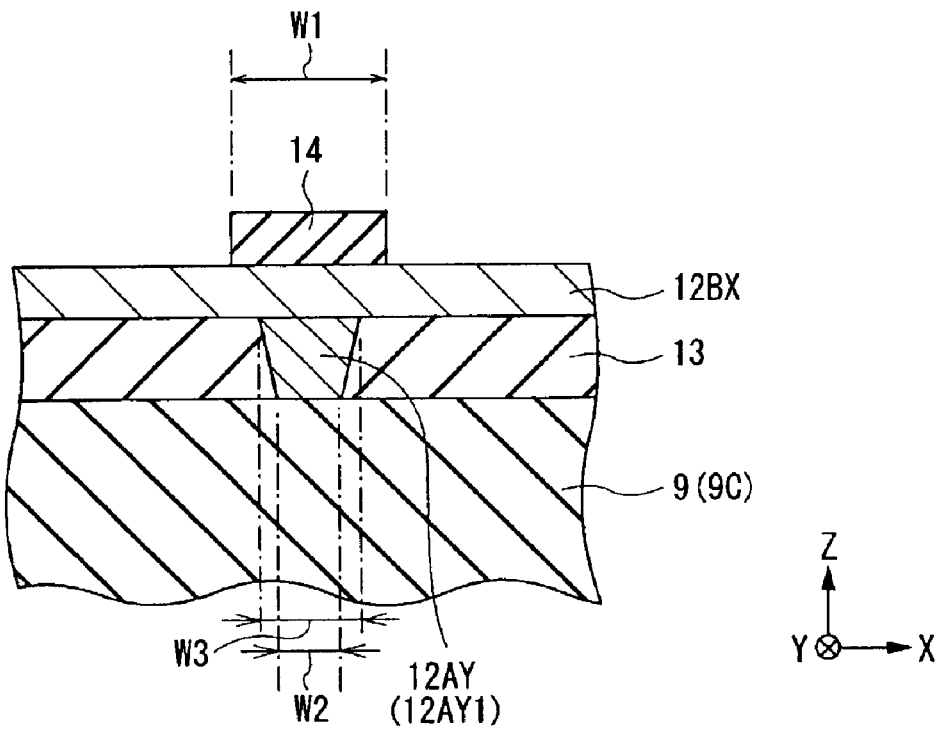
FIG. 23 is a sectional view for describing a step following the step of FIG. 22.
Figure 28:
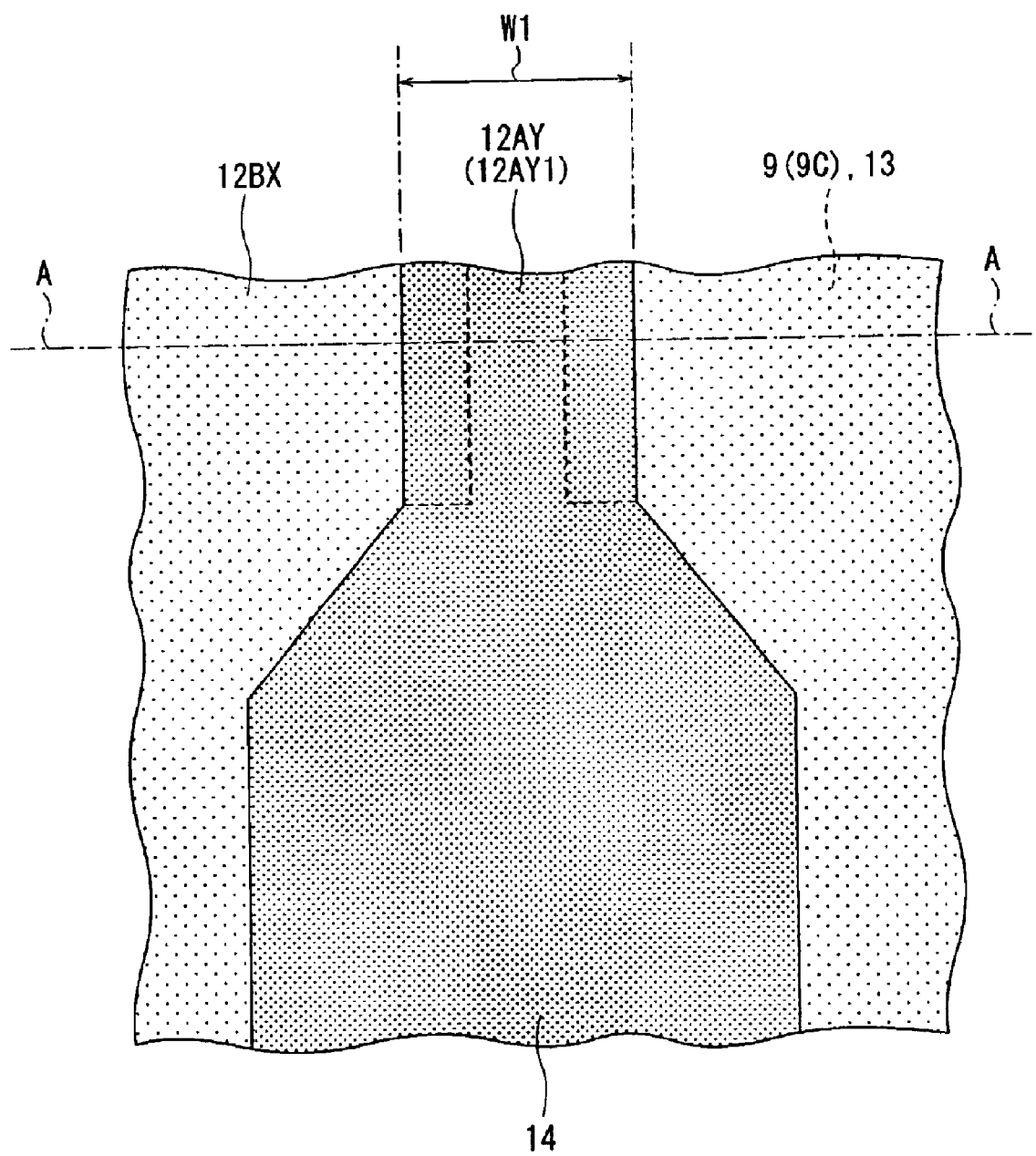
FIG. 28 is a plan view corresponding to the sectional view shown in FIG. 23.

Next, as shown in FIGS. 23 and 28, a precursory magnetic layer 12BX (a lighter hatching region in FIG. 28) is formed on the flat surfaces of the precursory magnetic layer pattern 12AY and the embedding layer 13, for example, through sputtering or plating by the use of a material with a higher saturated magnetic flux density than the precursory magnetic layer patter 12AY.

Then, as shown in FIGS. 23 and 28, by the use of, for example, a non-conductive and non-magnetic material with lower etching speed than the precursory magnetic layer 12BX such as alumina, the buffer layer 14 (a dark hatching region in FIG. 28) is selectively formed on the precursory magnetic layer 12BX. When the buffer layer 14 is formed, the buffer layer 14 has a plane shape corresponding to, for example, a plane shape of the top pole portion layer 12B, and a portion corresponding to the front end portion 12B1 of the top pole portion layer 12B has the width W1 larger than the width W3.

Figure 24:
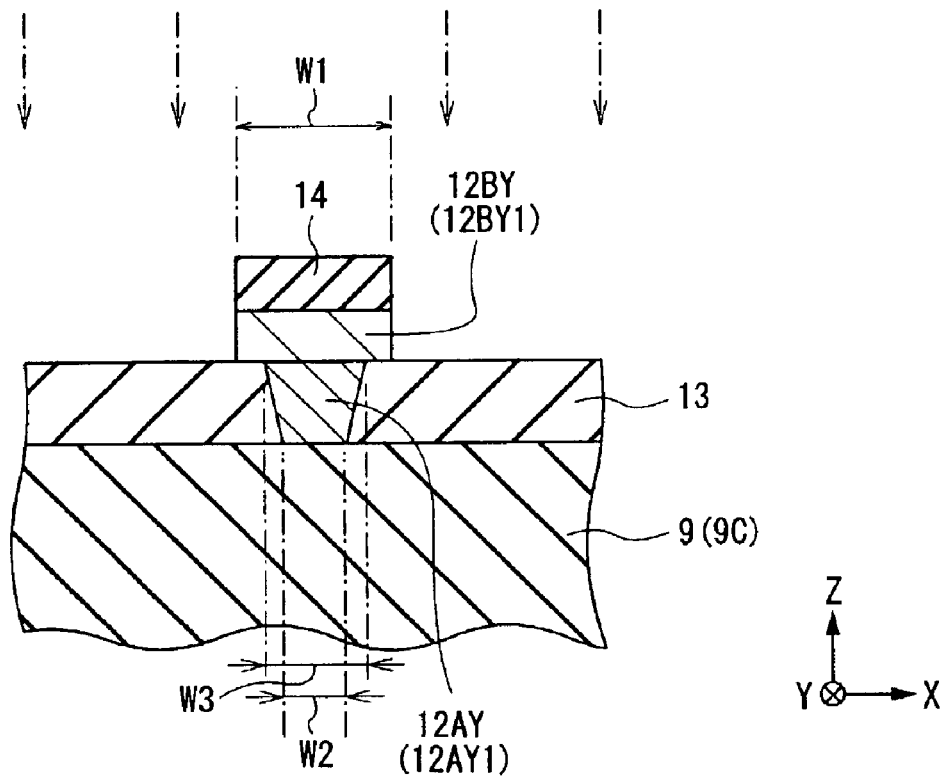
FIG. 24 is a sectional view for describing a step following the step of FIG. 23.
Figure 29:
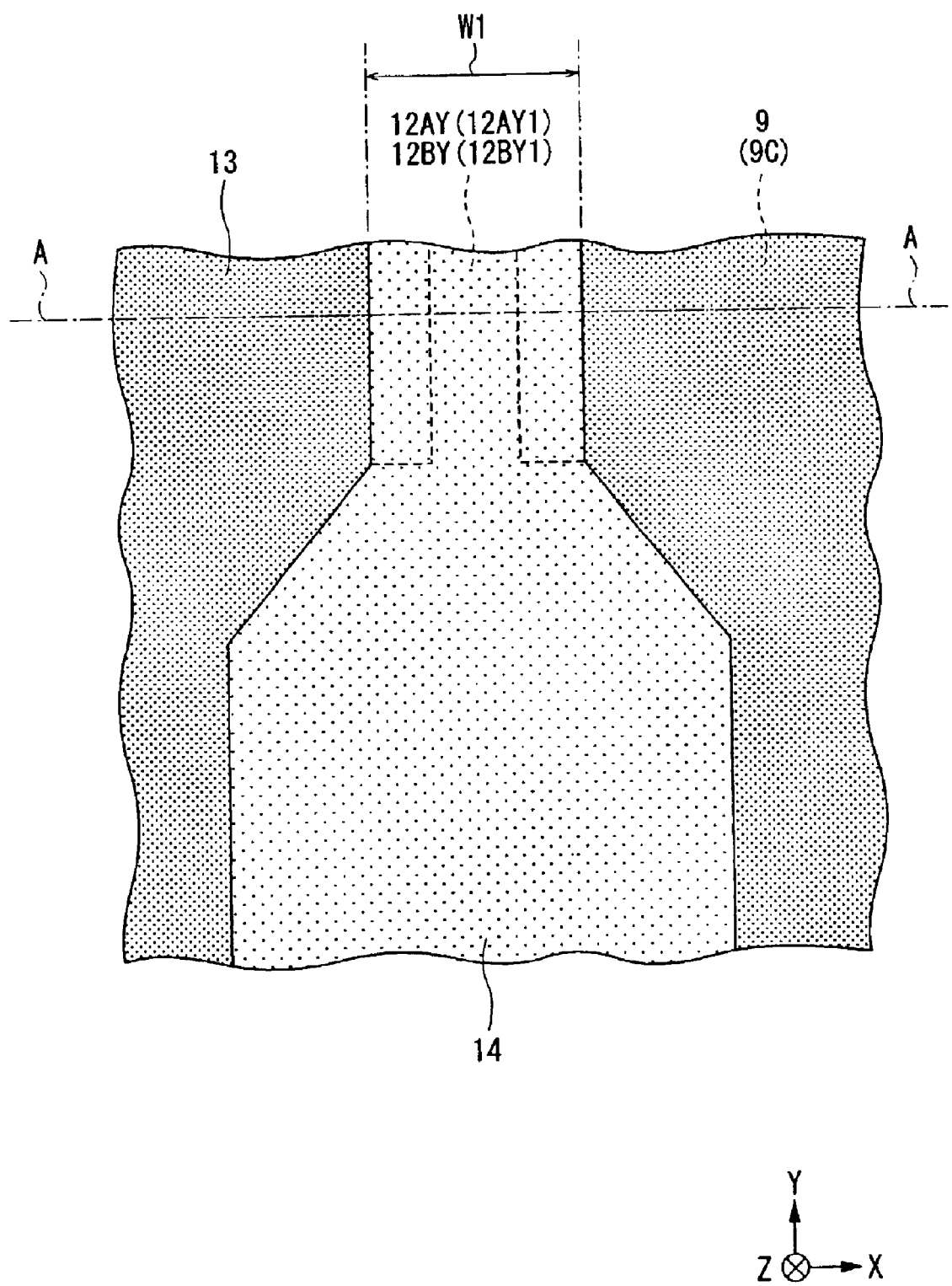
FIG. 29 is a plan view corresponding to the sectional view shown in FIG. 24.

Next, by the use of the buffer layer 14 as a mask, the precursory magnetic layer 12BX is selectively etched, for example, through reactive ion etching (RIE) until the embedding layer 13 is exposed. Through the etching, as shown in FIGS. 24 and 29, a precursory magnetic layer pattern 12BY which is a remained portion of the precursory magnetic layer 12BX after the etching is selectively formed. A corresponding portion 12BY1 of the precursory magnetic layer pattern 12BY corresponding to the front end portion 12B1 has the width W1. As the etching technique for forming the precursory magnetic layer pattern 12BY, ion beam etching may be used instead of RIE, however, in consideration of reduction of time required for etching, RIE is preferably used. Herein, the precursory magnetic layer patterns 12AY and 12BY correspond to a specific example of "two precursory magnetic films" in the invention.

Figure 30:
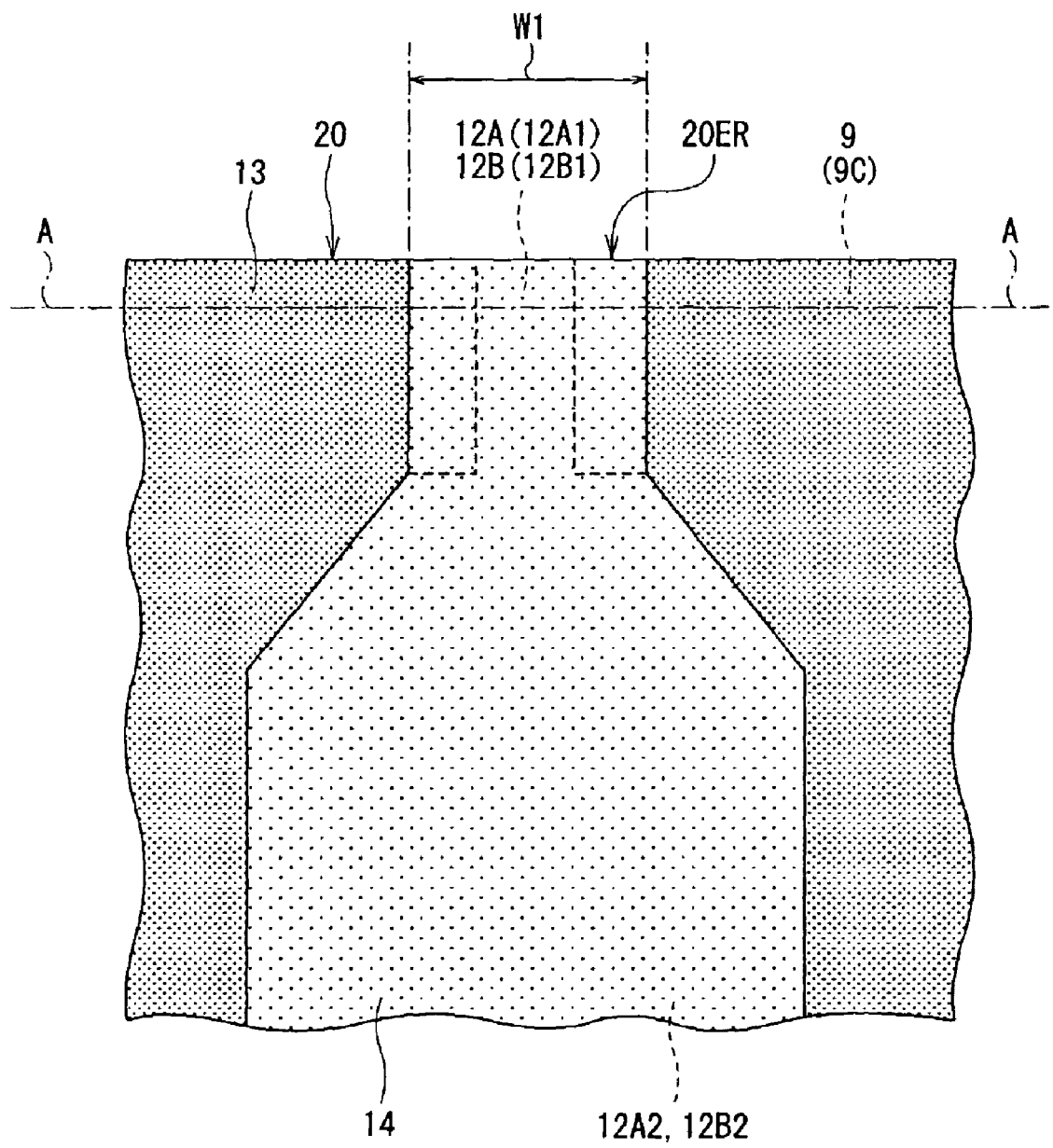
FIG. 30 is a plan view for describing a step following the step of FIG. 29.

Finally, for example, through mechanical processing or polishing, the precursory magnetic layer patterns 12AY and 12BY are polished from above in FIG. 29 to form the air bearing surface 20 and the exposed surface 20E exposed to the air bearing surface 20, as shown in FIG. 30. Through the polishing, the bottom pole portion layer 12A is formed so as to have the region F1 of the exposed surface 20E (a first exposed surface) as a remained portion of the precursory magnetic layer pattern 12AY after polishing, and the top pole portion layer 12B is formed so as to have the region F2 (a second exposed surface) as a remained portion of the precursory magnetic layer pattern 12BY after polishing. Thereby, the main part of the main magnetic pole 12 is completed. Herein, the bottom pole portion layer 12A corresponds to a specific example of "a first magnetic film" in the invention, and the top pole portion layer 12B corresponds to a specific example of "a second magnetic film" in the invention.

As described above, in the method of manufacturing the thin film magnetic head according to the embodiment, after the precursory magnetic layer patterns 12AY and 12BY are formed in separate steps, the precursory magnetic layer patterns 12AY and 12BY are processed so as to form the bottom pole portion layer 12A and the top pole portion layer 12B, respectively, so the structure of the bottom pole portion layer 12A and the structure of the top pole portion layer 12B can be independently configured. Therefore, in the embodiment, a degree of flexibility in each structure of the bottom pole portion layer 12A and the top pole portion layer 12B can be higher, so the thin film magnetic head with various structural characteristics can be manufactured.

Hereinafter, a technique of separately forming the bottom pole portion layer 12A and the top pole portion layer 12B through two forming steps (steps of forming the precursory magnetic layer patterns 12AY and 12BY) which is described in the embodiment is abbreviated as "two-step forming method".

Further, in the embodiment, when the bottom pole portion layer 12A and the top pole portion layer 12B are formed by the use of the two-step forming method, specifically the top pole portion layer 12B is formed by the use of film formation processing (formation of the precursory magnetic layer 12BX) and patterning (patterning of the precursory magnetic layer 12BX by the use of the buffer layer 14 as a mask), so the thickness of an element to be patterned (the precursory magnetic layer 12BX) is thinner than that in the case where the bottom pole portion layer 12A and the top pole portion layer 12B are integrally formed by the use of film formation processing and patterning. In this case, the thickness of the buffer layer 14 for patterning may be thinner, so the buffer layer 14 can be formed with high accuracy. Further, in patterning by the use of the buffer layer 14 with a relatively thin thickness, patterning accuracy can be further improved, compared with the case where the buffer layer 14 with a relatively large thickness is used. Therefore, in the embodiment, the top pole portion layer 12B can be minutely and highly accurately formed so as to have the uniform width W1.

Moreover, in the embodiment, when the bottom pole portion layer 12A and the top pole portion layer 12B are formed, no novel and special technique is required, so the thin film magnetic head can be easily manufactured through existing manufacturing techniques.

Figure 31:
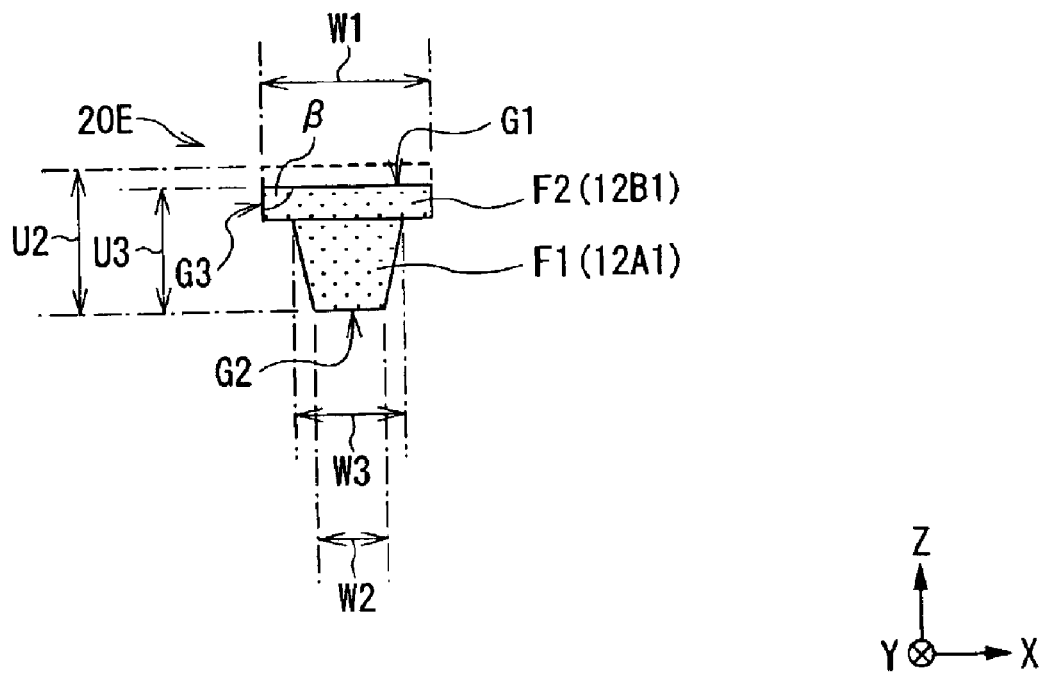
FIG. 31 is a plan view for describing an advantage of the method of manufacturing the thin film magnetic head according to the first embodiment of the invention.
Figure 32:
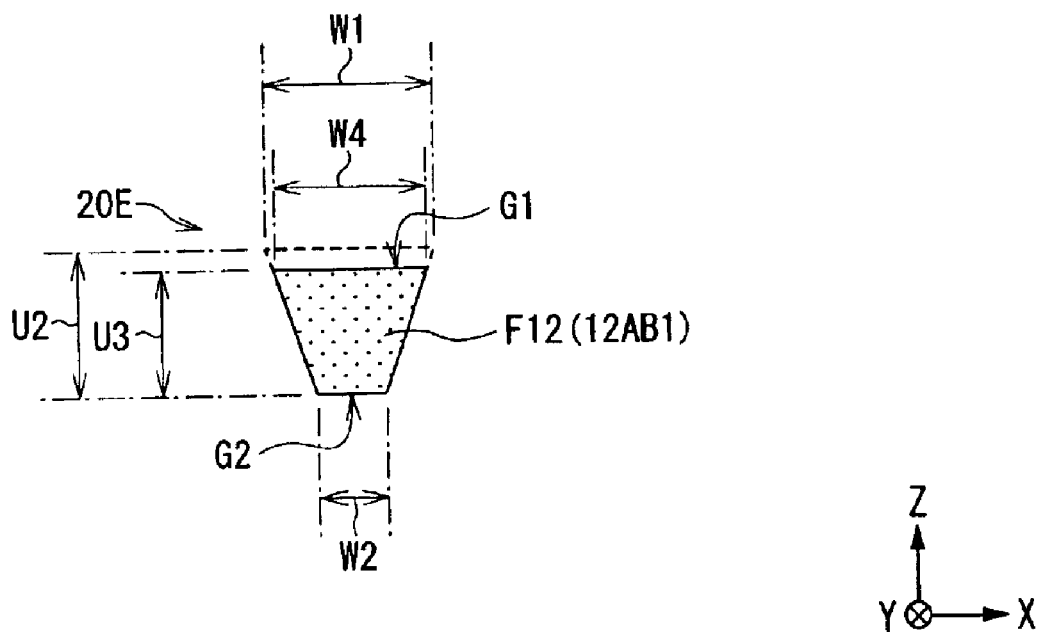
FIG. 32 is a plan view for describing a problem in a method of manufacturing a thin film magnetic head as a modification to the method of manufacturing the thin film magnetic head according to the first embodiment of the invention.

In addition, in the embodiment, the region F2 in the exposed surface 20E has the uniform width W1, so the recording track width can be determined without any variations so as to have a desired target width because of the following reason. FIG. 31 shows a view for describing an advantage of a method of manufacturing the thin film magnetic head according to the embodiment which has the exposed surface 20E with the structure shown in FIG. 3, and FIG. 32 shows a view for describing a problem in a method of manufacturing the thin film magnetic head having the exposed surface 20E with the structure shown in FIG. 17 as a modification.

In the modification (refer to FIG. 32), as described above, the pole portion layer 12AB is a single-layer structure, so in view of simplification of forming steps, the modification has an advantage, compared with the embodiment in which a laminate of the bottom pole portion layer 12A and the top pole portion layer 12B is comprised. However, when the pole portion layer 12AB is formed so that the exposed surface 20E has the thickness U2 and the top edge G1 with the width W1, the exposed surface 20E has the forming thickness U3 smaller than the thickness U2 (U3<U2) due to an error or the like relating to thickness control during formation, thereby there is a possibility that the top edge G1 has the width W4 smaller than the width W1 (W4<W1). In this case, it is difficult to determine the recording track width according to a target width (W1) without variations.

On the other hand, in the embodiment (refer to FIG. 31), the region F2 in the exposed surface 20E has the uniform width W1 and a rectangular shape, so even if an error in the forming thickness arises when forming the top pole portion layer 12B, and thereby the exposed surface 20E has the thickness U3 smaller than the thickness U2, as long as the error falls within a range of the thickness of the top pole portion layer 12B, the width W1 of the top edge G1 can be fixedly maintained. Therefore, in the embodiment, unlike the modification, a change in the width W1 of the top edge G1 can be prevented, so the recording track width can be determined to have a target width without variations. Considering that the recording track width is determined, an angle β between the side edge G3 and the top edge G1 in the region F2 is preferably 90°.

[Second Embodiment]

Next, a second embodiment of the invention will be described below.

Figure 33:
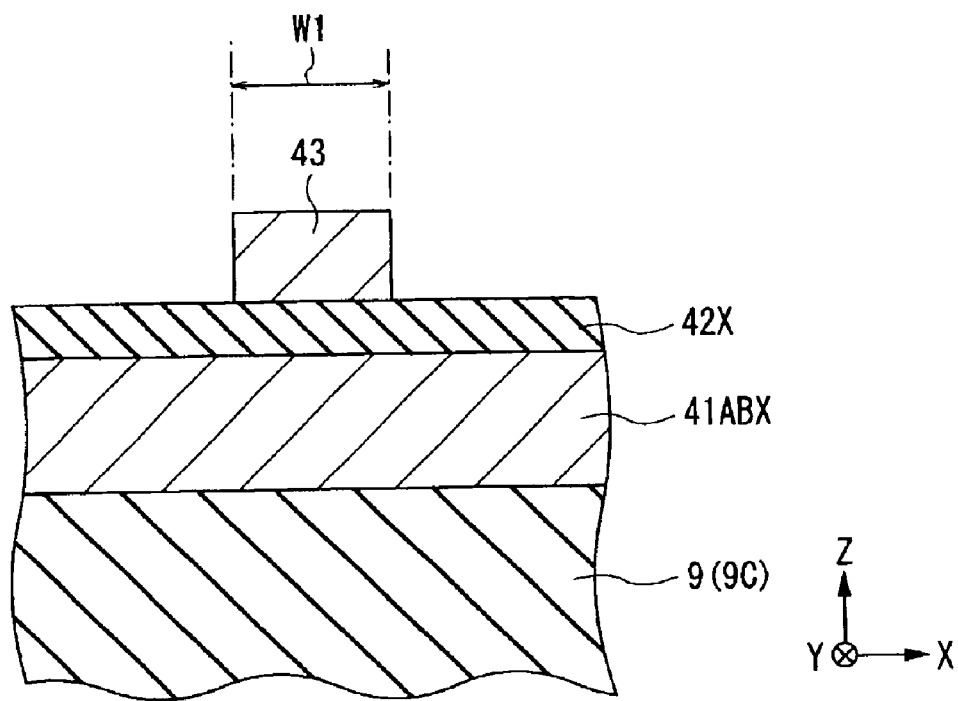
FIG. 33 is a sectional view for describing a step in a method of manufacturing a thin film magnetic head according to a second embodiment of the invention.
Figure 34:
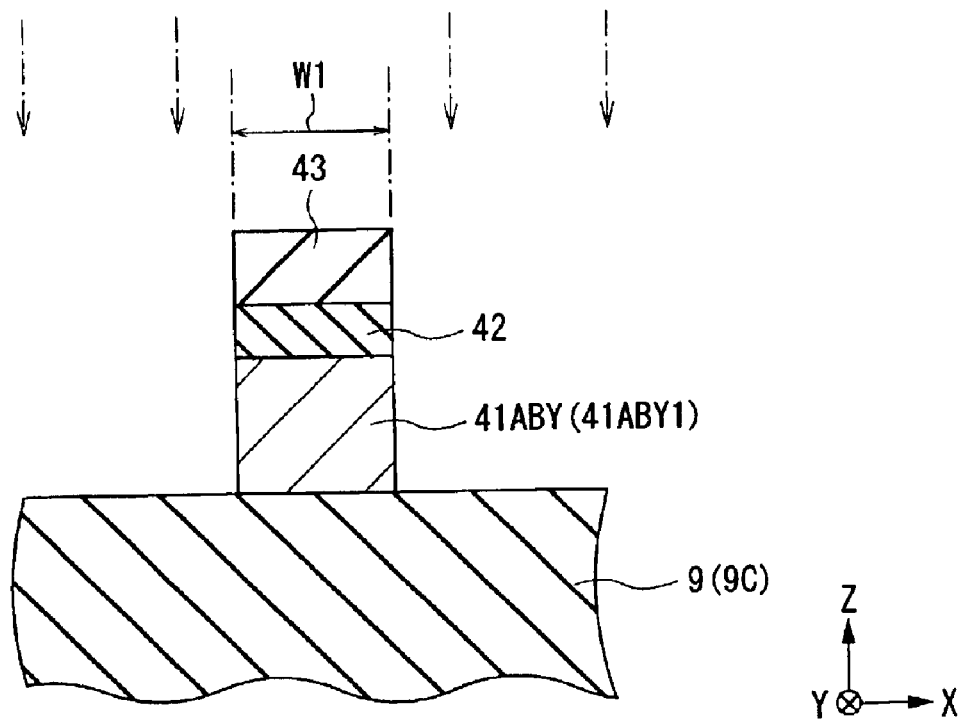
FIG. 34 is a sectional view for describing a step following the step of FIG. 33.
Figure 35:
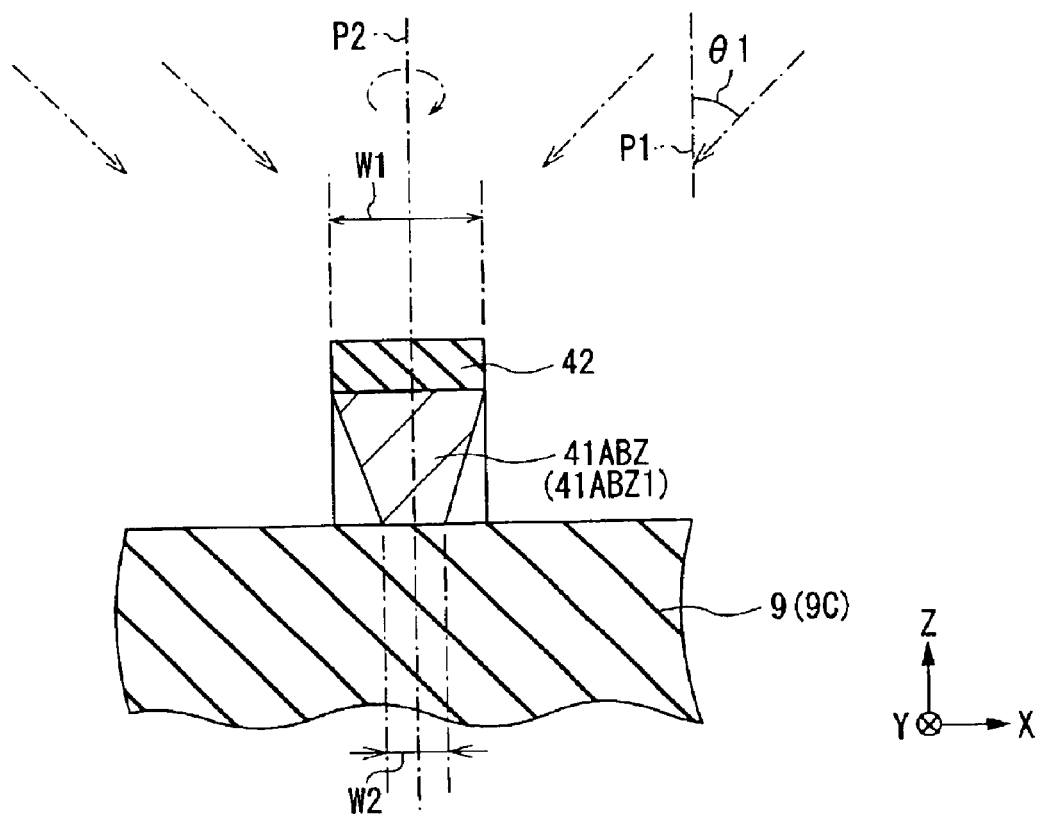
FIG. 35 is a sectional view for describing a step following the step of FIG. 34.
Figure 36:
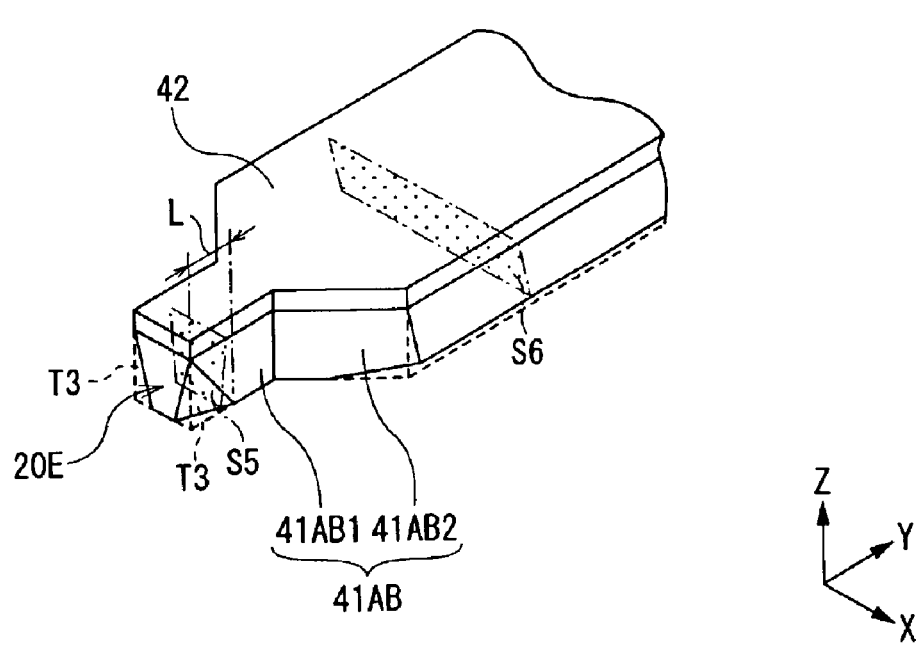
FIG. 36 is a perspective view of a main part of the thin film magnetic head according to the second embodiment of the invention.

FIGS. 33 through 36 are views for describing a method of manufacturing a thin film magnetic head according to the second embodiment of the invention. In the method of manufacturing the thin film magnetic head according to the embodiment, the main part of the main magnetic pole is formed through etching instead of the two-step forming method described in the first embodiment. FIGS. 33 through 35 show sectional views of each step in the method of manufacturing the thin film magnetic head according to the embodiment, and FIG. 36 shows an enlarged perspective view of the main part (the main magnetic pole) of the thin film magnetic head manufactured through the method of manufacturing the thin film magnetic head according to the embodiment. In FIGS. 33 through FIG. 36, like components are denoted by like numerals as of the first embodiment.

At first, referring to FIG. 36, the structure of the thin film magnetic head will be described below. The thin film magnetic head comprises a pole portion layer 41AB corresponding to a complex of the bottom pole portion layer 12A and the top pole portion layer 12B described in the first embodiment. The pole portion layer 41AB includes a front end portion 41AB1 corresponding to a complex of the front end portions 12A1 and 12B1 in the first embodiment and a rear end portion 41AB2 corresponding to a complex of the rear end portions 12A2 and 12B2 in the first embodiment. Herein, the front end portion 41AB1 corresponds to a specific example of "a track width determining portion" in the invention.

The exposed surface 20E of the pole portion layer 41AB1 has an inverted trapezoidal shape, as in the case shown in FIG. 17 in <<Modification 1-11>> of the first embodiment. In a front portion of the front end portion 41AB, for example, a top end width thereof is uniform irrespective of a distance from the air bearing surface 20, and a bottom end width is reduced with increasing proximity to the air bearing surface 20. In other words, the structure of the front end portion 41AB1 corresponds to a remaining structure in the case where two triangular pyramids T3 with a surface in the Y-axis direction in the drawing as a bottom surface are removed from a rectangular prism. The rear end portion 41AB2 has, for example, substantially the same structure as those of the rear end portions 12A2 and 12B2.

A cross sectional area S5 parallel to the exposed surface 20E in the front portion of the front end portion 41AB1 is reduced with increasing proximity to the exposed surface 20E, and the cross sectional area S5 is smaller than a cross sectional area S6 parallel to the exposed surface 20E in the rear end portion 41AB2 (S5<S6).

The structure of the thin film magnetic head according to the embodiment is equivalent to that according to the first embodiment (refer to FIGS. 1A, 1B and 2) except for the structure of the pole portion layer 41AB. In FIG. 36, the pole portion layer 41AB and a buffer layer 42 corresponding to the buffer layer 14 described in the first embodiment are shown.

Next, referring to FIGS. 33 through 35, the method of manufacturing the thin film magnetic head according to the embodiment will be described below. Only a step of forming the pole portion layer 41AB will be mainly described below, and steps of forming any other components constituting the thin film magnetic head has been already described in the first embodiment, and will not be further described.

When forming the pole portion layer 41AB, at first, after the gap layer portion 9C is formed, as shown in FIG. 33, a precursory magnetic layer 41ABX is formed of, for example, a material with a high saturated magnetic flux density such as Permalloy on the gap layer portion 9C, for example, through sputtering.

Next, as shown in FIG. 33, a precursory buffer layer 42X is formed of, for example, a non-conductive and non-magnetic material with lower etching speed than the material of the precursory magnetic layer 41ABX such as alumina on the precursory magnetic layer 41ABX, for example, through sputtering.

Then, as shown in FIG. 33, a mask 43 for patterning is selectively formed of, for example, Permalloy or the like on the precursory buffer layer 42X, for example, through plating. For example, the mask 43 is formed so that the mask 43 has a plane shape corresponding to a plane shape of the pole portion layer 41AB which is formed in a later step, and a portion corresponding to the front end portion 41AB1 has the width W1. Further, the material of the mask 43 is not necessarily limited to the above-described Permalloy, and any material which can be processed so as to have a predetermined pattern shape and has as high hardness as the material can function as a mask can be freely used instead of the Permalloy.

Then, by the use of the mask 43, the precursory buffer layer 42X and the precursory magnetic layer 41ABX are selectively etched, for example, through RIE. Through etching, as shown in FIG. 34, the precursory buffer layer 42X is patterned to selectively form the buffer layer 42, and the precursory magnetic layer 41ABX is patterned to selectively form a precursory magnetic layer pattern 41ABY. The precursory magnetic layer pattern 41ABY is formed so as to include a corresponding portion 41ABY1 (with the width W1) corresponding to the front end portion 41AB1. Herein, the precursory magnetic layer pattern 41ABY corresponds to a specific example of "a first precursory magnetic layer pattern" in the invention, and the buffer layer 42 corresponds to a specific example of "a non-magnetic layer pattern" in the invention.

Next, while an ion beam is applied at an angle (irradiation angle) θ1 of approximately 45° or over, more specifically approximately 45° to 80° from a line (perpendicular line) P1 orthogonal to an extending surface of the precursory magnetic layer pattern 41ABY, the precursory magnetic layer pattern 41ABY is etched by the use of the buffer layer 42 as a mask. In etching, the precursory magnetic layer pattern 41ABY is rotated around, for example, a center line P2 of the precursory magnetic layer pattern 41ABY parallel to the perpendicular line P1 as an axis. Through the etching, as shown in FIG. 35, a precursory magnetic layer pattern 41ABZ including a corresponding portion 41ABZ1 corresponding to the front end portion 41AB1 is selectively formed. In the etching, by the existence of a wide rear portion (a portion corresponding to the rear end portion 41AB2) constituting the precursory magnetic layer pattern 41ABY, only a side surface portion of a front end side of the corresponding portion 41ABY1 is selectively etched, and it is difficult to etch any other portions, and an etching amount of the corresponding portion 41ABY1 is reduced with increasing proximity to the bottom and the rear. Further, in the etching, as shown in FIG. 36, not only the corresponding portion 41ABY1 but also a side surface portion of a rear portion in the precursory magnetic layer pattern 41ABY is partially etched. Herein, the precursory magnetic layer pattern 41ABZ corresponds to a specific example of "a second precursory magnetic layer pattern" in the invention.

Finally, as in the case of the first embodiment shown in FIG. 30, through mechanical processing or polishing, the precursory magnetic layer pattern 41ABZ is polished to form the air bearing surface 20E, and thereby, as shown in FIG. 36, the pole portion layer 41AB having the exposed surface 20E with an inverted trapezoidal shape is formed. Further, when the pole portion layer 41AB is formed, for example, in order to smoothly flow magnetic fluxes in the front end portion 41AB1, a length L of a front portion (a portion where the width is changed) in the front end portion 41AB1 is approximately from 1 to 2.5 times, more preferably approximately twice as large as the width W1 of the top edge G1.

In the thin film magnetic head according to the embodiment, the pole portion layer 41AB is formed so that the cross sectional area S5 of the front end portion 41AB1 is smaller than the cross sectional area S6 of the rear end portion 51AB2, and the exposed surface 20E has an inverted trapezoidal shape, so by the same effects as those in the first embodiment, the strength of the perpendicular magnetic field can be secured, and harmful effects due to the occurrence of skew can be prevented.

Specifically, in the embodiment, the cross sectional area S5 of the front portion in the front end portion 41AB1 is reduced with increasing proximity to the exposed surface 20E, so by the same effects as those in the cases described in <<Modifications 1-7 and 1-8>> (refer to FIGS. 13 and 14) of the first embodiment, the strength of the perpendicular magnetic field can be further increased. More specifically, when the strengths of the perpendicular magnetic fields in the thin film magnetic head according to the embodiment and the thin film magnetic head described in <<Modification 1-11>> as a modification (refer to FIGS. 17 and 18) were determined, it turned out that the strength of the perpendicular magnetic field in the embodiment was approximately 3 to 4% larger than that in the modification.

In the method of manufacturing the thin film magnetic head according to the embodiment, the precursory magnetic layer pattern 41ABY is undercut through dry etching, so the pole portion layer 41AB having the exposed surface 20E with an undercut structure is finally formed. Therefore, the pole portion layer 41AB with a structure which is difficult to be formed only by the film formation techniques can be formed, so the thin film magnetic head with various structural characteristics can be manufactured.

Further, actions, effects, advantages and modifications of the thin film magnetic head or its manufacturing method according to the second embodiment except for those described above are equal to those according to the first embodiment.

In the embodiment, by the use of ion beam etching, the pole portion layers having various structures described in the first embodiment and its modifications and any pole portion layer with any other structure can be formed.

<<Modification 2-1>>

Figure 37:
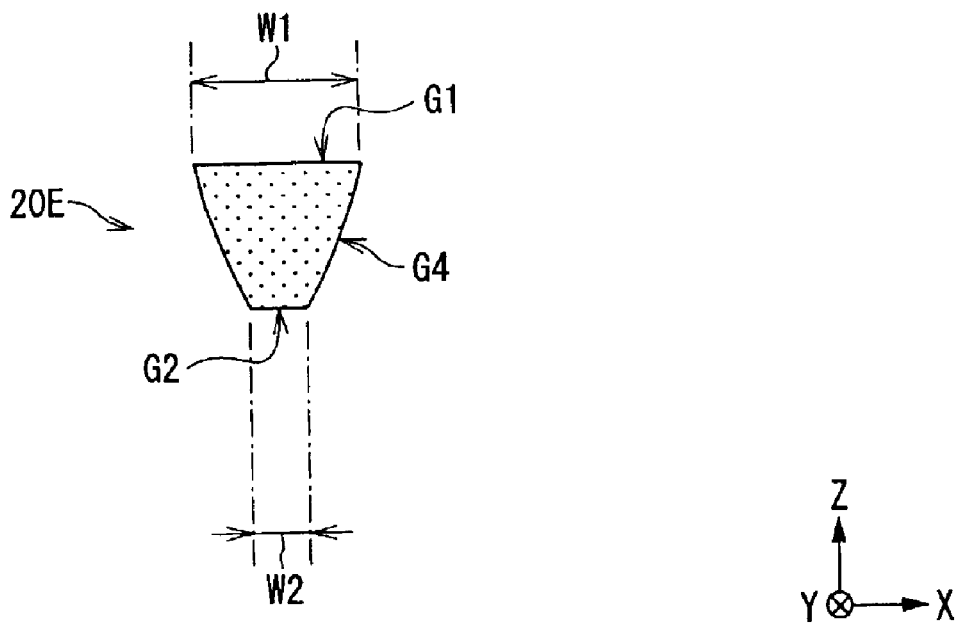
FIG. 37 is a plan view of a still modification to the structure of the exposed surface.

For example, in <<Modification 1-11>> of the first embodiment, as shown in FIG. 17, the exposed surface 20E is formed so that a side edge G4 of the region F1 is formed in a linear shape, but it is not necessarily limited to this. For example, as shown in FIG. 37, the exposed surface 20E can be formed so that the side edge G4 is convexly curved. FIG. 37 shows a modification of the exposed surface 20E, and corresponds to FIG. 3. Further, FIGS. 38 through 41 show views for describing a method of manufacturing a thin film magnetic head as a modification to that according to the embodiment, and correspond to FIGS. 33 through 35.

The exposed surface 20E with the convexly curved side edge G4 can be formed through the following steps. At first, after the gap layer portion 9C is formed, as shown in FIG. 38, a precursory magnetic layer 51ABX is formed of, for example, a material with a high saturated magnetic flux density such as Permalloy on the gap layer portion 9C, for example, through sputtering.

Figure 38:
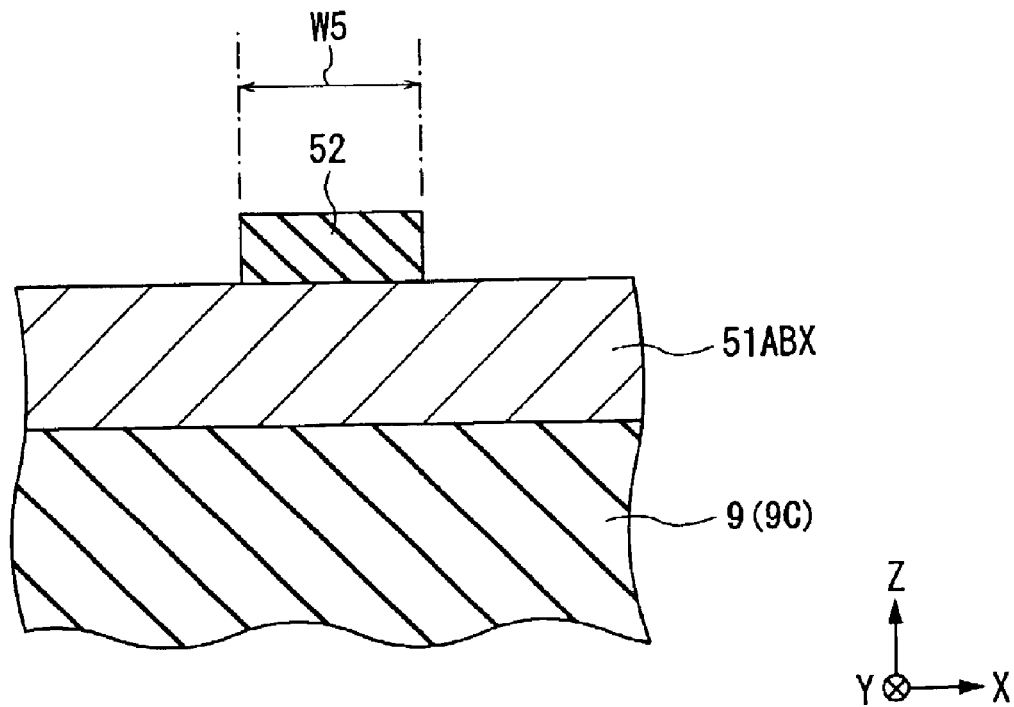
FIG. 38 is a sectional view for describing a step in a method of manufacturing a thin film magnetic head as a modification to the method of manufacturing the thin film magnetic head according to the second embodiment of the invention.

Next, as shown in FIG. 38, on the precursory magnetic layer 51ABX, a buffer layer 52 is selectively formed of, for example, a non-conductive and non-magnetic material with lower etching speed than the material of the precursory magnetic layer 51ABX such as alumina. The buffer layer 52 is formed so that the buffer layer 52 has, for example, a plane shape like the buffer layer 14 described in the first embodiment, and a portion corresponding to the top edge G1 has a width W5 larger than the width W1 (W5>W1).

Figure 39:
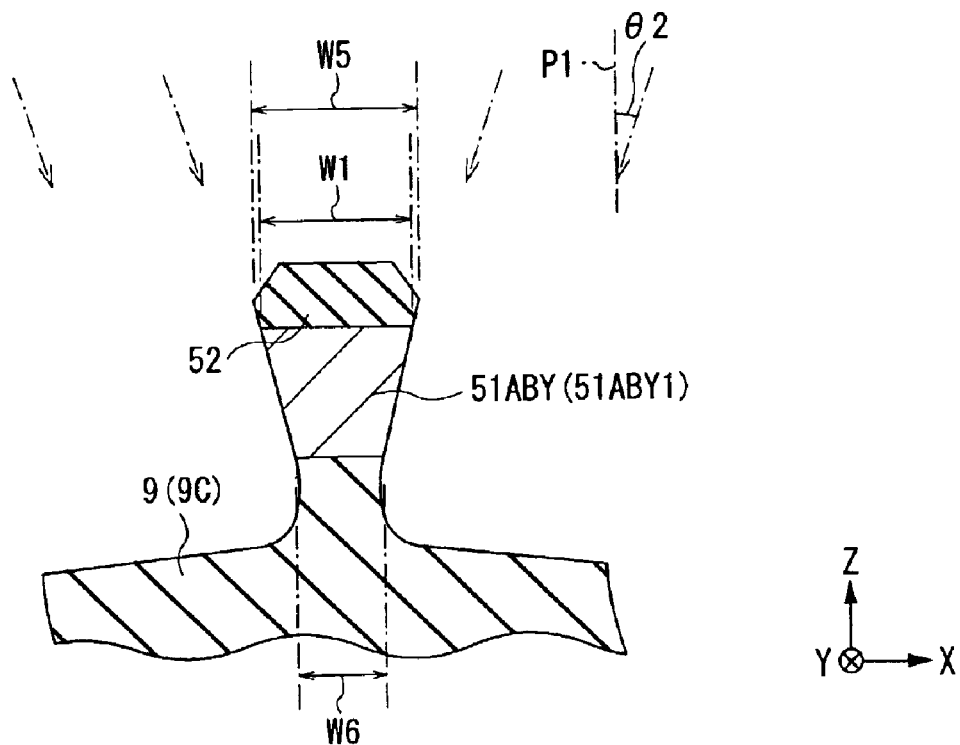
FIG. 39 is a sectional view for describing a step following the step of FIG. 38.

Next, while an ion beam is applied at an angle (irradiation angle) θ2 of approximately 40°±30° from the line (perpendicular line) P1 orthogonal to an extending surface of the precursory magnetic layer 51ABX, etching is carried out as a whole by the use of the buffer layer 52 as a mask. The precursory magnetic layer 51ABX is patterned through the etching to selectively form a precursory magnetic layer pattern 51ABY including a corresponding portion 51ABY1, as shown in FIG. 39. The precursory magnetic layer 51ABX is etched diagonally from above through the buffer layer 52 with lower etching speed, thereby the corresponding portion 51ABY1 is formed so as to have a top end with the width W1 smaller than the width W5 (W1<W5) and a bottom end with a width W6 smaller than the width W1 (W6<W1).

Further, in etching, mainly a side portion of the buffer layer 52 is partially removed by a lateral component of etching, and the gap layer portion 9C is partially dug down by a longitudinal component of etching. Herein, the precursory magnetic layer pattern 51ABY corresponds to a specific example of "a first precursory magnetic layer pattern" in the invention.

Figure 40:
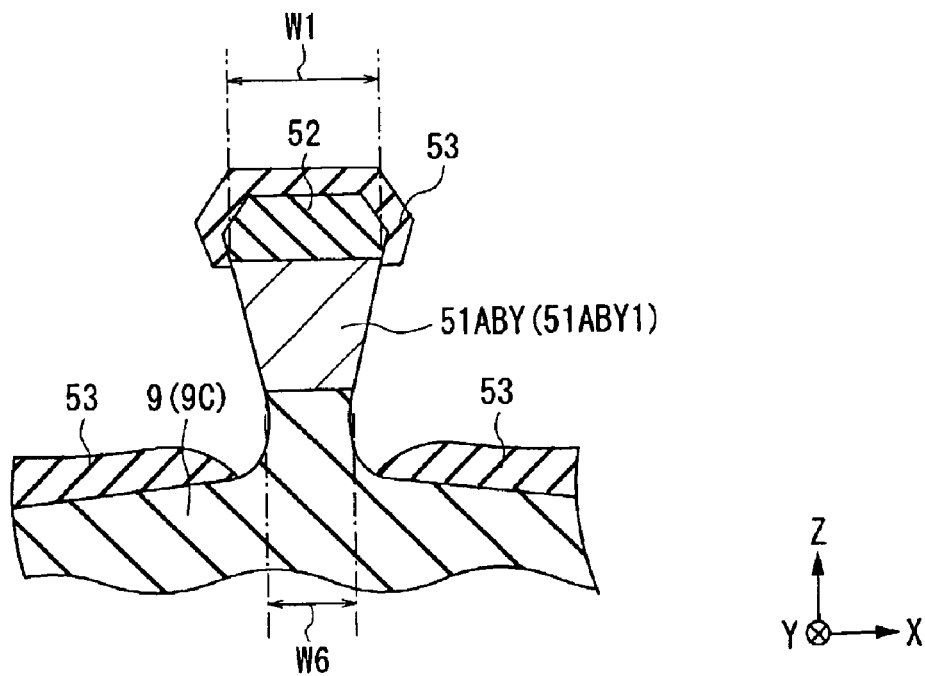
FIG. 40 is a sectional view for describing a step following the step of FIG. 39.

Next, as shown in FIG. 40, for example, through sputtering, a coating layer 53 is formed of, for example, a non-conductive and non-magnetic material with lower etching speed than the material of the precursory magnetic layer pattern 51ABY such as alumina as a whole. When the coating layer 53 is formed, time for film formation is adjusted to be relatively long so that the surroundings of a top portion of the precursory magnetic layer pattern 51ABY are coated by the coating layer 53 with a sufficient thickness. Herein, the buffer layer 52 and the coating layer 53 correspond to a specific example of "a coating layer" in the invention.

Figure 41:
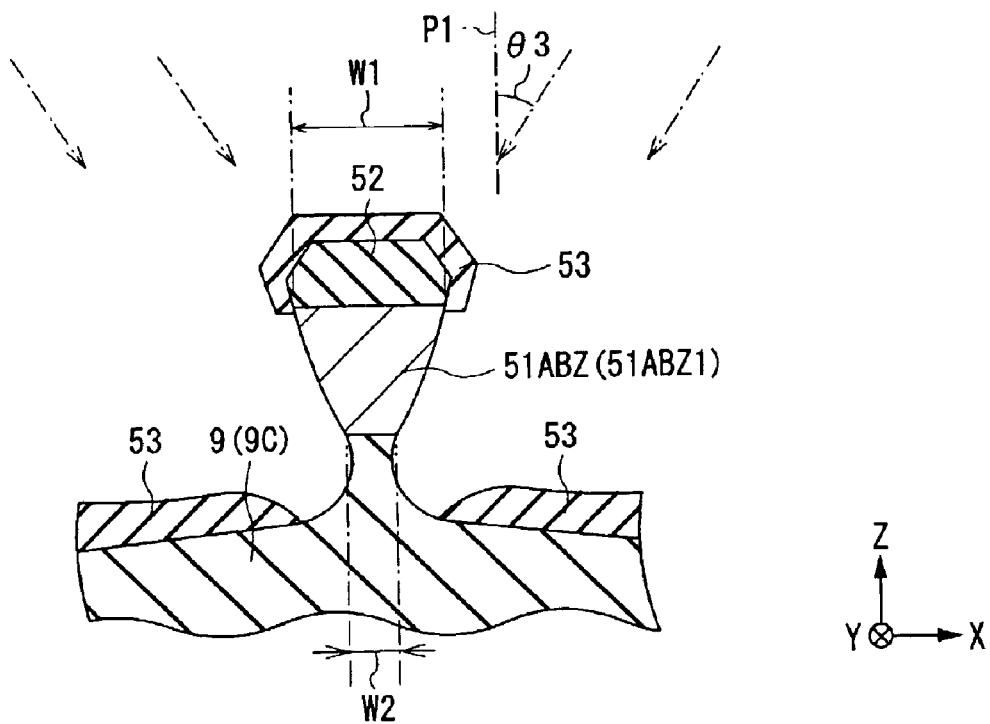
FIG. 41 is a sectional view for describing a step following the step of FIG. 40.

Then, while an ion beam is applied at a relatively small angle, for example, an angle (irradiation angle) $\theta 3$ of approximately $37.5°±7.5°$ from the perpendicular line P1 to an extending surface of the precursory magnetic layer pattern 51ABY, the precursory magnetic layer pattern 51ABY is etched by the use of the buffer layer 52 and the coating layer 53 as masks. Through etching, as shown in FIG. 41, a precursory magnetic layer pattern 51ABZ including a corresponding portion 51ABZ1 is selectively formed. An ion beam is applied to the precursory magnetic layer pattern 51ABY diagonally from above through the buffer layer 52 with low etching speed and the coating layer 53 with a wide width, thereby an etching amount of a side surface portion of the corresponding portion 51ABY1 is reduced with increasing proximity to the bottom. Therefore, the corresponding portion 51ABZ1 is formed so as to have a top end with the width W1, a bottom end with the width W2 smaller than the width W6 and a width reduced in increasing proximity to the gap layer 9. More specifically, a side end surface of the corresponding portion 51ABZ1 is, for example, convexly curved. Herein, the precursory magnetic layer pattern 51ABZ corresponds to a specific example of "a second precursory magnetic layer pattern" in the invention.

Finally, as in the case of the first embodiment shown in FIG. 30, through mechanical processing or polishing, the precursory magnetic layer pattern 51ABZ is polished so as to form the exposed surface 20E with the convexly curved side edge G4, as shown in FIG. 37.

In this case, mainly by the existence of the coating layer 53 with a wide width, the irradiation angle $\theta 2$ of the ion beam is not required to be relatively large, and in the case where the ion beam is applied at a relatively small irradiation angle $\theta 3$, the precursory magnetic layer pattern 51ABY is undercut. Therefore, even in the case of using dry etching, the precursory magnetic layer pattern 51ABZ can be formed under relatively simple etching conditions, so the thin film magnetic head with various structural characteristics can be easily manufactured.

In addition, the side edge G4 of the exposed surface 20E is not necessarily convexly curved, and may be concavely curved.

<<Modification 2-2>>

Figure 42:
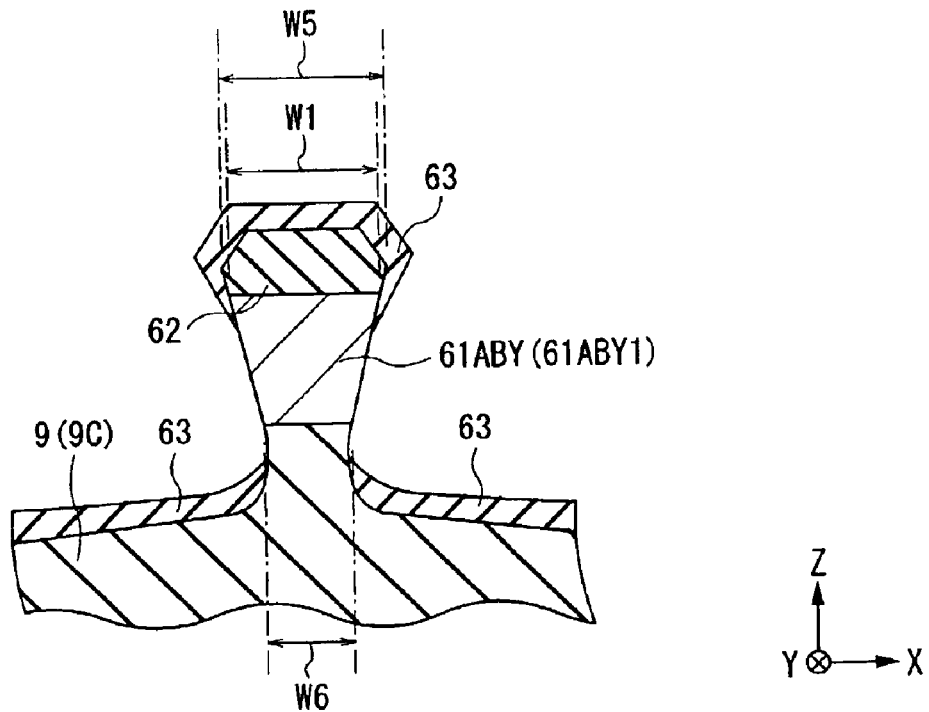
FIG. 42 is a sectional view for describing a step in a method of manufacturing a thin film magnetic head as another modification to the method of manufacturing the thin film magnetic head according to the second embodiment of the invention.
Figure 43:
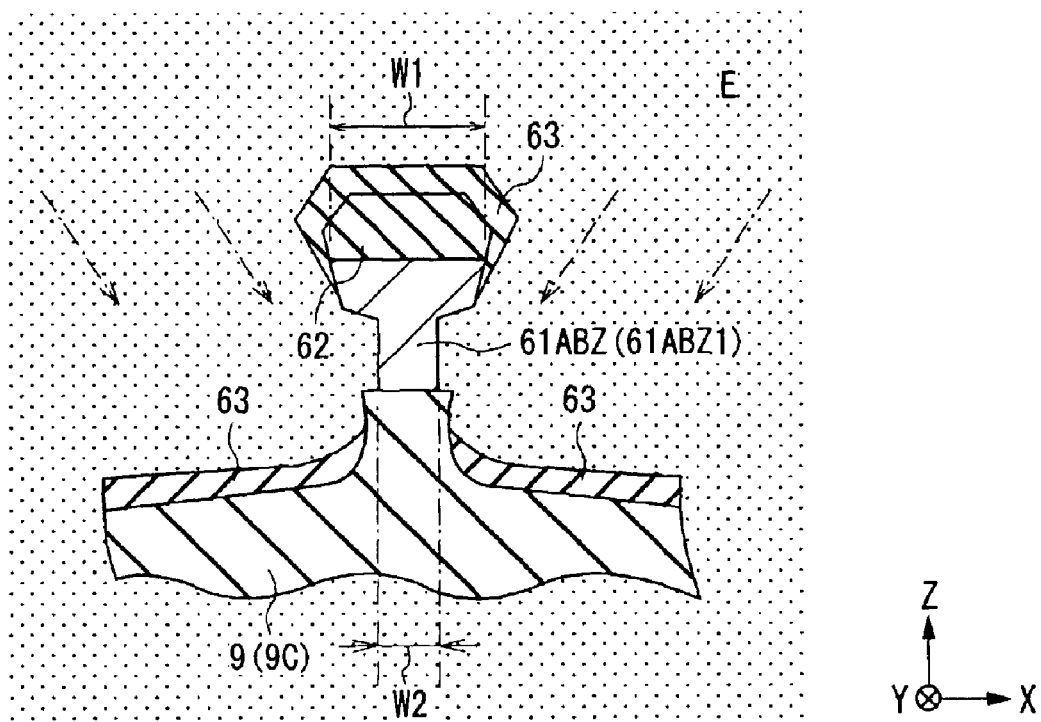
FIG. 43 is a sectional view for describing a step following the step of FIG. 42.

Moreover, for example, the exposed surface 20E (refer to FIG. 10) described in <<Modification 1-4>> of the first embodiment can be formed through wet etching. FIGS. 42 and 43 show views for describing a method of manufacturing a thin film magnetic head as another modification to the method of manufacturing the thin film magnetic head according to the embodiment, and correspond to FIGS. 33 through 35.

The exposed surface 20E shown in FIG. 10 can be formed through the following steps. At first, as shown in FIG. 42, a precursory magnetic layer pattern 61ABY corresponding to the precursory magnetic layer pattern 51ABY and a buffer layer 62 corresponding to the buffer layer 52 are formed by the use of forming steps shown in FIGS. 38 and 39 in <<Modification 2-1>>. The precursory magnetic layer pattern 61ABY is formed so as to include a corresponding portion 61ABY1. Herein, the precursory magnetic layer pattern 61ABY corresponds to a specific example of "a first precursory magnetic layer pattern" in the invention.

Next, as shown in FIG. 42, for example, through sputtering, a coating layer 63 is formed of, for example, a non-magnetic material with high corrosion resistance such as alumina as a whole. When the coating layer 63 is formed, for example, unlike the case where the coating layer 53 is formed in <<Modification 2-1>>, time for film formation is adjusted to be relatively short so that the coating layer 63 which coats the surroundings of a top portion of the precursory magnetic layer pattern 61ABY has a thin thickness. Herein, the buffer layer 62 and the coating layer 63 correspond to a specific example of "a coating layer" in the invention.

Then, a formed body including the precursory magnetic layer pattern 61ABY which is formed until the previous step is immersed in an etchant E which can selectively dissolve only the precursory magnetic layer pattern 61ABY to carry out wet etching on the precursory magnetic layer pattern 61ABY by the use of the buffer layer 62 and the coating layer 63 as masks. For example, when the precursory magnetic layer pattern 61ABY is made of an iron-based alloy such as Permalloy, an iron (II) chloride solution is used as the etchant E. Through etching, only a bottom portion of the precursory magnetic layer pattern 61ABY which is not coated with the coating layer 63 made of alumina or the like which is not dissolved in the etchant E is locally etched to form a precursory magnetic layer pattern 61ABZ including a corresponding portion 61ABZ1 as shown in FIG. 43. The corresponding portion 61ABZ1 is formed so as to have a top end with the width W1 and a bottom end with the width W2 smaller than the width W6 and a cross sectional shape corresponding to the exposed surface 20E shown in FIG. 10. In addition, in wet etching, in order to adjust an etching amount, for example, a composition and a concentration of the enchant E, immersing time and so on are adjusted. Herein, the precursory magnetic layer pattern 61ABZ corresponds to a specific example of "a second precursory magnetic layer pattern" in the invention.

Finally, as in the case of the first embodiment shown in FIG. 30, through mechanical processing or polishing, the precursory magnetic layer pattern 51ABZ is polished to form the exposed surface 20E with a structure shown in FIG. 10.

In this case, by the use of wet etching, compared with the use of dry etching, the precursory magnetic layer pattern 61ABY is locally and pronouncedly undercut, so the precursory magnetic layer pattern 61ABZ with a pronounced undercut structure is formed. Therefore, the precursory magnetic layer pattern 61ABZ with a structure which is difficult to be formed through dry etching can be formed, so the thin film magnetic head with various structural characteristics can be manufactured.

Although the present invention is described referring to the embodiments, the invention is not limited to the embodiments, and is applicable to various modifications. In other words, the structure and the manufacturing method of the thin film magnetic head and so on are not necessarily limited to those described in the above embodiments, and can be freely modified as long as the strength of the perpendicular magnetic filed can be secured and the recording performance of the thin film magnetic head can be improved based on the structure of the main magnetic pole which is formed so that (1) the width of an edge in the exposed surface on the medium-outgoing side is larger than the width of another edge on the medium-incoming side, and the width of the edge on the medium-outgoing side is equal to or larger than the width of the exposed surface in any middle position between the edge on the medium-outgoing side and the edge on the medium-incoming side, or (2) the bottom pole portion layer is extended from a position far from the air bearing surface, and one end surface corresponding to the thickness of the top pole portion layer forms the exposed surface.

Figure 44:
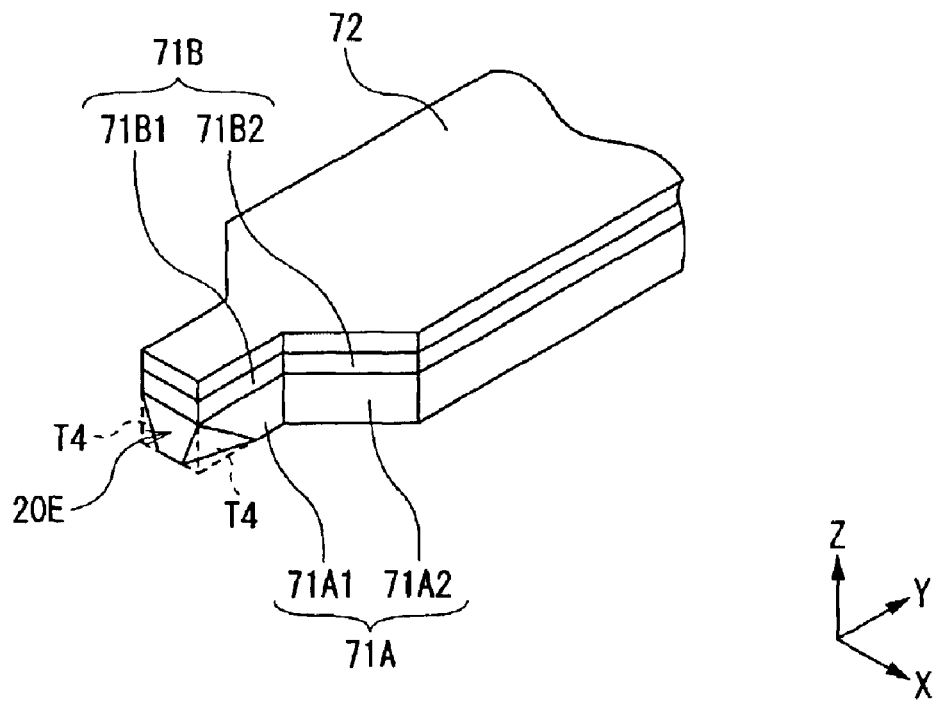
FIG. 44 is a perspective view of a modification to a pole portion layer.
Figure 45:
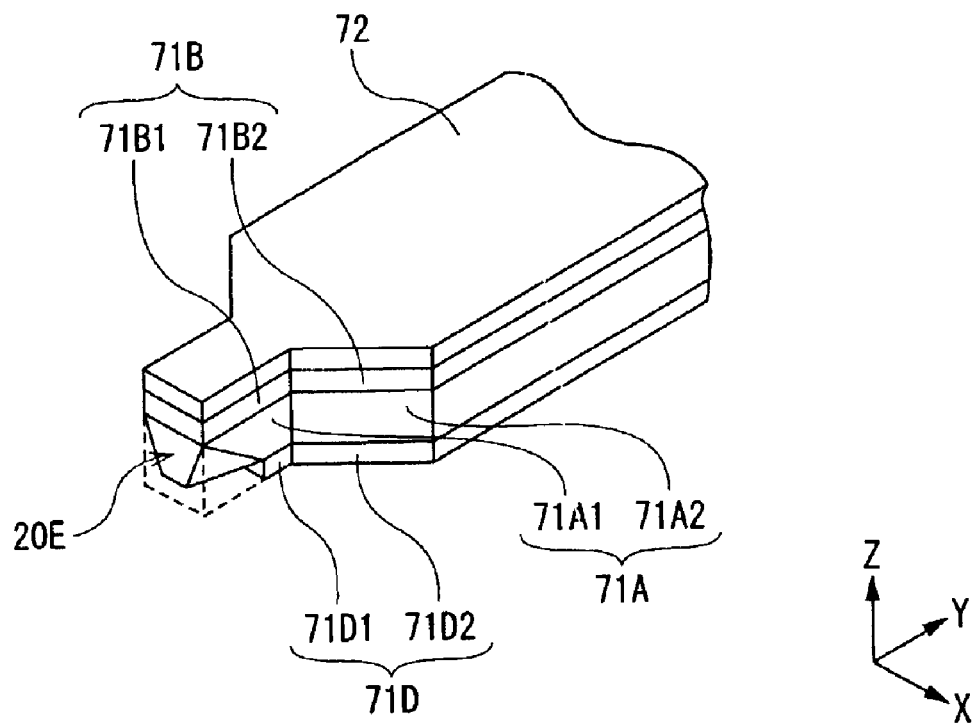
FIG. 45 is a perspective view of another modification to the pole portion layer.

More specifically, for example, by the use of a combination of the two-step forming method described in the first embodiment and dry etching described in the second embodiment, for example, as shown in FIGS. 44 and 45, pole portion layers with any characteristic structure other than the structures shown in the above embodiments can be formed. FIGS. 44 and 45 show other modifications to the structure of the pole portion layer, and correspond to FIG. 36.

In FIG. 44, when a bottom pole portion layer 71A (a front end portion 71A1 and a rear end portion 71A2) and a top pole portion layer 71B (a front end portion 71B1 and a rear end portion 71B2) are formed, for example, by the use of the two-step forming method, the case where dry etching is used as a technique for forming the bottom pole portion layer 71A is shown. The bottom pole portion layer 71A has the same structure as, for example, that of the pole portion layer 41AB shown in FIG. 36, and the top pole portion layer 71B has the same structure as, for example, that of the top pole portion layer 12B shown in FIG. 2. The exposed surface 20E has a hexagonal shape which is a combination of a rectangle and an inverted trapezoid. Also in this case, the effects equal to those of the above embodiments can be obtained. In addition, a buffer layer 72 shown in FIG. 44 corresponds to the buffer layer 42 shown in FIG. 36.

In FIG. 45, for example, when the bottom pole portion layer 71A and the top pole portion layer 71B shown in FIG. 44 are formed, the case where a step of forming an additional pole portion layer 71D (a front end portion 71D1 and a rear end portion 71D2) on the bottom of the bottom pole portion layer 71A is added is shown. The additional pole portion layer 71D has substantially the same structure as, for example, that of the top pole portion layer 71B except that the additional pole portion layer 71D is recessed from the air bearing surface 20. The exposed surface 20E has a hexagonal shape as in the case shown in FIG. 44. Also in this case, the effects equal to those of the above embodiments can be obtained.

Figure 46:
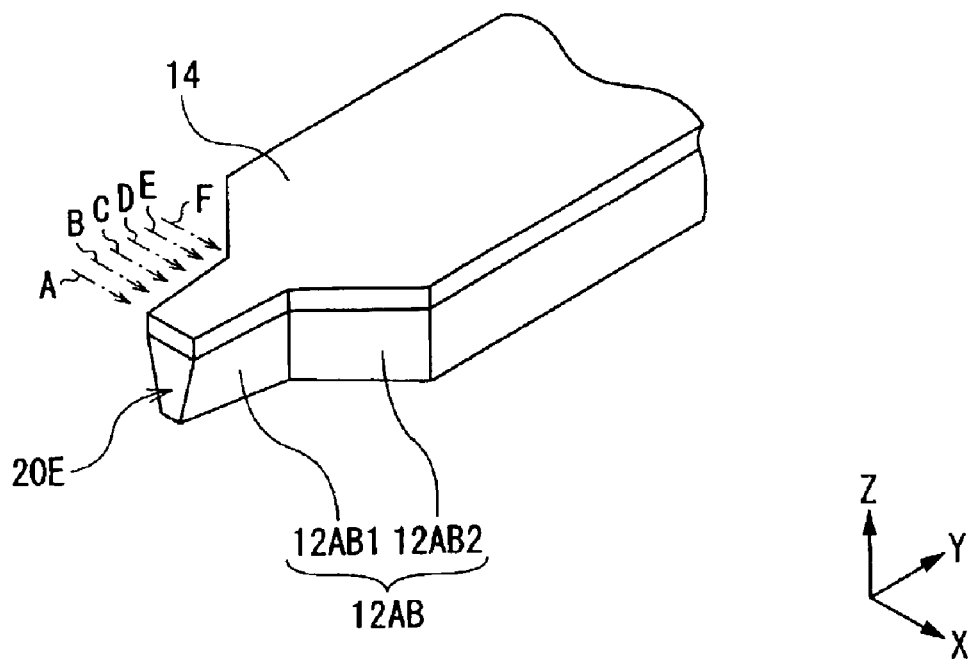
FIG. 46 is a perspective view of still another modification to the pole portion layer.

Moreover, in addition to the above, a pole portion layer with any of structures shown in FIGS. 46 through 51 may be formed. FIGS. 46, 48 and 50 show other modifications of the structure of the pole portion layer, and correspond to FIG. 18. FIGS. 47A through 47F, 49A through 49D and 51A through 51D show the exposed surface and a cross-sectional surface of a main part (front end portion) of the pole portion layer shown in FIGS. 46, 48 and 50, and FIGS. 47A through 47F, 49A through 49D and 51A through 51D correspond to positions A through F indicated in FIG. 46, positions A through D indicated in FIG. 48 and positions A through D indicated in FIG. 50, respectively.

In the pole portion layer 12AB shown in FIG. 46, for example, as shown in FIG. 47A, the exposed surface 20E of the front end portion 12AB1 has the same inverted trapezoidal shape as that shown in FIG. 17, and as shown in FIG. 47B through 47F, the shape of a cross sectional surface M of the front end portion 12AB1 parallel to the exposed surface 20E is changed so that the area of the cross sectional surface M in the positions B through F in the length direction (the Y-axis direction in the drawing) is reduced with increasing proximity to the exposed surface 20E. In other words, for example, the cross sectional surface M has a top edge D1 (a first cross sectional edge) on the medium-outgoing side, a bottom edge D2 (a second cross sectional edge) on the medium-incoming side and a side edge D3 in the width direction, and at least one of a width W7 of the top edge D1 or an angle γ of both ends thereof (for example, an angle which the top edge D1 forms with the side edge D3) is reduced with increasing proximity to the exposed surface 20E. A height V of the cross sectional surface M with the top edge D1 as a base is uniform in the positions A through F, for example, irrespective of a distance from the exposed surface 20E. As an example of specific dimensions, the width W1 in FIG. 47A is 0.15 μm, and the width W7 of the top edge D1 is 0.15 μm, 0.15 μm, 0.18 μm, 0.20 μm and 0.22 μm in order of FIGS. 47B, 47C, 47D, 47E and 47F, and the angle γ is 81°, 82°, 83°, 85°, 87° and 87° in order of FIGS. 47A, 47B, 47C, 47D, 47E and 45F, respectively. In the above example of the dimensions, the width W7 of the top edge D1 near the exposed surface 20E is uniform (0.15 μm). It is because in the case where the air bearing surface including the exposed surface 20E is formed through polishing or the like, even if a small error in the polishing amount arises, a target width (0.15 μm) determining the recording track width will be ensured. Therefore, for example, a section where the width W7 of the top edge D1 is uniform is preferably determined based upon a forming error (polishing error) in formation of the air bearing surface.

The pole portion layer 12AB shown in FIG. 48 has a structure that a front bottom portion of the front end portion 12AB1 is selectively removed, and as shown in FIG. 49A, the exposed surface 20E of the front end portion 12AB1 has an inverted triangular shape. As shown in FIGS. 49B through 49D, the shape of the cross sectional surface M of the front end portion 12AB1 parallel to the exposed surface 20E is changed so that the area of the cross sectional surface M in the positions B through D in the length direction (the Y-axis direction in the drawing) is reduced with increasing proximity to the exposed surface 20E. In other words, for example, the width W7 of the top edge D1 in the cross sectional surface M is uniform irrespective of the position, and a width W8 of the bottom edge D2 is reduced with increasing proximity to the exposed surface 20E. More specifically, the shape of the cross sectional surface M is changed from a rectangular shape (refer to FIG. 49D) to an inverted triangular shape (refer to FIG. 49B) through an inverted trapezoidal shape (refer to FIG. 49C) with increasing proximity to the exposed surface 20E, and specifically the height V of the cross sectional surface M with the top edge D1 as a base in a section where the cross sectional surface M has an inverted triangular shape is reduced toward the medium-outgoing side with increasing proximity to the exposed surface 20E.

The pole portion layer 12AB shown in FIG. 50 has the same structural characteristics as in the case shown in FIG. 48, except that, for example, the shape of the cross sectional surface M of the front end portion 12AB1 parallel to the exposed surface 20E is changed from a rectangular shape (refer to FIG. 51D) to a pentagonal shape (refer to FIG. 51B)

composed of a combination of a rectangle and an inverted triangle through a hexagonal shape (refer to FIG. 51C) composed of a combination of a rectangle and an inverted trapezoid. In other words, in the pole portion layer 12AB shown in FIG. 50, the height V of the cross sectional surface M with the top edge D1 as a base in a section where the cross sectional surface M has a pentagonal shape is reduced toward the medium-outgoing side with increasing proximity to the exposed surface 20E.

Moreover, the cross sectional surface M of the pole portion layer 12AB shown in FIGS. 46 through 51 has the same structural characteristics as, for example, the exposed surface 20 described in the above embodiments. In other words, the width W7 of the top edge D1 is larger than the width W8 of the bottom edge D2, and is equal to or larger than a width W9 of the cross sectional surface M in any middle position between the top edge D1 and the bottom edge D2.

The pole portion layer 12AB shown in FIGS. 46 through 51 can be formed mainly through dry etching described in the second embodiment by adjusting conditions such as a range to be etched, an etching amount and so on. More specifically, for example, as described in the second embodiment, when the precursory magnetic layer pattern 41ABY is etched, a portion which is shaded in etching appears by the existence of a wide rear portion, thereby a difference in the etching amount occurs depending upon positions. By the use of the difference, the shape and the size of the rear portion is adjusted in order to intentionally control the etching amount, thereby the pole portion layer 12AB can be formed so as to have any of the characteristic structures shown in FIGS. 46 through 51. Parameters about the shape of the rear portion which can control the etching amount, for example, an angle of a portion where the width of the pole portion layer 12AB shown in FIGS. 46, 48 and 50 starts to become larger, that is, an angle δ (flare angle) which a side edge on the front side of the rear end portion 12AB2 forms with an extending direction of the pole portion layer 12AB (the Y-axis direction in the drawing) is cited. The flare angle δ is, for example, within a range of 45° to 90°, preferably 60°. Also in any of the cases shown in FIGS. 46 through 51, effects equal to those of the embodiments can be obtained.

In the invention, specifically the structures of the bottom pole portion layer and the top pole portion layer or the shapes of front end surfaces thereof are not necessarily required to accurately have the structural characteristics shown in the above embodiments and modifications. As long as effects relating to an improvement in the recording performance of the thin film magnetic head can be obtained, side portions thereof may have a little distortion, or corners may be rounded to some extent.

Figures 52A, 52B:
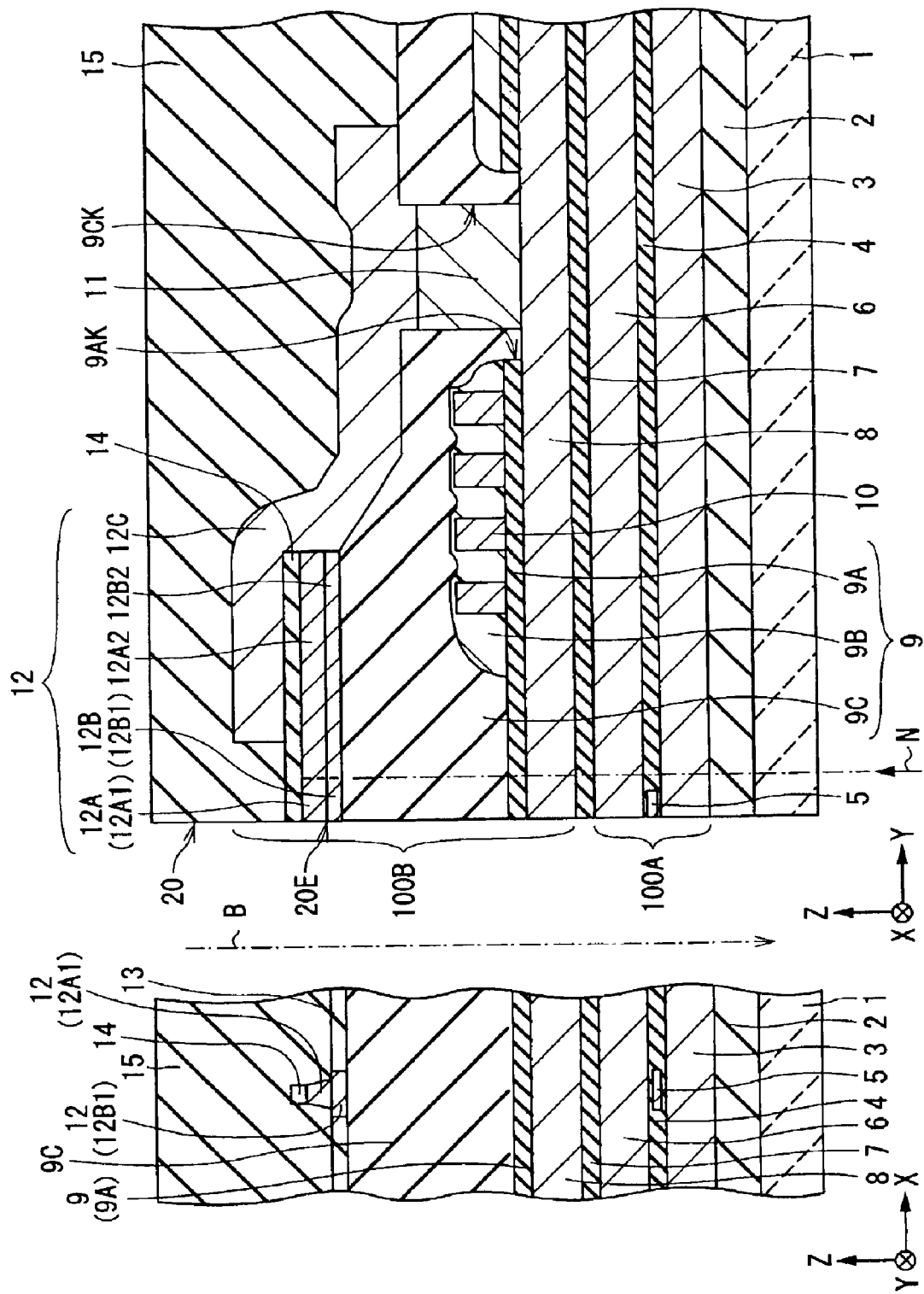
FIGS. 52A and 52B are sectional views of a modification to a structure of a thin film magnetic head.

Moreover, in the embodiments, as shown in FIGS. 1A and 1B, the bottom pole portion layer 12A and the top pole portion layer 12B are laminated in this order on the gap layer portion 9C, and the recording medium moves upward (the direction B of movement) relatively to the thin film magnetic head. However, the invention is not limited to this, and for example, as shown in FIG. 52A and 52B, the recording medium may move downward (the direction B of movement), and the top pole portion layer 12B and the bottom pole portion layer 12A may be laminated in this order on the gap layer portion 9C corresponding to the direction of movement of the recording medium. Also in this case, effects equal to those of the embodiments can be obtained.

Further, in the embodiments and the modifications, a method of manufacturing a composite thin film magnetic head is described, however, the invention is applicable to, for example, a thin film magnetic head for recording only comprising an inductive magnetic transducer for writing or a thin film magnetic head having an inductive magnetic transducer for recording/reproducing. In addition, the invention is applicable to a thin film magnetic head with a structure in which a device for writing and a device for reading is inversely laminated.

As described above, according to the thin film magnetic head of a first aspect of the invention, the width of the first edge in the exposed surface of the track width determining portion is larger than the width of the second edge, and is equal to or larger than the width of the exposed surface in any middle position between the first and the second edges, so a sufficient area of the exposed surface which is an emitting path of magnetic fluxes can be secured, and the magnetic fluxes flowing into the track width determining portion are concentrated on a side of the first edge with a larger width, which is a main emitting path of magnetic fluxes, in the exposed surface. Therefore, necessary and sufficient magnetic fluxes are supplied to the recording-medium-facing surface, so the strength of the perpendicular magnetic field can be secured, and the recording performance can be improved. Further, an increase in the recording track width due to the occurrence of skew can be prevented.

According to the thin film magnetic head of a second aspect of the invention, in the track width determining portion, the first magnetic film extends from a position far from the recording-medium-facing surface to a direction away from the recording-medium-facing surface, and in the second magnetic film, an end surface corresponding to a film thickness constitutes the exposed surface, so the magnetic fluxes flowing toward the recording-medium-facing surface in the track width determining portion smoothly flow into the second magnetic film in the vicinity of the recording-medium-facing surface. Therefore, in the vicinity of the recording-medium-facing surface, the magnetic fluxes are concentrated on the second magnetic film which is a main emitting portion of the magnetic fluxes, so the strength of the perpendicular magnetic field can be further increased.

According to the method of manufacturing a thin film magnetic head of a first aspect of the invention, the second magnetic layer is formed so that the width of the first edge in the exposed surface of the track width determining portion is larger than the width of the second edge, and is equal to or larger than the width of the exposed surface in any middle position between the first and the second edges, so the thin film magnetic head of the first aspect of the invention having an advantage in the improvement of recording performance can be easily manufactured by the use of existing manufacturing techniques.

According to the method of manufacturing a thin film magnetic head of a second aspect of the invention, after two precursory magnetic films are laminated in order on the gap layer, the two precursory magnetic films are processed to form the recording-medium-facing surface, thereby the second magnetic layer is formed so as to have a laminate including the first magnetic film having the first exposed surface exposed to the recording-medium-facing surface and the second magnetic film having the second exposed surface exposed to the recording-medium-facing surface in this order, so the structure of the first magnetic film and the structure of the second magnetic film can be independently configured. Therefore, the thin film magnetic head of the invention can be manufactured so as to increase the flexibility of each structure of the first magnetic film and the second magnetic film and have various structural characteristics.

According to the method of manufacturing a thin film magnetic head of a third aspect of the invention, the first precursory magnetic layer pattern and the non-magnetic layer pattern are formed in order on the gap layer, and while an ion beam is applied from a direction forming an angle of 45° or over with a direction orthogonal to an extending surface of the first precursory magnetic layer pattern, the first precursory magnetic layer pattern is selectively dry etched by the use of the non-magnetic layer pattern as a mask to form the second precursory magnetic layer pattern, and then the second precursory magnetic layer pattern is processed to form the recording-medium-facing surface. Thereby the second magnetic layer is formed so that the track width determining portion constitutes the exposed surface, so the second precursory magnetic layer pattern is undercut through dry etching to form the second magnetic layer with an undercut structure. Therefore, the second magnetic layer can be formed so as to have a structure which is difficult to be formed only by film forming techniques, and thereby the thin film magnetic head of the invention can be manufactured so as to have various structural characteristics.

According to the method of manufacturing a thin film magnetic head of a fourth aspect of the invention, the coating layer made of a predetermined non-magnetic material is formed so as to coat surroundings of a portion of the first precursory magnetic layer pattern, which is formed on the gap layer, on a side far from the gap layer, and while an ion beam is applied from a direction forming a predetermined angle with a direction orthogonal to an extending surface of the first precursory magnetic layer pattern, the first precursory magnetic layer pattern is selectively dry etched by the use of the coating layer as a mask to form the second precursory magnetic layer pattern, and then the second precursory magnetic layer pattern is processed to form the recording-medium-facing surface. Thereby, the second magnetic layer is formed so that the track width determining portion constitutes the exposed surface, so by the existence of the coating layer, it is not necessary to apply the ion beam from a direction forming a relatively large angle with a direction orthogonal to an extending surface of the first precursory magnetic layer pattern. By applying the ion beam from a direction forming a relatively small angle, the first precursory magnetic layer pattern can be undercut. Therefore, in the case where dry etching is used, the second magnetic layer can be formed under relatively simple etching conditions, and thereby the thin film magnetic head of the invention with various structural characteristics can be more easily manufactured.

According to the method of manufacturing a thin film magnetic head of a fifth aspect of the invention, the coating layer made of a predetermined non-magnetic material is formed so as to coat surroundings of a portion of the first precursory magnetic layer pattern, which is formed on the gap layer, on a side far from the gap layer, and by the use of the coating layer as a mask, a portion of the first precursory magnetic layer pattern on a side near the gap layer is selectively etched through wet etching using a predetermined etchant to form the second precursory magnetic layer pattern, and then the second precursory magnetic layer pattern is processed to form the recording-medium-facing surface. Thereby, the second magnetic layer is formed so that the track width determining portion has the exposed surface exposed to the recording-medium-facing surface, so compared with the case where dry etching is used, the second precursory magnetic layer pattern is pronouncedly undercut by the use of wet etching, so the second magnetic layer with a pronounced undercut structure can be formed. Therefore, the second magnetic layer can be formed so as to have a structure which is difficult to be formed through dry etching, and thereby the thin film magnetic head of the invention can be manufactured so as to have various structural characteristics.

According to the thin film magnetic head of a third aspect of the invention, the width of the first edge in the exposed surface of the first magnetic layer portion is larger than the width of the second edge, and is equal to or larger than the width of the exposed surface in any middle position between the first and the second edges, so a sufficient area of the exposed surface which is an emitting path of magnetic fluxes can be secured, and the magnetic fluxes flowing into the first magnetic layer portion are concentrated on a side close to the first edge with a larger width, which is a main emitting path of magnetic fluxes, in the exposed surface. Therefore, necessary and sufficient magnetic fluxes are supplied to the recording-medium-facing surface, so the strength of the perpendicular magnetic field can be secured, and the recording performance can be improved.

According to the thin film magnetic head of a fourth aspect of the invention, the width of the second edge in the exposed surface of the first magnetic layer portion is larger than the width of the first edge, and is equal to or larger than the width of the exposed surface in any middle position between the first and the second edges, so a sufficient area of the exposed surface which is an emitting path of magnetic fluxes can be secured, and the magnetic fluxes flowing into the first magnetic layer portion are concentrated on a side of the second edge with a larger width, which is a main emitting path of magnetic fluxes, in the exposed surface. Therefore, the strength of the perpendicular magnetic field can be secured, and the recording performance can be improved.

More specifically, according to the thin film magnetic head of the first aspect of the invention, the track width determining portion has a portion where an area of a cross sectional surface parallel to the recording-medium-facing surface is reduced with increasing proximity to the recording-medium-facing surface, so the magnetic fluxes flowing in the track width determining portion are focused more smoothly according to a reduction in the area of the cross sectional surface, compared with the case where the area of the cross sectional surface is uniform irrespective of a distance from the recording-medium-facing surface. Therefore, the strength of the perpendicular magnetic field can be further increased.

According to the thin film magnetic head of the first or the second aspect of the invention, the width of the second region of the exposed surface is uniform irrespective of a distance from the second edge, so unlike the case where the width of the second region is reduced with increasing proximity to the second edge, even if the forming thickness of the track width determining portion is thinner than a target thickness due to an error in thickness during the formation, the width of the first edge in the exposed surface which determines the recording track width can be held uniform. Therefore, the recording track width can be determined without variations.

According to the thin film magnetic head of the first aspect of the invention or the method of manufacturing a thin film magnetic head of the first aspect of the invention, an angle between a side edge of the second region and the first edge in the exposed surface is within a range of 70° or over and less than 90°, so even if the width of the second region of the exposed surface which is a main emitting path of magnetic fluxes is reduced with increasing proximity to the second edge, a sufficient area of the second region can be secured. Therefore, in this point of view, the invention can contribute to securing the strength of the perpendicular magnetic field.

According to the thin film magnetic head of the first or the second aspect of the invention, the second magnetic film out of the first and the second magnetic films constitutes the exposed surface, so the first magnetic film is recessed from the recording-medium-facing surface. Thereby, the magnetic fluxes flowing toward the recording-medium-facing surface in the first magnetic film smoothly flow into the second magnetic film in the vicinity of the recording-medium-facing surface. Therefore, in the vicinity of the recording-medium-facing surface, the magnetic fluxes are concentrated on the second magnetic film which is a main emitting portion of the magnetic fluxes, so the strength of the perpendicular magnetic field can be further increased.

According to the thin film magnetic head of the first aspect of the invention, the second magnetic film has higher saturated magnetic flux density than the first magnetic film, so the magnetic fluxes flowing in the first magnetic film and the second magnetic film are concentrated on the second magnetic film which is a main emitting potion of the magnetic fluxes. Therefore, in this point of view, the invention can contribute to securing the strength of the perpendicular magnetic field.

According to the thin film magnetic head of the third or the fourth aspect of the invention, an area of a first cross sectional surface of the first magnetic layer portion parallel to the recording-medium-facing surface is smaller than an area of a second cross sectional surface of the second magnetic layer portion parallel to the recording-medium-facing surface, so the magnetic fluxes flowing from the second magnetic layer portion to the first magnetic layer portion are smoothly focused according to a reduction in the area of the cross sectional surface in the process of flowing the magnetic fluxes, thereby a saturation phenomenon of the magnetic fluxes can be restrained. Therefore, in view of necessary and sufficient supply of the magnetic fluxes accompanied with focusing of the magnetic fluxes, the strength of the perpendicular magnetic field can be secured.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head used for a magnetic recording/reproducing apparatus including a recording medium moving to a predetermined direction of movement, the thin film magnetic head comprising:

a first and a second magnetic layers including pole portions facing each other in a recording-medium-facing surface facing the recording medium and its vicinity, and being magnetically coupled to each other in a position far from the recording-medium-facing surface;

a gap layer being disposed between the pole portions facing each other; and a thin film coil being disposed between the first and the second magnetic layers and insulated from the first and the second magnetic layers, wherein the second magnetic layer includes a track width determining portion having an exposed surface exposed to the recording-medium-facing surface and determining a recording track width of the recording medium, the exposed surface includes a first edge positioned on a medium-outgoing side in the direction of movement and a second edge positioned on a medium-incoming side in the direction of movement, and a width of the first edge is larger than a width of the second edge, and is equal to or larger than a width of the exposed surface in any middle position between the first and the second edges, the exposed surface includes a first region on the medium-incoming side and a second region on the medium-outgoing side, and a width of the first region is reduced with increasing proximity to the second edge, and a width of the second region is uniform irrespective of a distance from the second edge.

2. A thin film magnetic head according to claim 1, wherein the track width determining portion has a portion where an area of a cross sectional surface parallel to the recording-medium-facing surface is uniform irrespective of a distance from the recording-medium-facing surface.

3. A thin film magnetic head according to claim 1, wherein the track width determining portion includes a first magnetic film and a second magnetic film laminated in order from the medium-incoming side, and the first and the second magnetic films constitute the exposed surface.

4. A thin film magnetic head according to claim 3, wherein the second magnetic film has higher saturated magnetic flux density than the first magnetic film.

5. A thin film magnetic head according to claim 1, wherein the gap layer has a larger thickness than the second magnetic layer in the recording-medium-facing surface.

6. A thin film magnetic head, comprising:

a first and a second magnetic layers including pole portions facing each other on a recording-medium-facing surface facing the recording medium and its vicinity, and being magnetically coupled to each other in a position far from the recording-medium-facing surface;

a gap layer being disposed between the pole portions facing each other; and a thin film coil being disposed between the first and the second magnetic layers and insulated from the first and the second magnetic layers, wherein the second magnetic layer includes:

a first magnetic layer portion having an exposed surface exposed to the recording-medium-facing surface, being disposed so as to extend from the recording-medium-facing surface to a predetermined coupling position far from the recording-medium-facing surface, and determining a recording track width of the recording medium, and a second magnetic layer portion being magnetically coupled to the first magnetic layer portion in the coupling position, and extending in a direction away from the recording-medium-facing surface, the exposed surface of the first magnetic layer portion includes a first edge positioned on a side far from the gap layer, and a second edge positioned on a side near the gap layer, and a width of the first edge is larger than a width of the second edge, and is equal to or larger than a width of exposed surface in any middle position between the first and the second edges, the exposed surface includes a first region on a side near the gap layer and a second region on a side far from the gap layer, and a width of the first region is reduced with increasing proximity to the second edge, and a width of the second region is uniform irrespective of a distance from the second edge.

7. A thin film magnetic head according to claim 6, wherein an area of a first cross sectional surface of the first magnetic layer portion parallel to the recording-medium-facing surface is smaller than an area of a second cross sectional surface of the second magnetic layer portion parallel to the recording-medium-facing surface.

* * * * *